US012754967B2

(12) United States Patent
Sagiv et al.

(10) Patent No.: US 12,754,967 B2
(45) Date of Patent: Oct. 6, 2026

(54) SYSTEM AND METHOD FOR NETWORK TRANSACTION FACILITATOR SUPPORT WITHIN A WEBSITE BUILDING SYSTEM

(71) Applicant: WIX.COM LTD, Tel Aviv (IL)

(72) Inventors: Amit Sagiv, Even Yehuda (IL); Yehuda Liberman, Shoham (IL); Ilay Moshe Avni, Aseret (IL); Itay Arad, Ramat HaSharon (IL); Oded Luria, Tel Aviv (IL); Tetiana Medvid, Kyiv (UA); Viktoriia Pikh, Kyiv (UA); Ran Yahalom, Kibbutz Tlalim (IL); Asa Jacob Zajdman, Tel Aviv (IL); Gabriel Broitman, Tel Aviv (IL)

(73) Assignee: WIX.COM LTD., Tel Aviv (IL)

( * ) Notice: Subject to any disclaimer, the term of this patent is extended or adjusted under 35 U.S.C. 154(b) by 251 days.

(21) Appl. No.: 18/437,603

(22) Filed: Feb. 9, 2024

(65) Prior Publication Data

US 2024/0296199 A1 Sep. 5, 2024

Related U.S. Application Data

(60) Provisional application No. 63/616,335, filed on Dec. 29, 2023, provisional application No. 63/506,313,
(Continued)

(51) Int. Cl.
*G06F 16/958* (2019.01)
*G06F 8/34* (2018.01)
(Continued)

(52) U.S. Cl.
CPC .............. *G06F 16/958* (2019.01); *G06F 8/34* (2013.01); *G06F 16/2379* (2019.01);
(Continued)

(58) Field of Classification Search
CPC .... G06F 16/058; G06F 16/958; G06F 16/972; G06F 8/20; G06F 8/34; G06F 9/44526; H04L 67/02; H04L 67/63; G06Q 20/12
See application file for complete search history.

(56) References Cited

U.S. PATENT DOCUMENTS

| | | | | |
|---|---|---|---|---|
| 11,429,951 | B1 * | 8/2022 | Bu | G06Q 20/325 |
| 2008/0086417 | A1 * | 4/2008 | Bykov | G06Q 20/20 705/40 |

(Continued)

FOREIGN PATENT DOCUMENTS

| | | | | |
|---|---|---|---|---|
| AU | 2009240449 A1 * | 10/2009 | | G07F 19/206 |
| WO | WO-2007118052 A2 * | 10/2007 | | G06Q 20/40 |
| WO | WO-2013067276 A1 * | 5/2013 | | G06Q 20/027 |

OTHER PUBLICATIONS

Mahmud, Samin Yaseer, et al., Analysis of Payment Service Provider SDKs in Android, ACSAC '22: Proceedings of the 38th Annual Computer Security Applications Conference, Dec. 2022, 15 pages, [retrieved on Dec. 2, 2025], Retrieved from the Internet: <URL:http://dl.acm.org/>.*

(Continued)

*Primary Examiner* — Geoffrey R St Leger
(74) *Attorney, Agent, or Firm* — ALSTON & BIRD LLP

(57) ABSTRACT

Embodiments provide for supporting multiple network transaction facilitators (NTFs) within a website building system. A first network transaction facilitator connection request is received. Based at least in part on the first network transaction facilitator (NTF) connection request, a first NTF of a plurality of NTFs is integrated with a network transaction interface of the website. Responsive to receiving a network transaction request via the network transaction interface, the network transaction request is routed to the
(Continued)

first NTF or a different NTF based at least in part on a network transaction profile associated with the website identifier.

18 Claims, 40 Drawing Sheets

Related U.S. Application Data filed on Jun. 5, 2023, provisional application No. 63/484,343, filed on Feb. 10, 2023.

(51) Int. Cl.

| | |
|---|---|
| ***G06F 16/23*** | (2019.01) |
| ***G06N 3/043*** | (2023.01) |
| ***G06N 3/0442*** | (2023.01) |
| ***G06N 3/0455*** | (2023.01) |
| ***G06N 3/047*** | (2023.01) |
| ***G06N 3/0475*** | (2023.01) |
| ***G06N 3/088*** | (2023.01) |
| ***G06N 3/09*** | (2023.01) |
| ***G06N 3/094*** | (2023.01) |
| ***G06N 3/0985*** | (2023.01) |
| ***G06N 5/01*** | (2023.01) |
| ***G06N 5/022*** | (2023.01) |
| ***G06N 5/04*** | (2023.01) |
| ***G06N 7/01*** | (2023.01) |
| ***G06N 7/02*** | (2006.01) |
| ***G06N 20/20*** | (2019.01) |
| ***G06Q 20/02*** | (2012.01) |
| ***G06Q 20/12*** | (2012.01) |
| ***H04L 67/02*** | (2022.01) |
| ***H04L 67/63*** | (2022.01) |
| *G06N 3/092* | (2023.01) |
| *G06N 3/126* | (2023.01) |

(52) U.S. Cl.

CPC ........... *G06F 16/972* (2019.01); *G06N 3/043* (2023.01); *G06N 3/0442* (2023.01); *G06N 3/0455* (2023.01); *G06N 3/047* (2023.01); *G06N 3/0475* (2023.01); *G06N 3/088* (2013.01); *G06N 3/09* (2023.01); *G06N 3/094* (2023.01); *G06N 3/0985* (2023.01); *G06N 5/01* (2023.01); *G06N 5/022* (2013.01); *G06N 5/041* (2013.01); *G06N 7/01* (2023.01); *G06N 7/02* (2013.01); *G06N 20/20* (2019.01); *G06Q 20/02* (2013.01); *G06Q 20/12* (2013.01); *G06N 3/092* (2023.01); *G06N 3/126* (2013.01); *H04L 67/02* (2013.01); *H04L 67/63* (2022.05)

(56) References Cited

U.S. PATENT DOCUMENTS

| | | | | |
|---|---|---|---|---|
| 2008/0222002 | A1* | 9/2008 | Hu | G07G 3/003 705/38 |
| 2010/0174783 | A1* | 7/2010 | Zarom | H04L 65/403 709/205 |
| 2019/0205971 | A1* | 7/2019 | Deo | H04L 67/535 |
| 2019/0228106 | A1* | 7/2019 | Dickerson | G06F 16/9577 |
| 2022/0335430 | A1 | 10/2022 | Hubley | |

OTHER PUBLICATIONS

International Search Report and Written Opinion for International Application No. PCT/IB2024/051249 (ISA/EP) mailed Apr. 18, 2024 (14 pages).

* cited by examiner

900

900

Working environment

◉ Dev

○ Production

Pick industry category

Fashion +

Segments overview

PSPs performance in each segment

PSPs performance across all segments

PSP Recommendations

PSP additional technical graphs, (if visible)

☑ show additional technical graphs

Segments overview

Main attributes

| Segment | Avg ?? amount $ | T?? normalized variance | Median product price to median time amount ratio | International seller | Drink?? ?? time ratio | Drink?? ?? time ratio | Mobile ?? time ratio | Mobile other time ratio | Percent of sellers responsible for 90% gpv |
|---|---|---|---|---|---|---|---|---|---|
| 1 | 74$ | 0.00 | 0.6 | True | 0.12 | 0.15 | 0.54 | 0.16 | 17 |
| 2 | 58$ | 0.50 | 0.6 | False | 0.06 | 0.10 | 0.67 | 0.15 | 25 |
| 3 | 53$ | 1.00 | 0.6 | False | 0.00 | 0.00 | 1.00 | 0.00 | 12 |
| 4 | 50$ | 1.00 | 1.8 | False | 0.07 | 0.11 | 0.65 | 0.14 | 9 |
| 5 | 91$ | 1.00 | 0.5 | False | 0.09 | 0.17 | 0.55 | 0.15 | 30 |
| 6 | 41$ | 1.00 | 0.6 | False | 0.09 | 0.14 | 0.56 | 0.19 | 13 |

Technical details on what features the segmentation is based +

Overall number of sites: 10273

Number of sites

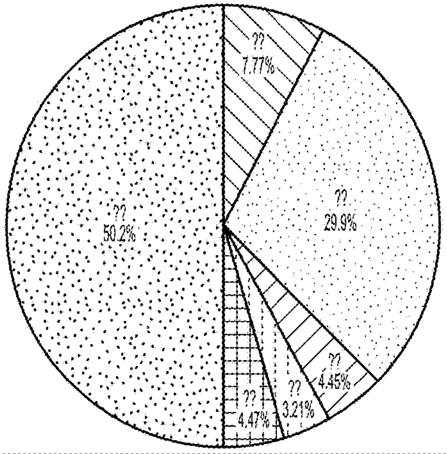

FIG. 9C

Pick segment

1 sites with less than 200 checkouts were removed from conversion rate analysis
displaying payment providers with at least 50 transactions

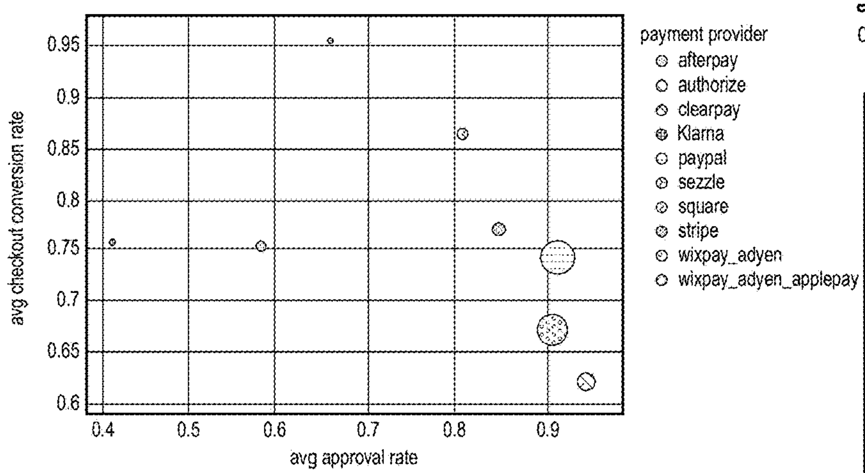

pick min approval ratio 0.50

0.00 1.00

| Payment provider | Avg approval rate | Avg approval rate confidence interval | Avg conversion rate | Avg conversion rate confidence interval | Num sites with p1p |
|---|---|---|---|---|---|
| paypal | 91% | 90% - 93% | 74% | 66% - 82% | 20 |
| wixpay_adyen | 91% | 89% - 92% | 67% | 52% - 82% | 11 |
| stripe | 85% | 80% - 89% | 77% | 65% - 89% | 8 |
| wixpay_adyen_applepay | 95% | 92% - 97% | 62% | 41% - 83% | 7 |
| square | 81% | 74% - 87% | 86% | 79% - 94% | 5 |
| afterpay | 58% | 47% - 70% | 75% | nan% - nan% | 1 |
| authorize | 69% | 44% - 94% | 78% | nan% - nan% | 1 |
| clearpay | 56% | nan% - nan% | 87% | nan% - nan% | 1 |
| sezzle | 66% | 44% - 87% | 95% | nan% - nan% | 1 |

FIG. 9D

SYSTEM AND METHOD FOR NETWORK TRANSACTION FACILITATOR SUPPORT WITHIN A WEBSITE BUILDING SYSTEM

CROSS-REFERENCE TO RELATED APPLICATIONS

The present application claims priority to U.S. Provisional Application Ser. No. 63/484,343, titled "SYSTEM AND METHOD FOR RESOURCE PROVIDER DESIGNATION WITHIN A WEBSITE BUILDING SYSTEM," filed Feb. 10, 2023, to U.S. Provisional Application Ser. No. 63/506,313, titled "SYSTEM AND METHOD FOR PAYMENTS MASTER ACCOUNT," filed Jun. 5, 2023, and to U.S. Provisional Application Ser. No. 63/616,335, titled "SYSTEM AND METHOD FOR NETWORK TRANSACTION FACILITATOR SUPPORT WITHIN A WEBSITE BUILDING SYSTEM," filed Dec. 29, 2023, the entire contents of all of which are incorporated herein by reference in their entirety.

TECHNOLOGICAL FIELD

Example embodiments of the present disclosure relate generally to visual editing technologies and, more particularly, to a system, apparatus, method, and computer program product for integrating network transaction endpoint services and for network transaction facilitator support within a website building system.

BACKGROUND

Various platforms may offer capabilities associated with network transactions. However, integrating multiple reliable network transaction facilitators is computationally complex and unpredictable. Through applied effort, ingenuity, and innovation, many of these identified deficiencies and problems have been solved by developing solutions that are structured in accordance with the embodiments of the present disclosure, many examples of which are described in detail herein.

BRIEF SUMMARY

Embodiments provide for supporting multiple network transaction facilitators (NTFs) within a website building system. A first NTF connection request is received. Based at least in part on the first NTF connection request, editing of a network transaction interface of the website is enabled to support network transactions associated with a first NTF of a plurality of NTFs. Responsive to receiving a network transaction request via the network transaction interface, the network transaction request is routed to the first NTF or a different NTF of the plurality of NTFs based at least in part on a network transaction profile associated with the website identifier.

Embodiments relate to resource provider designation within a website building system. In some embodiments, an apparatus is caused to retrieve website attributes associated with a first website identifier. In some embodiments, an apparatus is caused to retrieve historical transaction data associated with an editing user identifier associated with the first website identifier and/or other website identifiers having website attributes having threshold similarity measures as compared to those of associated with the first website identifier. In some embodiments, an apparatus is caused to, for a subset of resource provider designations of a plurality of resource provider designations, generate a resource provider designation score based at least in part on applying one or more trained models to the website attributes and the historical transaction data. In some embodiments, an apparatus is caused to, based at least in part on a determination that a resource provider designation has an acceptable resource provider designation score compared to resource provider designations, cause display of a resource provider designation recommendation interface via an interface of a client computing entity associated with the first website identifier.

Embodiments relate to network transaction intermediary selection within a website building system. In some embodiments, an apparatus caused to retrieve a first website identifier. In some embodiments, the apparatus is caused to retrieve one or more website clusters, wherein each website of the one or more website clusters is associated with one or more website attributes, and a website cluster of the one or more website clusters is generated based at least in part on similarity measures associated with their respective website attributes. In some embodiments, the apparatus is caused to determine that the first website identifier is associated with a first website cluster of the one or more website clusters. In some embodiments, the apparatus is caused to, for a subset of network transaction intermediaries of a plurality of network transaction intermediaries, generate a network transaction intermediary score based at least in part on applying one or more trained models to first attributes and historical network transaction intermediary data associated with the first website cluster. In some embodiments, the apparatus is caused to, based at least in part on a determination that a network transaction intermediary having an acceptable network transaction intermediary score is not associated with the first website identifier, cause display of a network transaction intermediary recommendation interface via an interface of a client computing entity associated with the first website identifier.

Embodiments relate to identifying a trigger decision point associated with exposing a website identifier to a network transaction facilitator. In some embodiments, an apparatus is caused to receive website assembly touch point data associated with a website assembled using the website building system, wherein the website assembly touch point data is associated with electronic assembly interactions performed by a client computing entity associated with an editing user identifier, and wherein the website assembly touch point data comprises a plurality of website assembly touch point data records each associated with a touch point and a timestamp. In some embodiments, the apparatus is caused to transform the website assembly touch point data into an editing user vector comprising a plurality of features representative of the plurality of website assembly touch point data records. In some embodiments, the apparatus is caused to retrieve one or more website vectors associated with websites having similar website attributes as those associated with the website. In some embodiments, the apparatus is caused to, based at least in part on applying one or more models to one or more of the editing user vector and the one or more website vectors, identify a trigger decision point, wherein the trigger decision point represents a decision to expose the website identifier to a given network transaction facilitator. In some embodiments, the apparatus is caused to cause rendering of a network transaction facilitator exposure interface via an interface of the client computing entity, wherein the network transaction facilitator exposure interface comprises visual representation of the network transaction facilitator.

Embodiments relate to predicting resource provider resilience within a website building system. In some embodiments, an apparatus is caused to retrieve website resilience metadata associated with a website identifier, wherein the website resilience metadata comprises one or more of historical network transaction data associated with the website identifier, editing user attributes associated with an editing user identifier associated with the website identifier, historical editing interactions associated with the editing user identifier, and website attributes associated with the website identifier. In some embodiments, the apparatus is caused to, based at least in part on applying one or models to the website resilience metadata, generate a resource volume prediction and a disputed network transaction prediction associated with the website identifier. In some embodiments, the apparatus is caused to, based at least in part on the resource volume prediction and the disputed network transaction prediction, generate a resource provider resilience score associated with the website identifier. In some embodiments, the apparatus is caused to transmit or cause rendering of the resource provider resilience score via a display of a computing entity.

Embodiments relate to contextual compliance enforcement. In some embodiments, an apparatus is caused to receive, from a requesting entity, a contextual compliance request, the contextual compliance request comprising a website identifier, and one or more contextual records. In some embodiments, the apparatus is caused to transmit, to one or more interface service entities and based at least in part on the one or more contextual records, a context-specific compliance score request. In some embodiments, the apparatus is caused to receive, from the one or more interface service entities, one or more context-specific compliance score structures, wherein each context-specific compliance score structure of the one or more context-specific compliance score structures comprises a compliance score for the website identifier in accordance with a respective contextual record. In some embodiments, the apparatus is caused to generate, based at least in part on applying one or more models to the one or more context-specific compliance score structures, an aggregated compliance score associated with the website identifier. In some embodiments, the apparatus is caused to generate, based at least in part on the one or more context-specific compliance scores and the aggregated compliance score, a contextual compliance response comprising the aggregated compliance score and one or more context-specific data structures. In some embodiments, the apparatus is caused to transmit, to the requesting entity, the contextual compliance response.

Embodiments relate to disputed transaction data structure generation, wherein the disputed transaction data structure is associated with a network transaction. In some embodiments, an apparatus is caused to receive a disputed network transaction notification, the disputed network transaction notification comprising a network transaction identifier, a website identifier, a dispute type identifier, a dispute status, and an end-user identifier. In some embodiments, the apparatus is caused to, based at least in part on the dispute status, retrieve one or more network transaction records associated with the network transaction identifier. In some embodiments, the apparatus is caused to generate the disputed transaction data structure based at least in part on one or more of the one or more network transaction records, wherein the one or more network transaction records are arranged within the disputed transaction data structure based at least in part on one or more of the dispute type identifier, a network transaction facilitator associated with the network transaction identifier, a network transaction intermediary associated with the network transaction identifier, or a network transaction endpoint associated with the network transaction identifier. In some embodiments, the apparatus is caused to generate, using one or more models and based at least in part on one or more of the end-user identifier, the website identifier, the dispute type identifier, a network transaction facilitator identifier associated with the network transaction identifier, a network transaction intermediary associated with the network transaction identifier, a network transaction endpoint associated with the network transaction identifier, or one or more network transaction records, a network transaction dispute reversal score representing a programmatically generated likelihood that a network transaction endpoint associated with the network transaction endpoint identifier will change the dispute status associated with the network transaction identifier. In some embodiments, the apparatus is caused to cause rendering of visual representation of the disputed transaction data structure, the network transaction dispute reversal score, and one or more network transaction attributes associated with the network transaction identifier, via a display interface of a client computing entity associated with the website identifier.

Embodiments relate to automated network transaction facilitator selection. In some embodiments, an apparatus is caused to receive a network transaction request data structure comprising a website identifier, an end-user identifier, and network transaction request metadata. In some embodiments, the apparatus is caused to, responsive to determining, based at least in part on the network transaction request metadata, that the network transaction request data structure is associated with an legitimacy score above a legitimacy threshold, for a subset of network transaction facilitator of a plurality of network transaction facilitators, generate, based at least in part on applying one or more models to the network transaction request metadata, a network transaction facilitator approval score, wherein the network transaction facilitator approval score represents a programmatically generated likelihood that the network transaction facilitator will approve completion of a network transaction associated with the network transaction request data structure. In some embodiments, the apparatus is caused to transmit the network transaction request data structure to a network transaction facilitator of the subset of network transaction facilitators having an accepted network transaction facilitator approval score as compared to the other network transaction facilitators.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE SEVERAL VIEWS OF THE DRAWINGS

Figure 1:
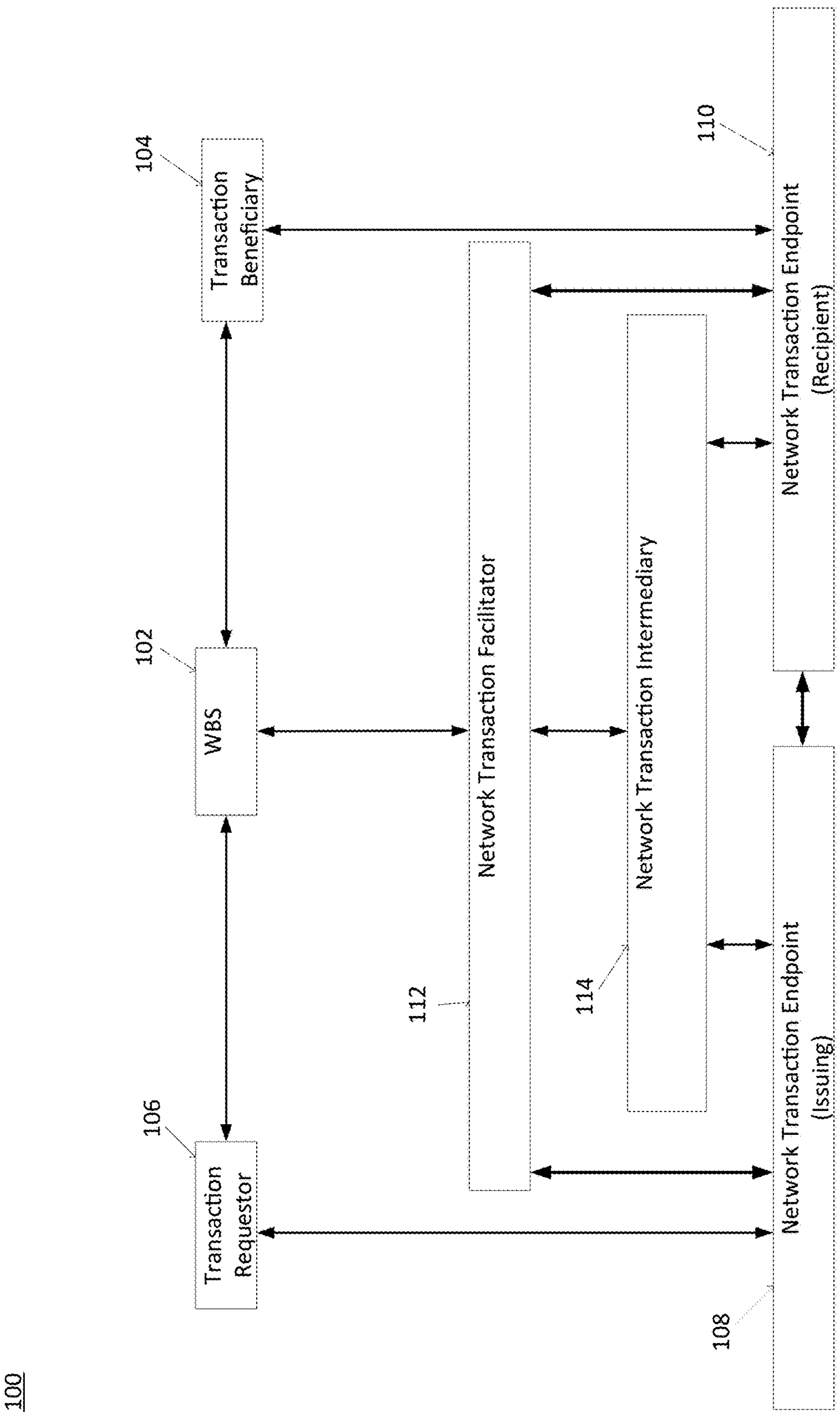
Figure 2A:
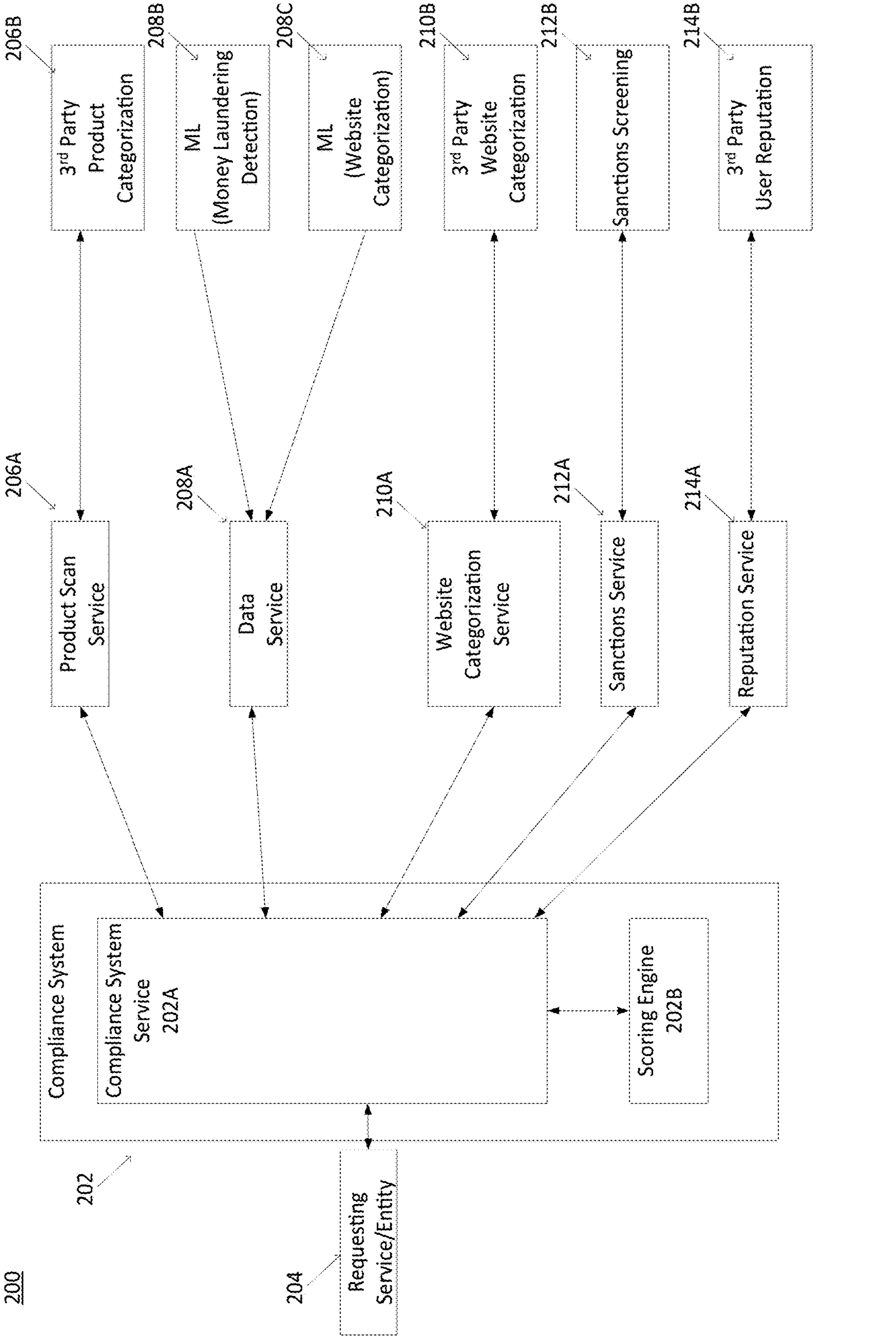
Figure 2B:
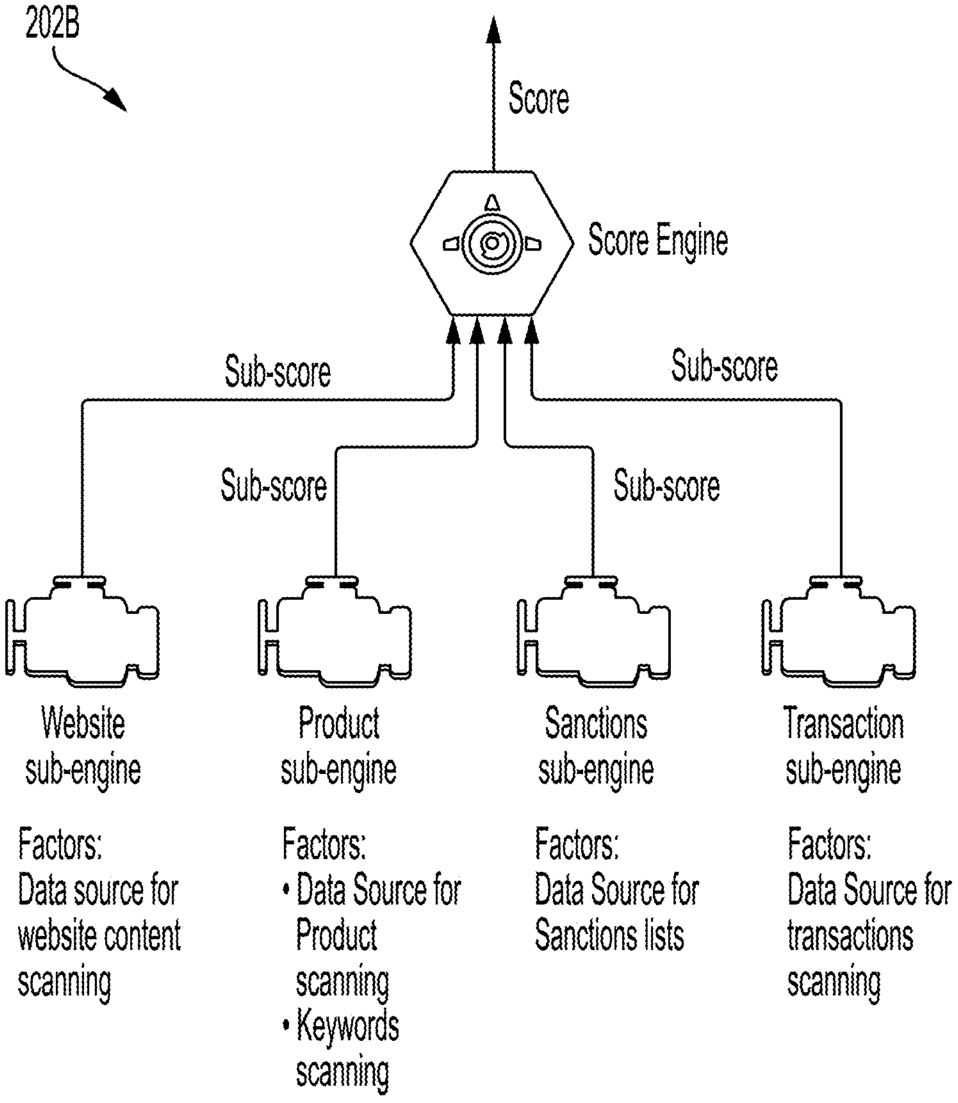
Figure 3A:
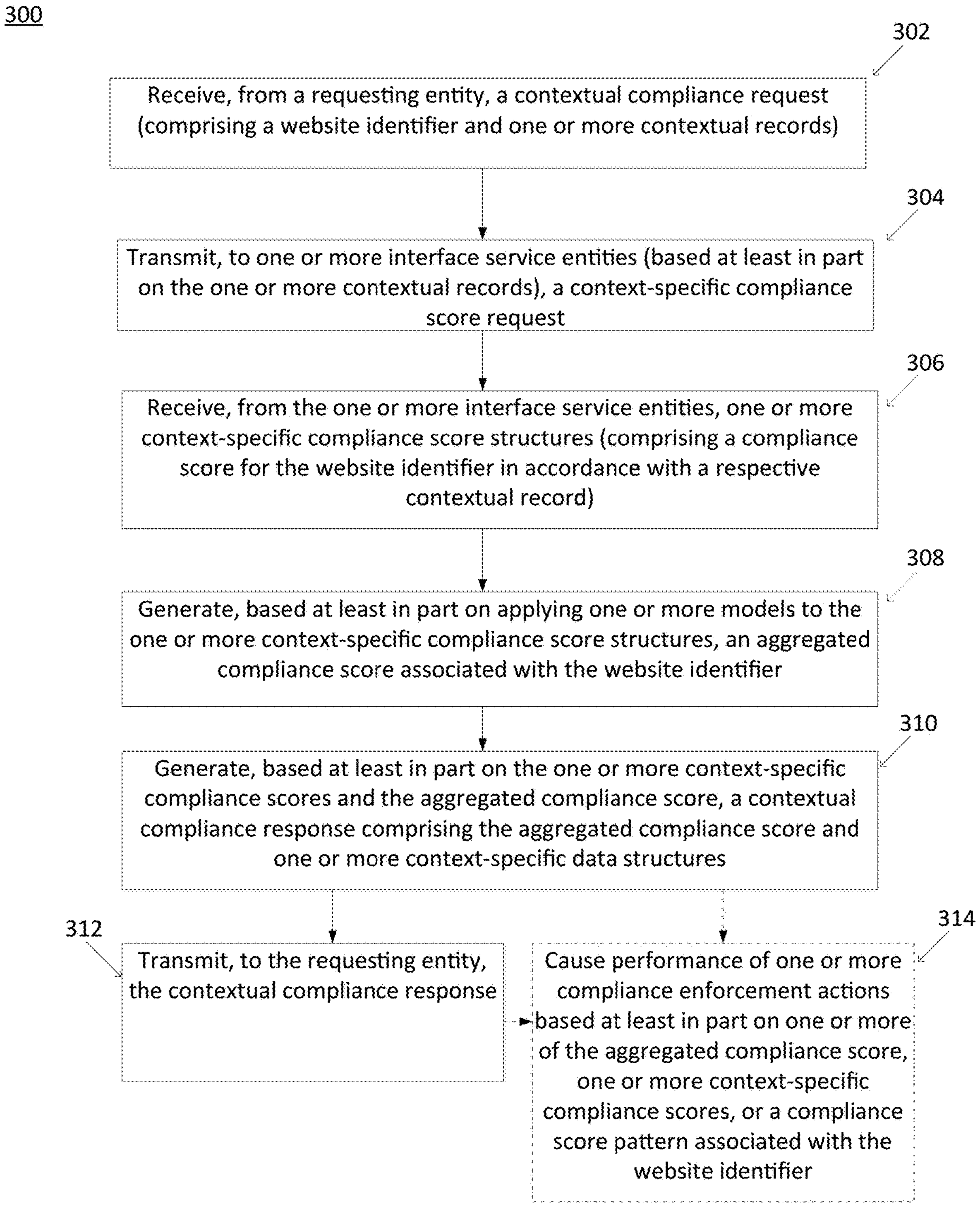
Figure 3B:
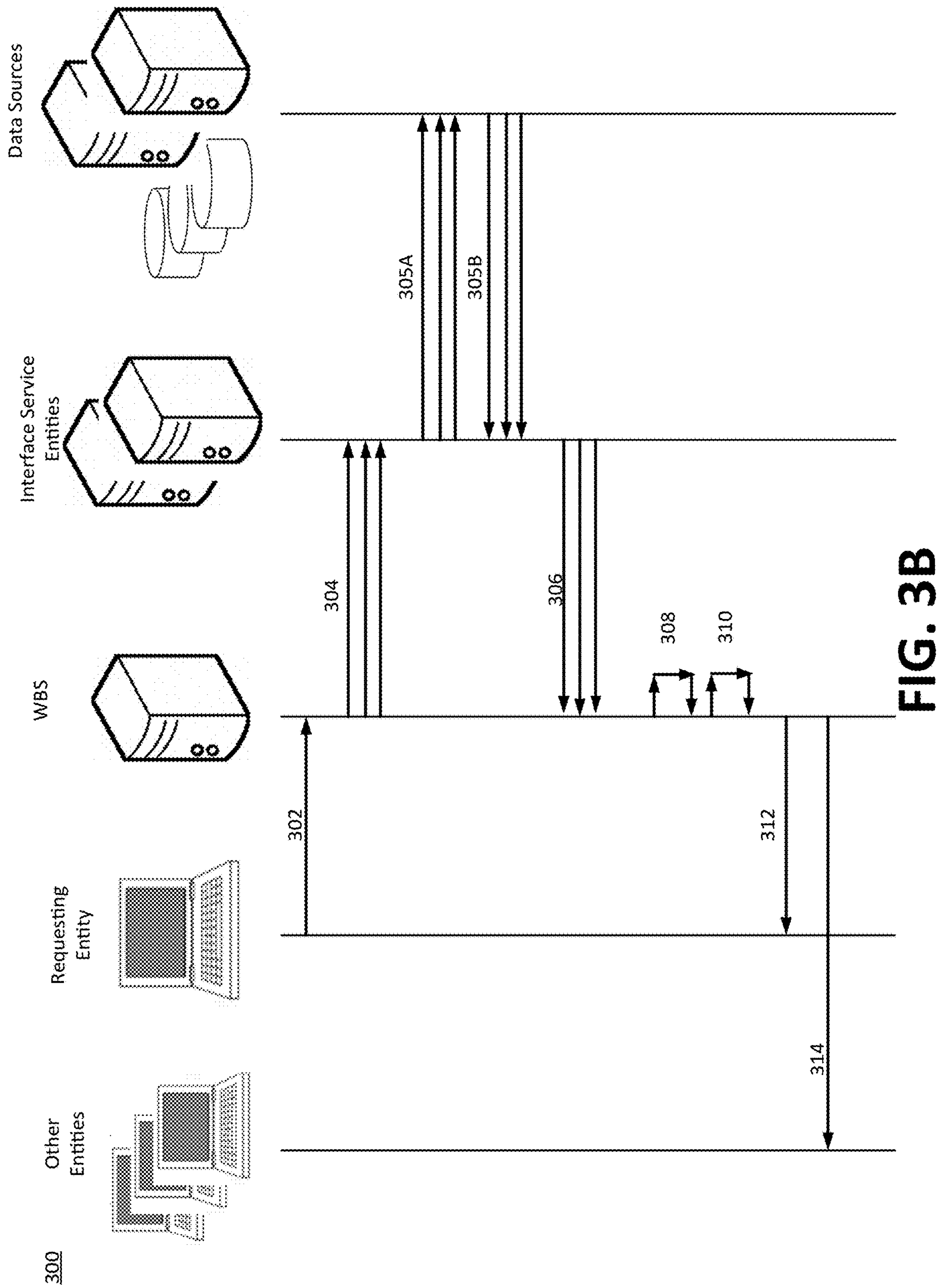
Figure 4A:
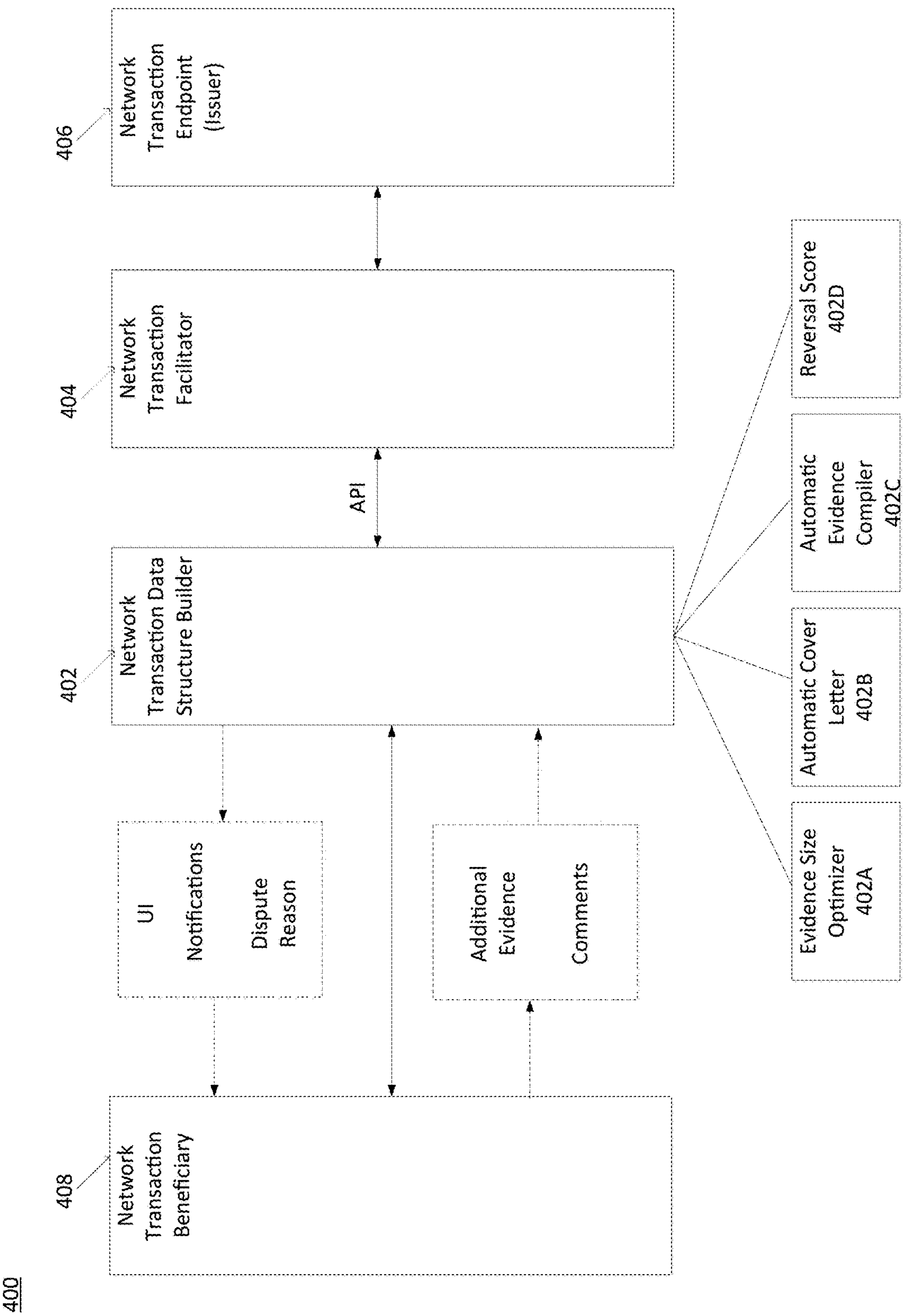
Figure 4B:
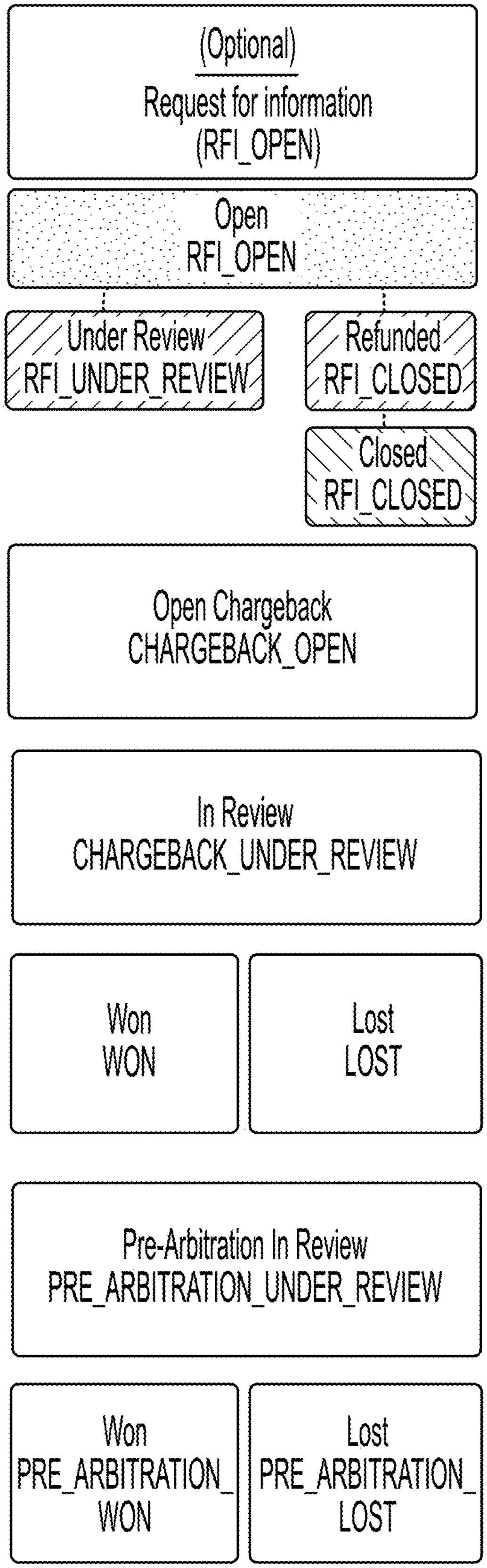
Figure 5A:
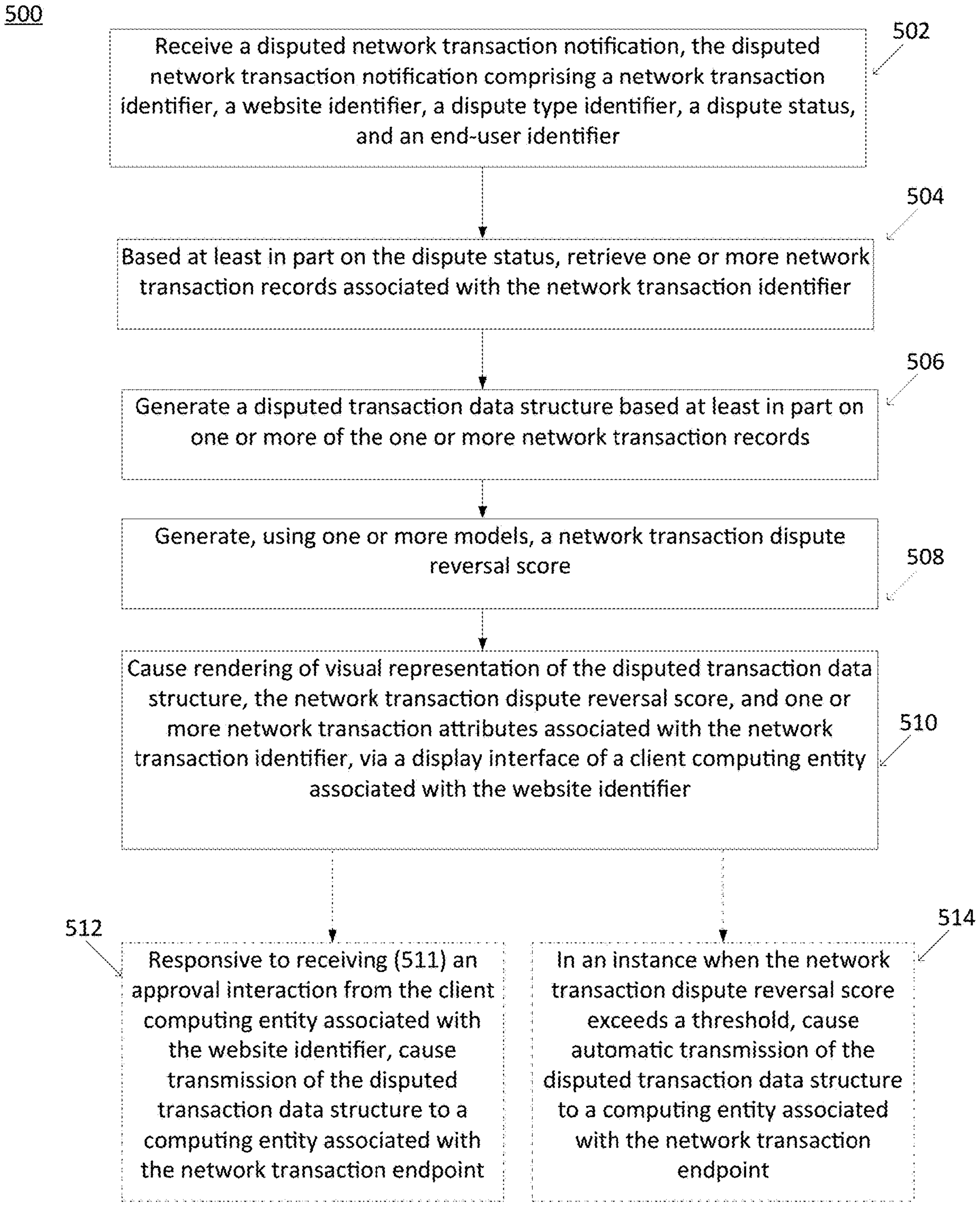
Figure 5B:
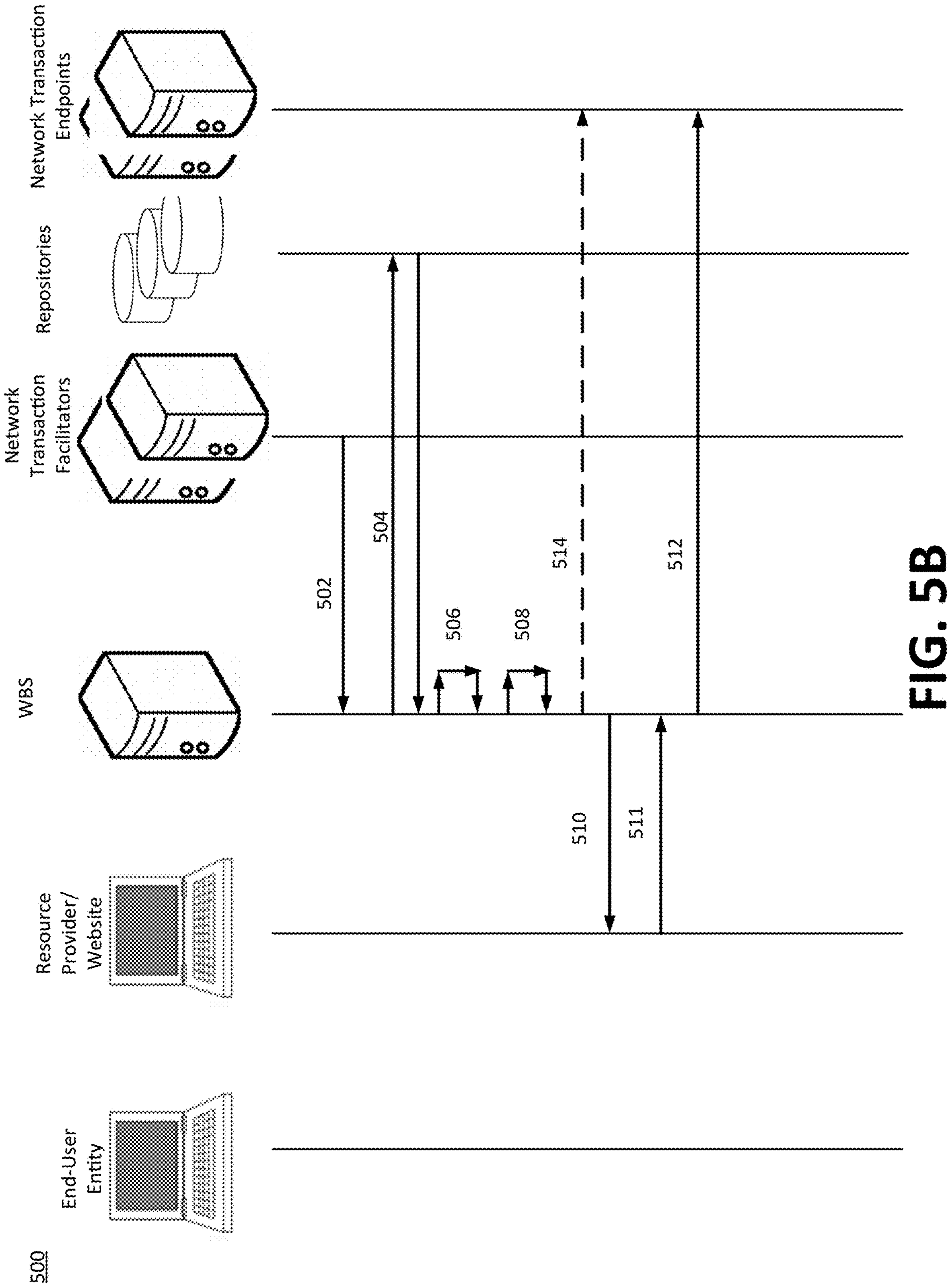
Figure 6A:
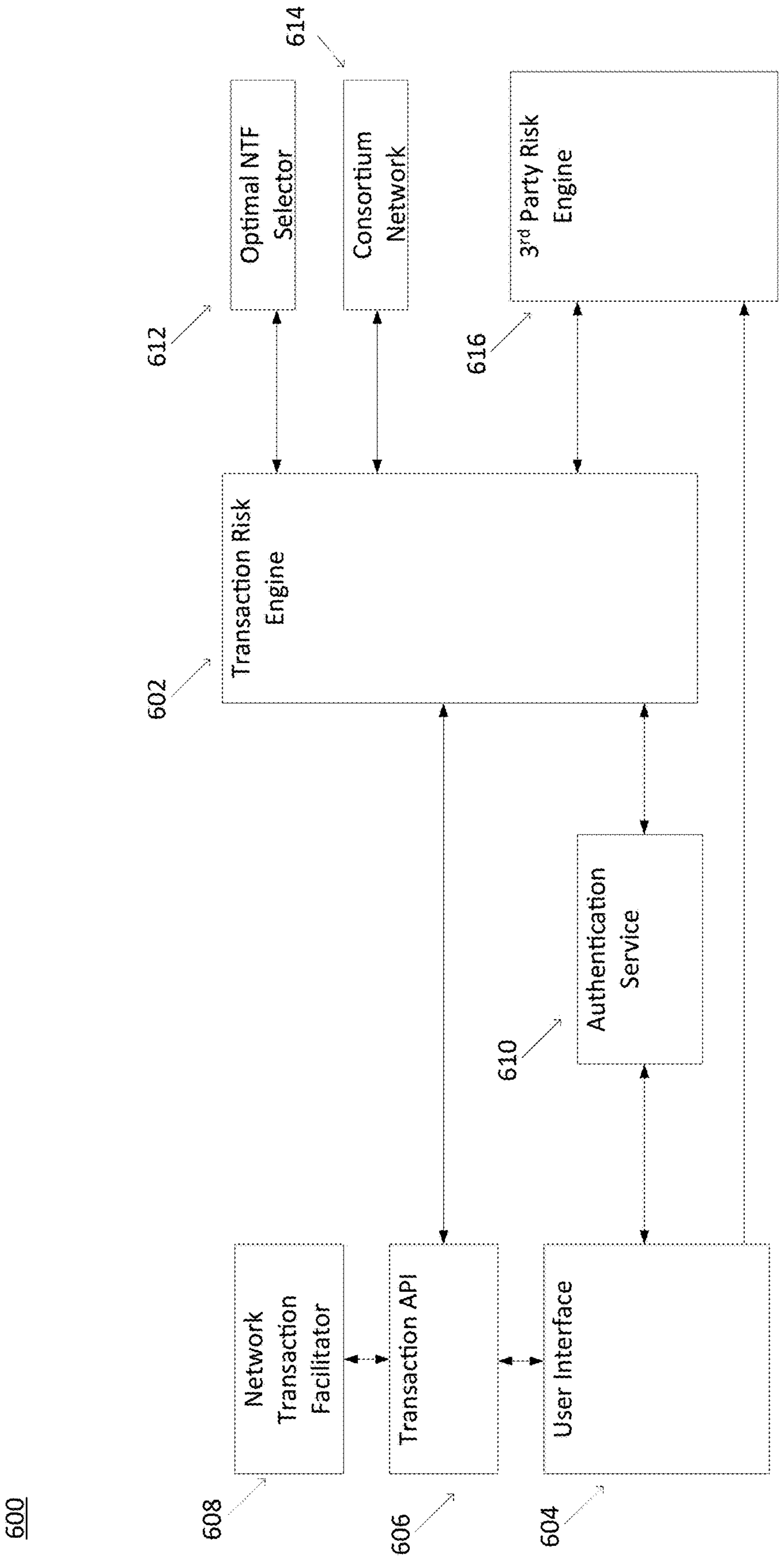
Figure 6B:
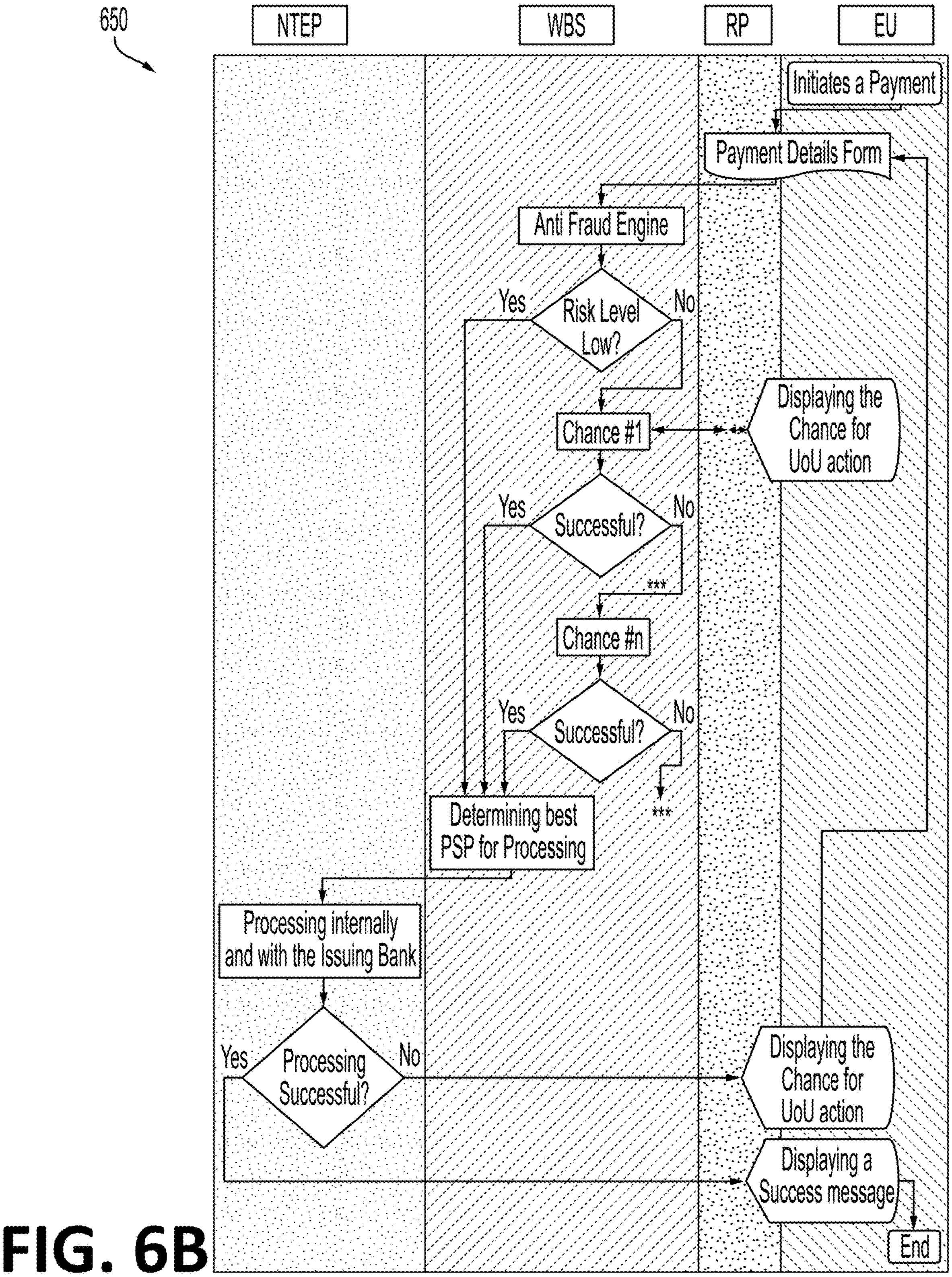
Figure 7A:
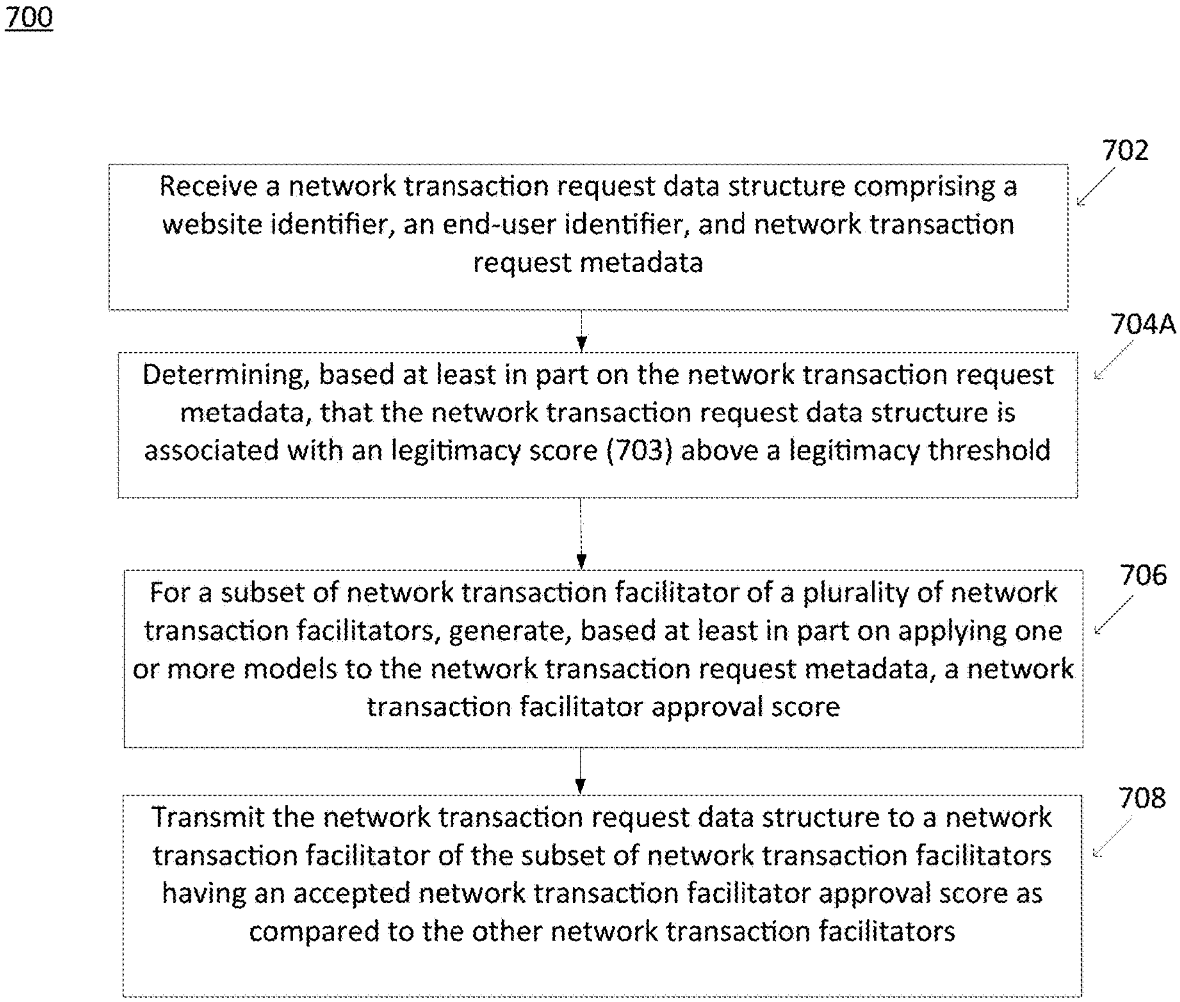
Figure 7B:
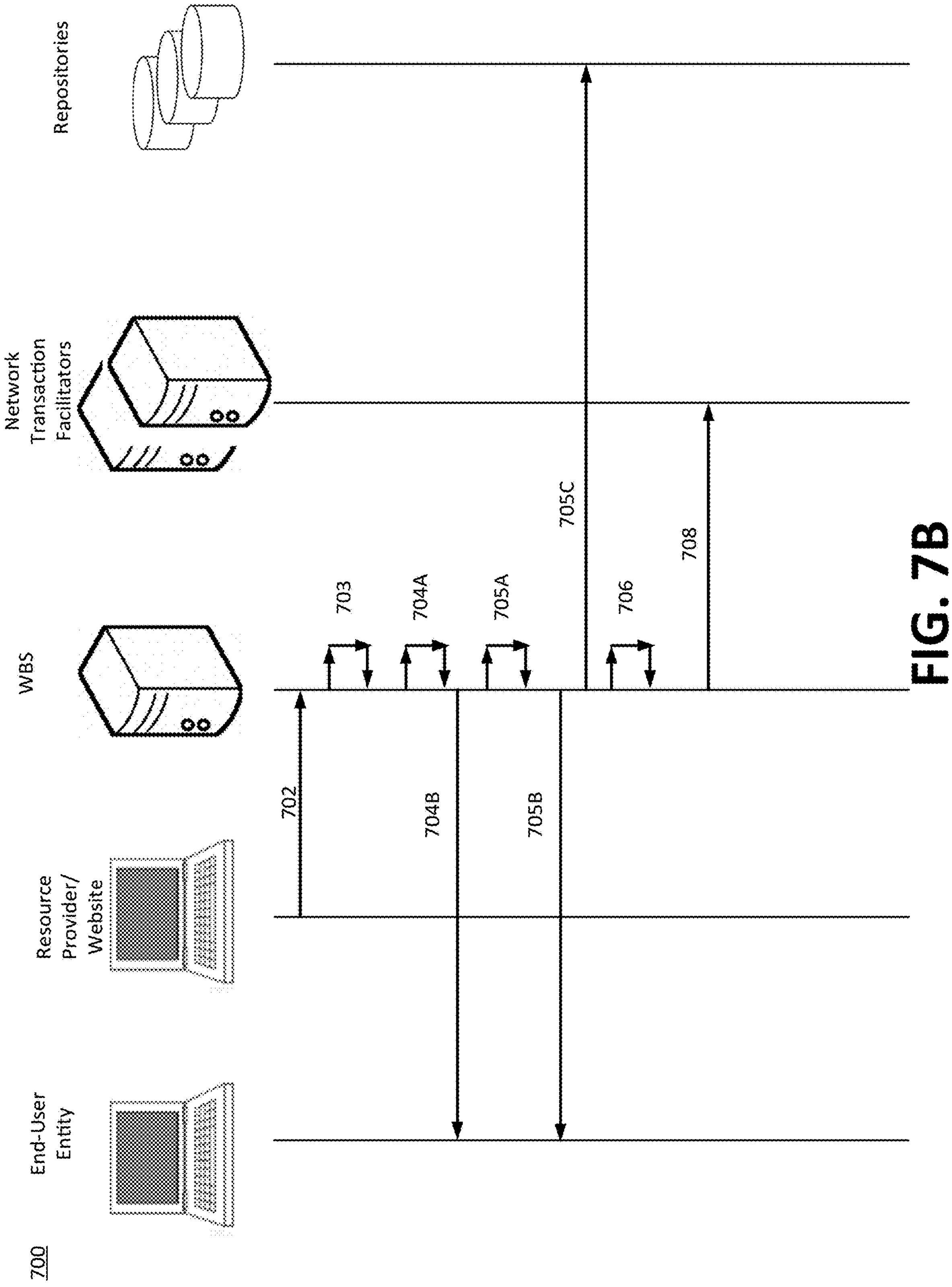
Figure 8:
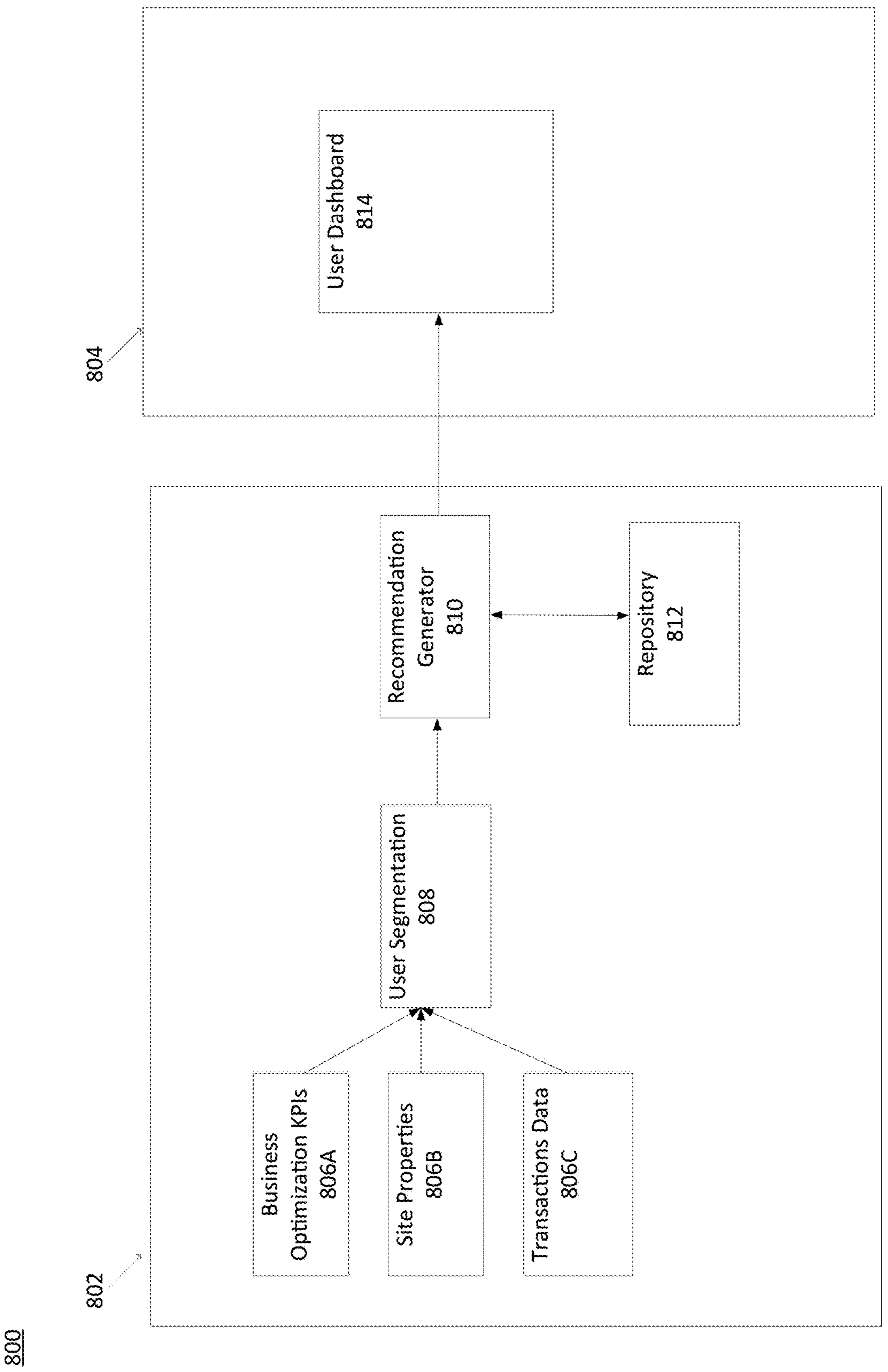
Figure 9A:
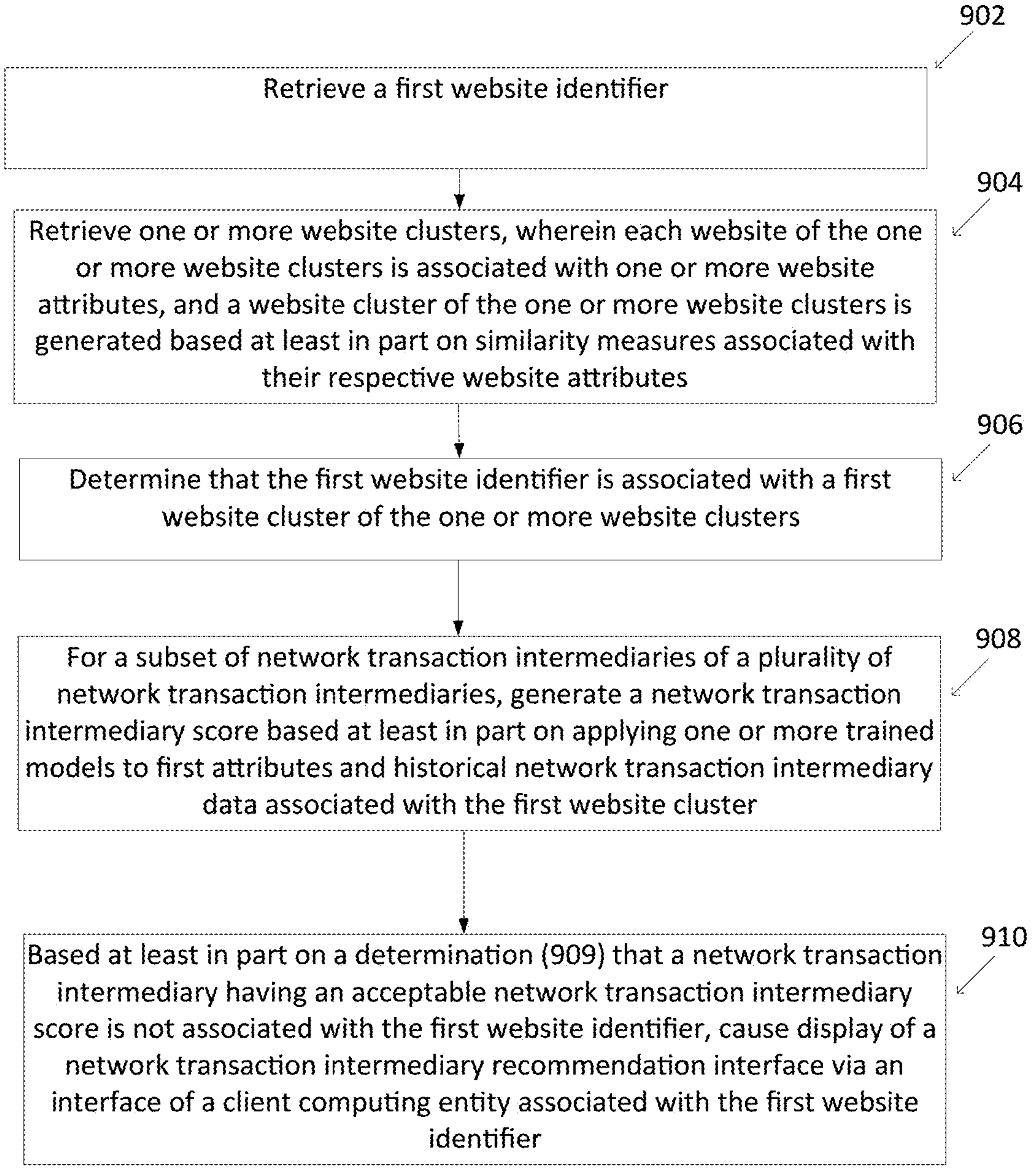
Figure 9B:
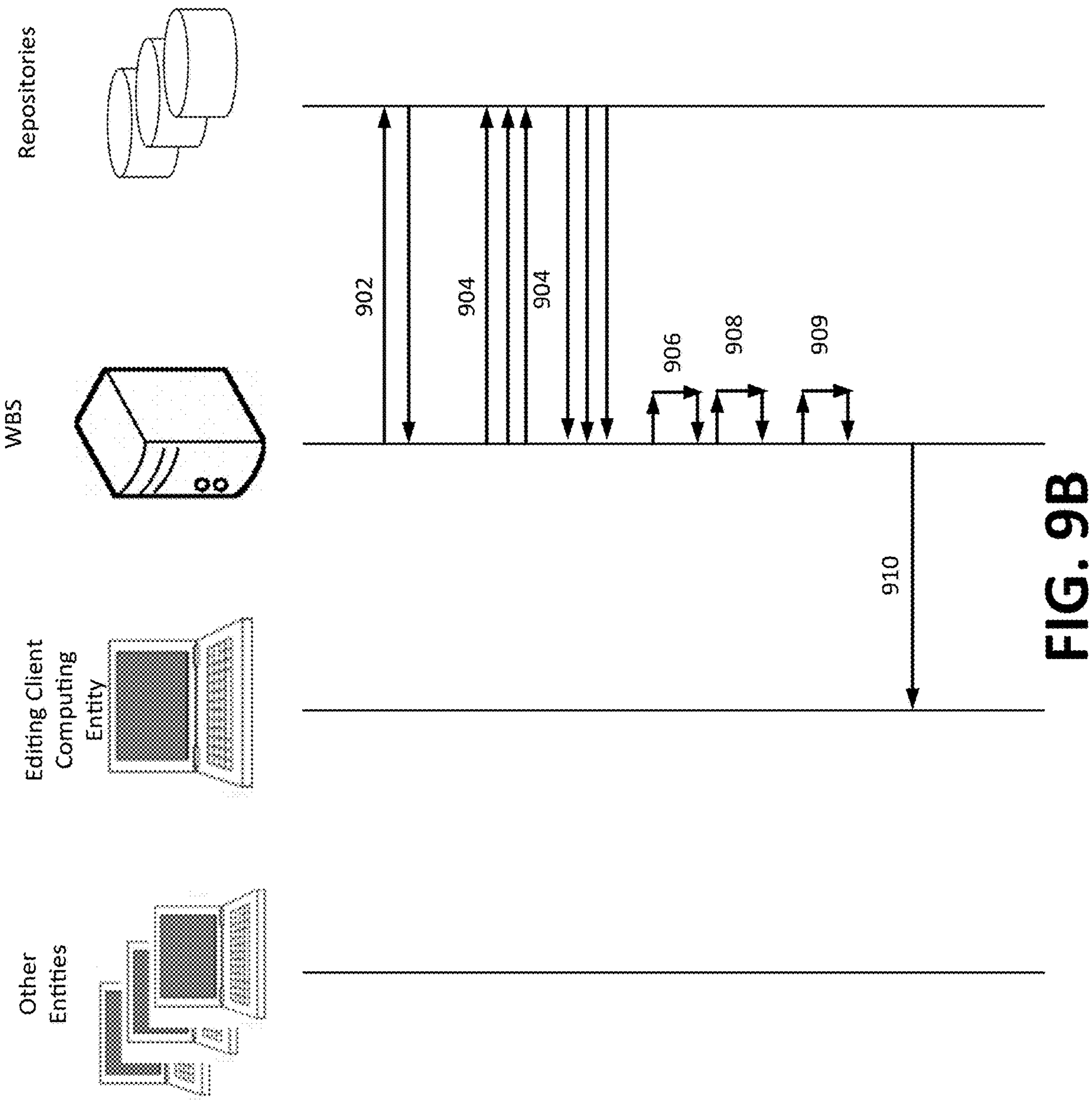
Figure 9E:
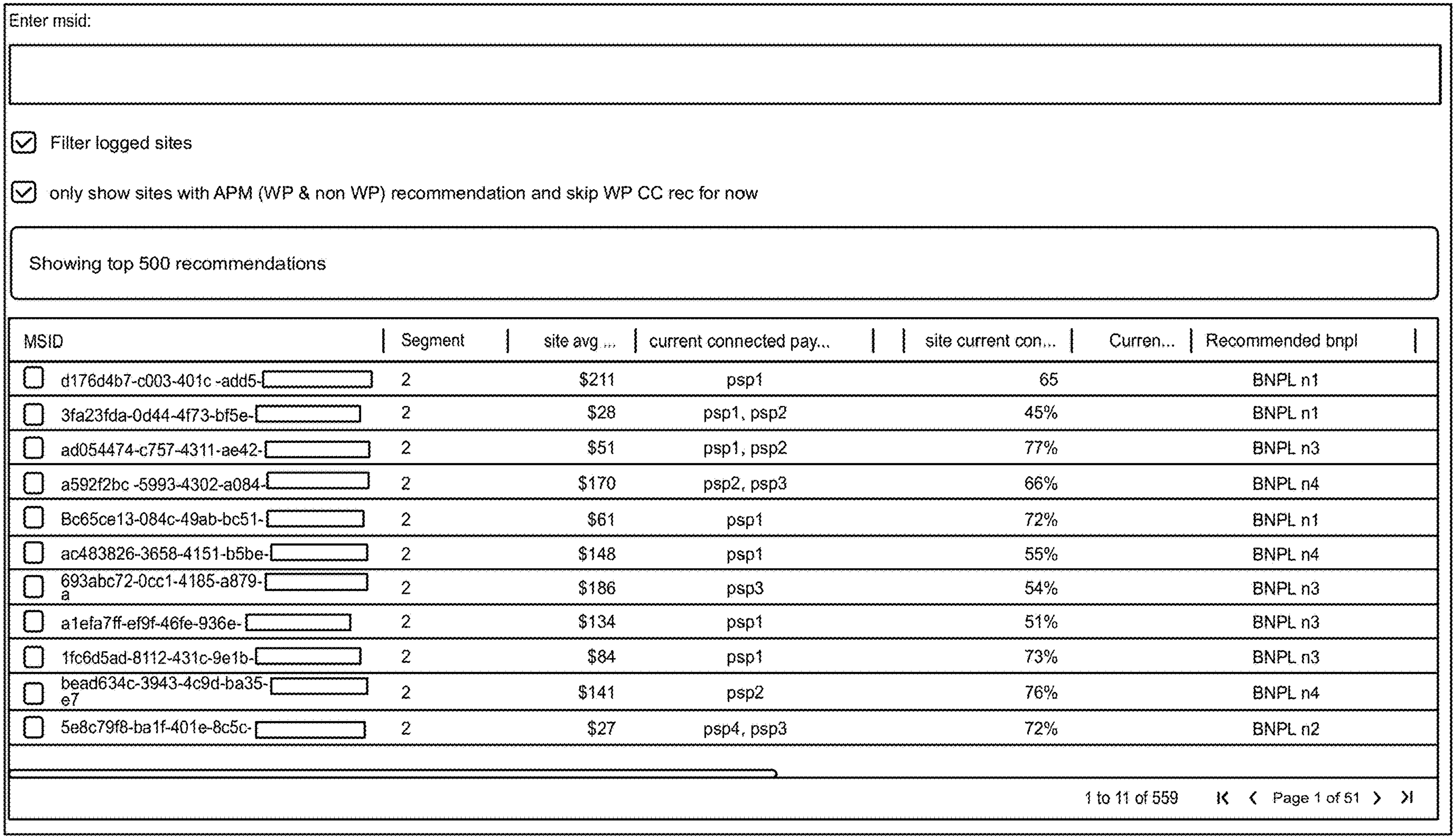
Figure 9F:
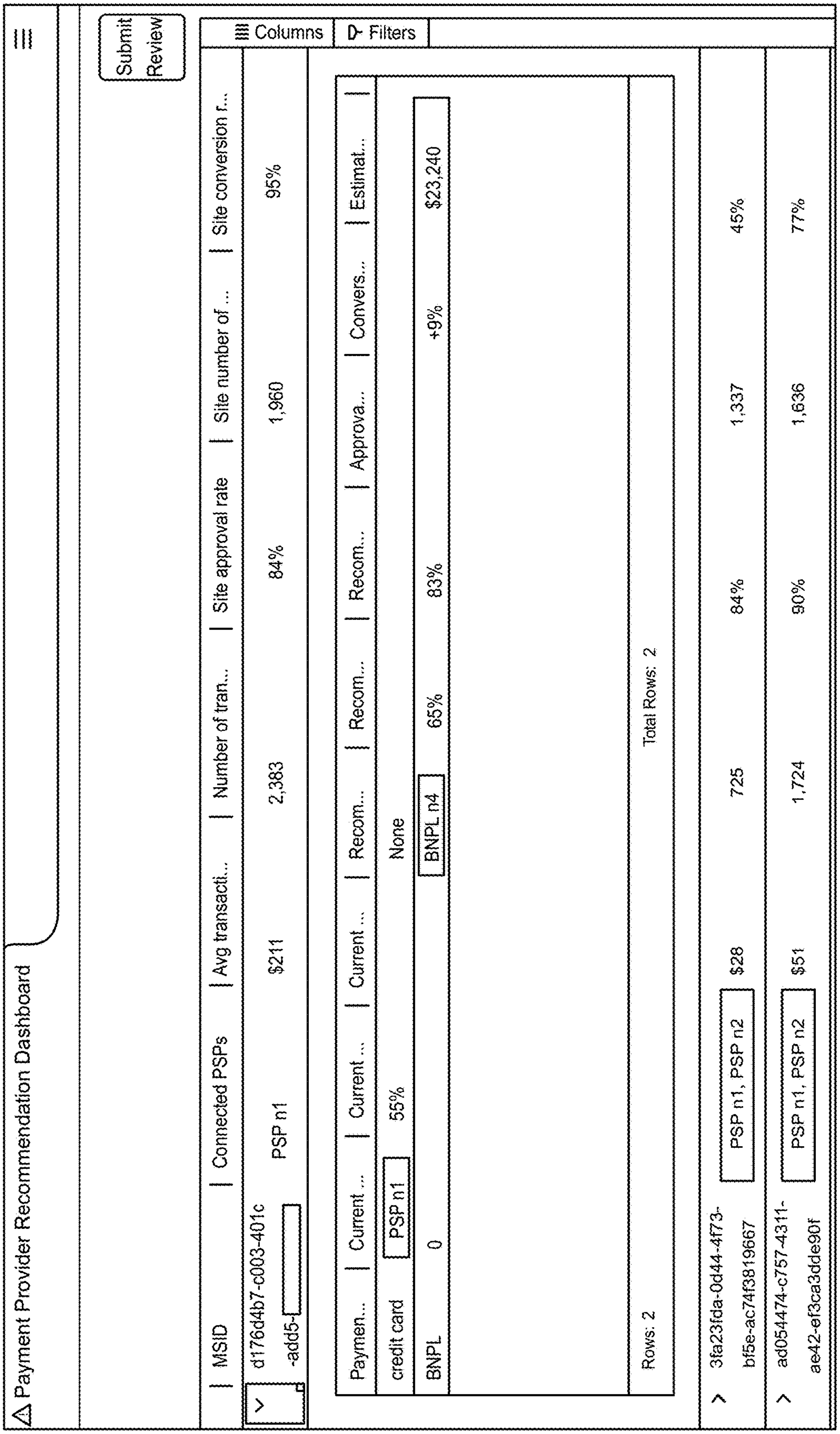
Figure 10:
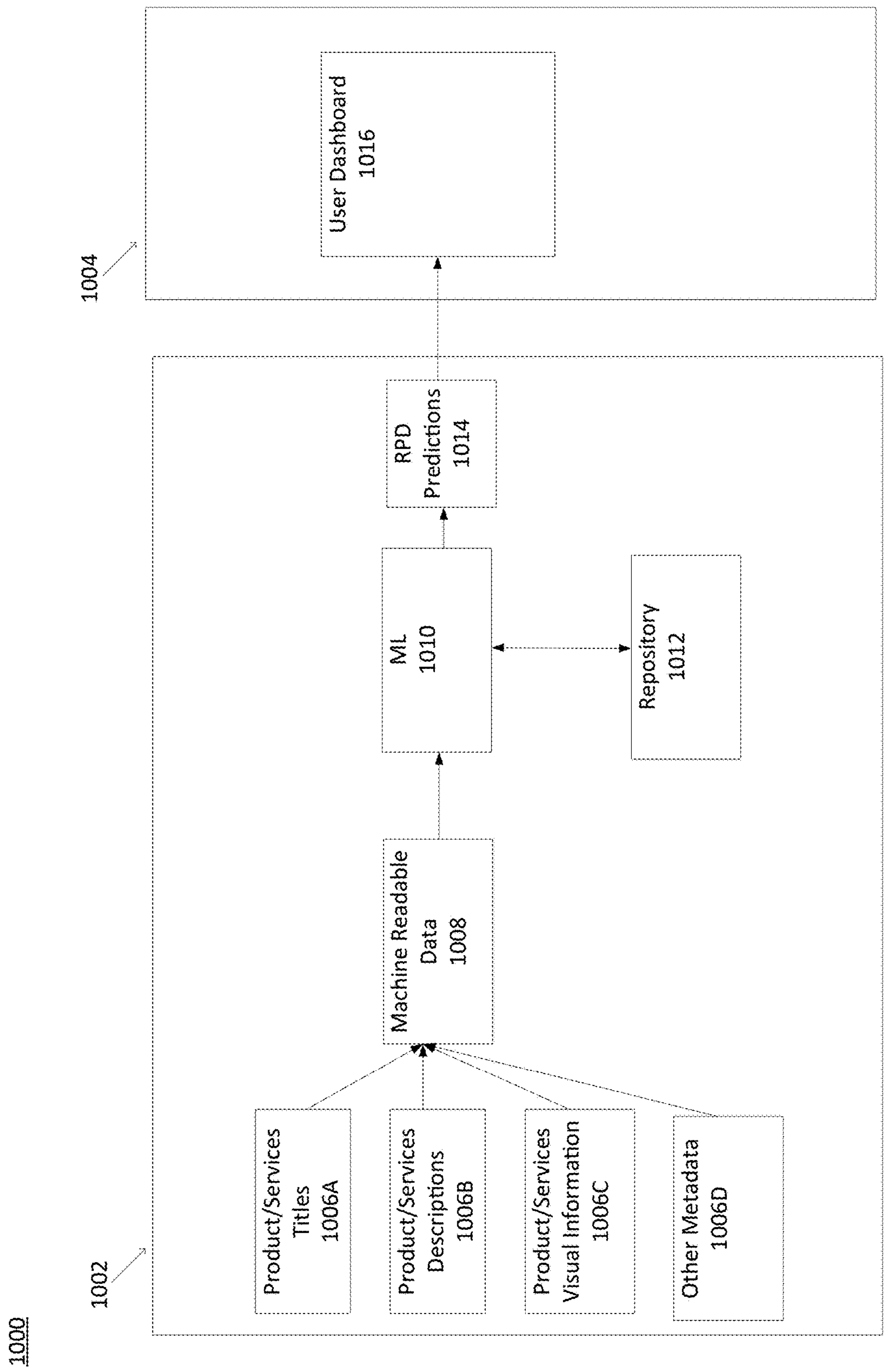
Figure 11A:
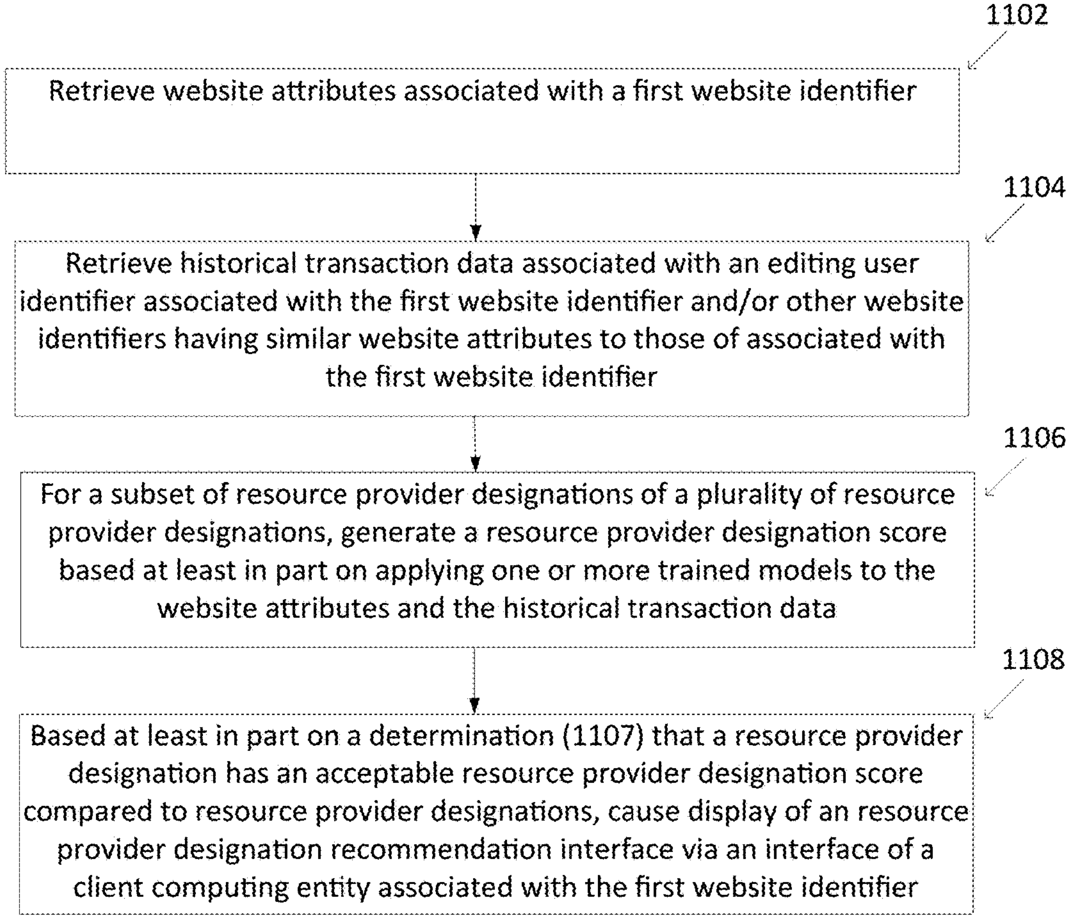
Figure 11B:
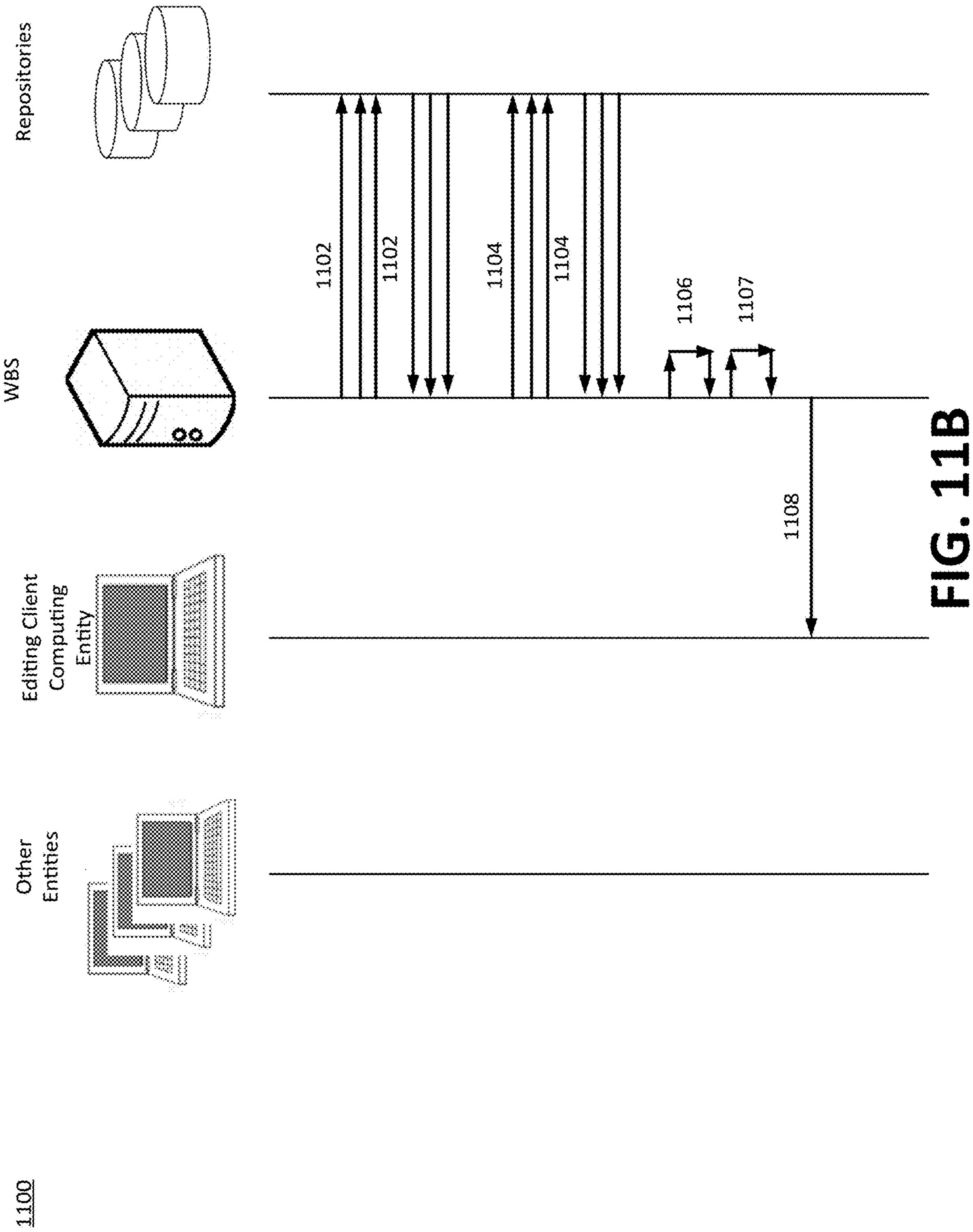
Figure 12:
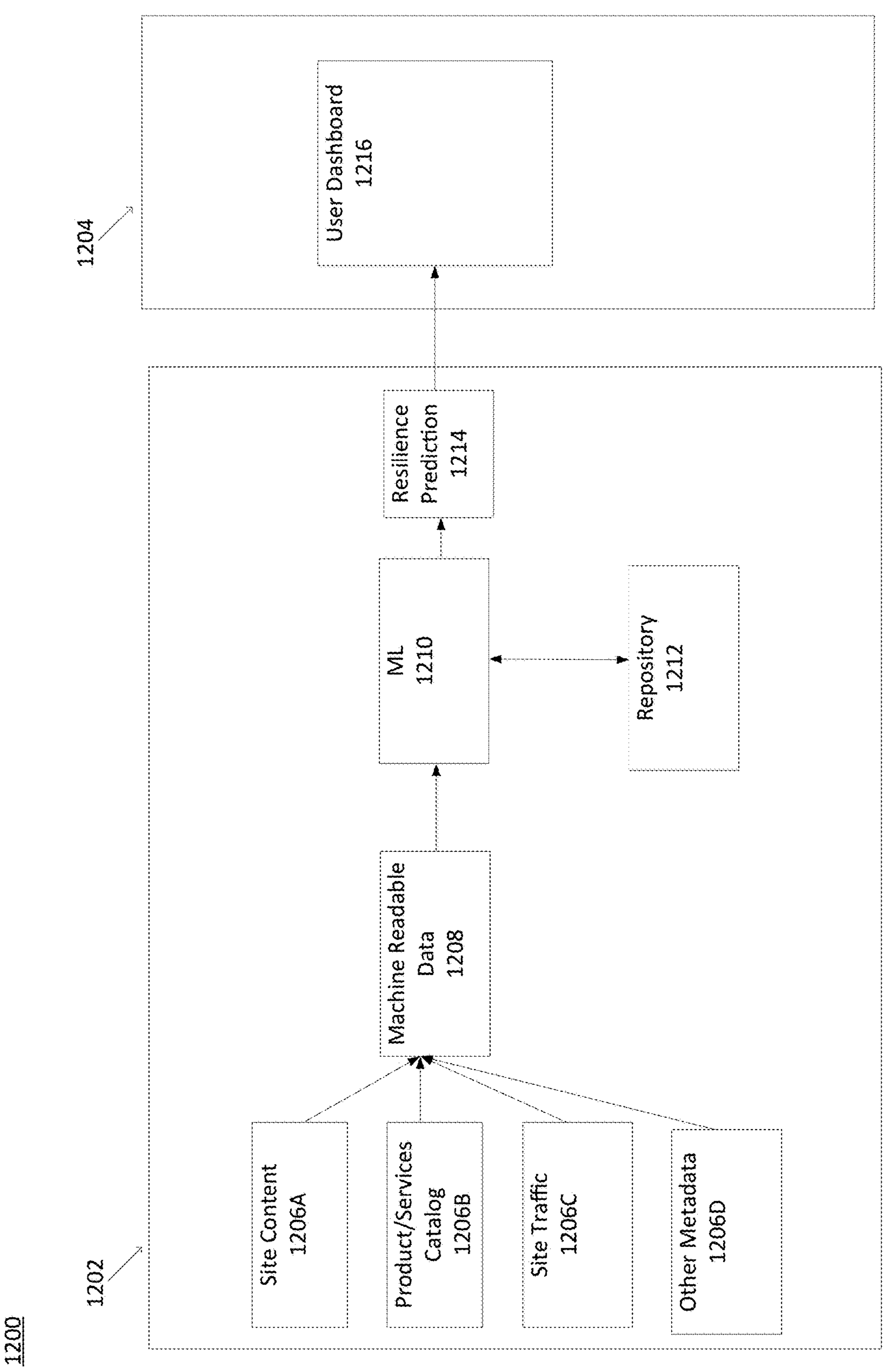
Figure 13A:
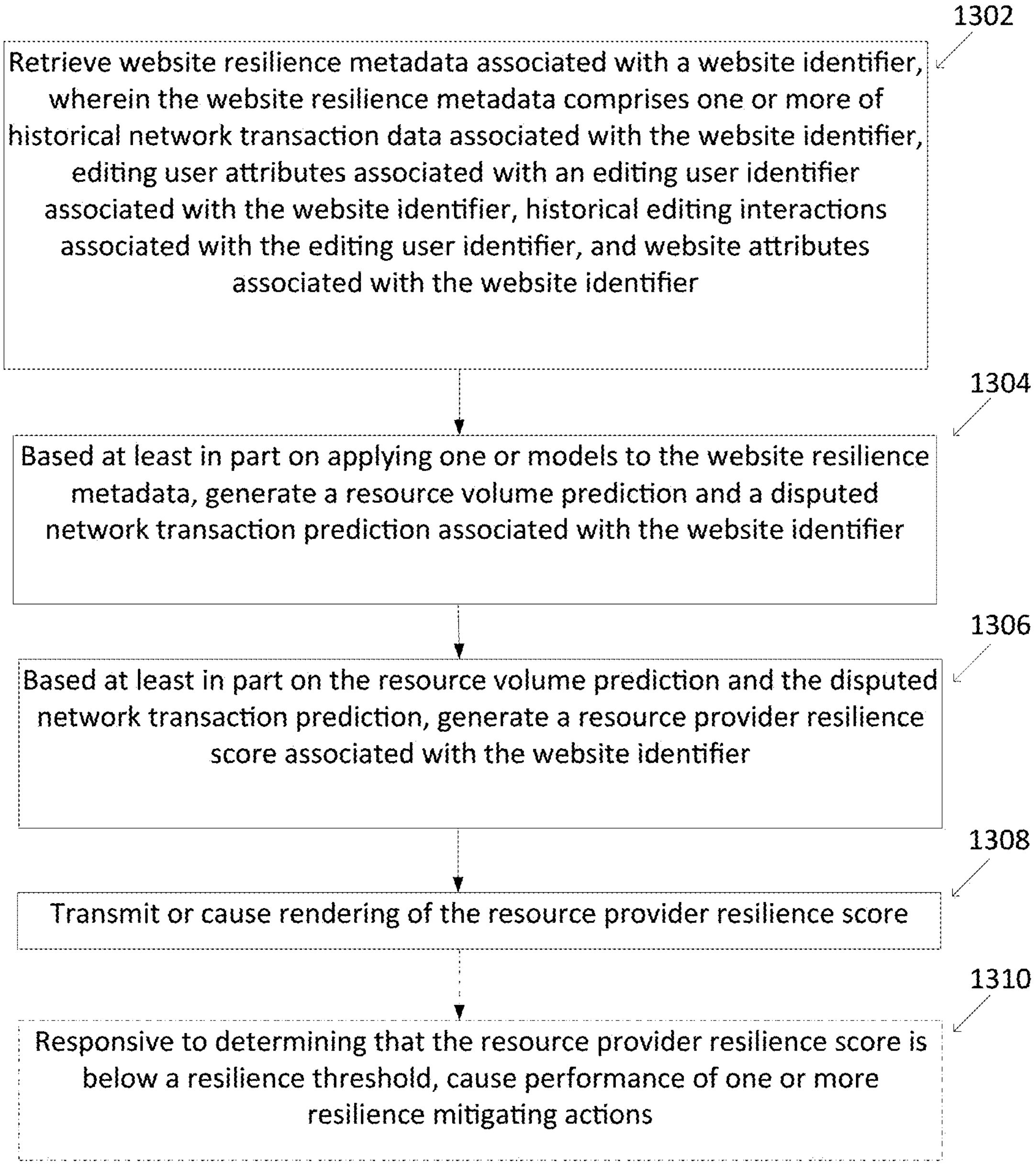
Figure 13B:
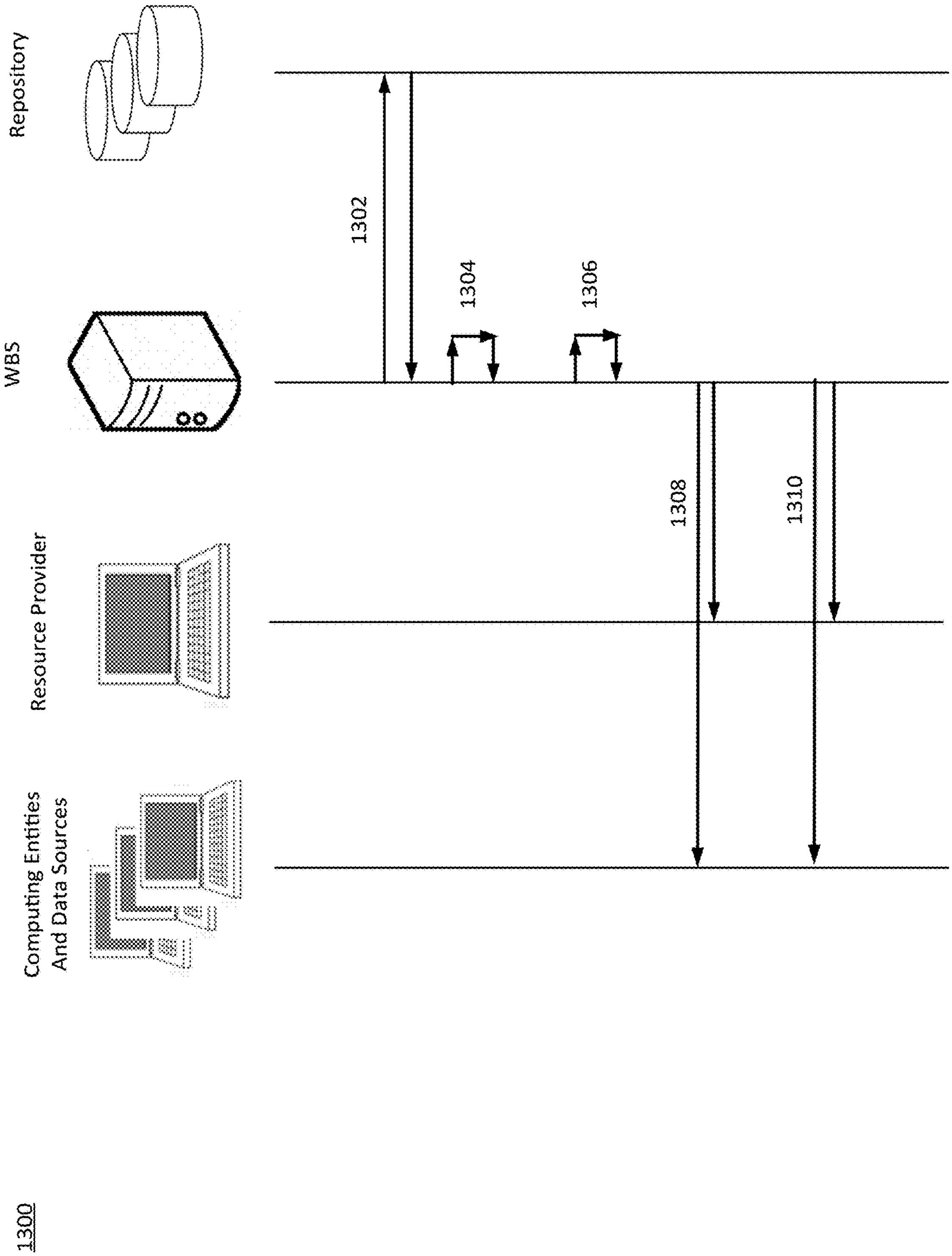
Figure 14:
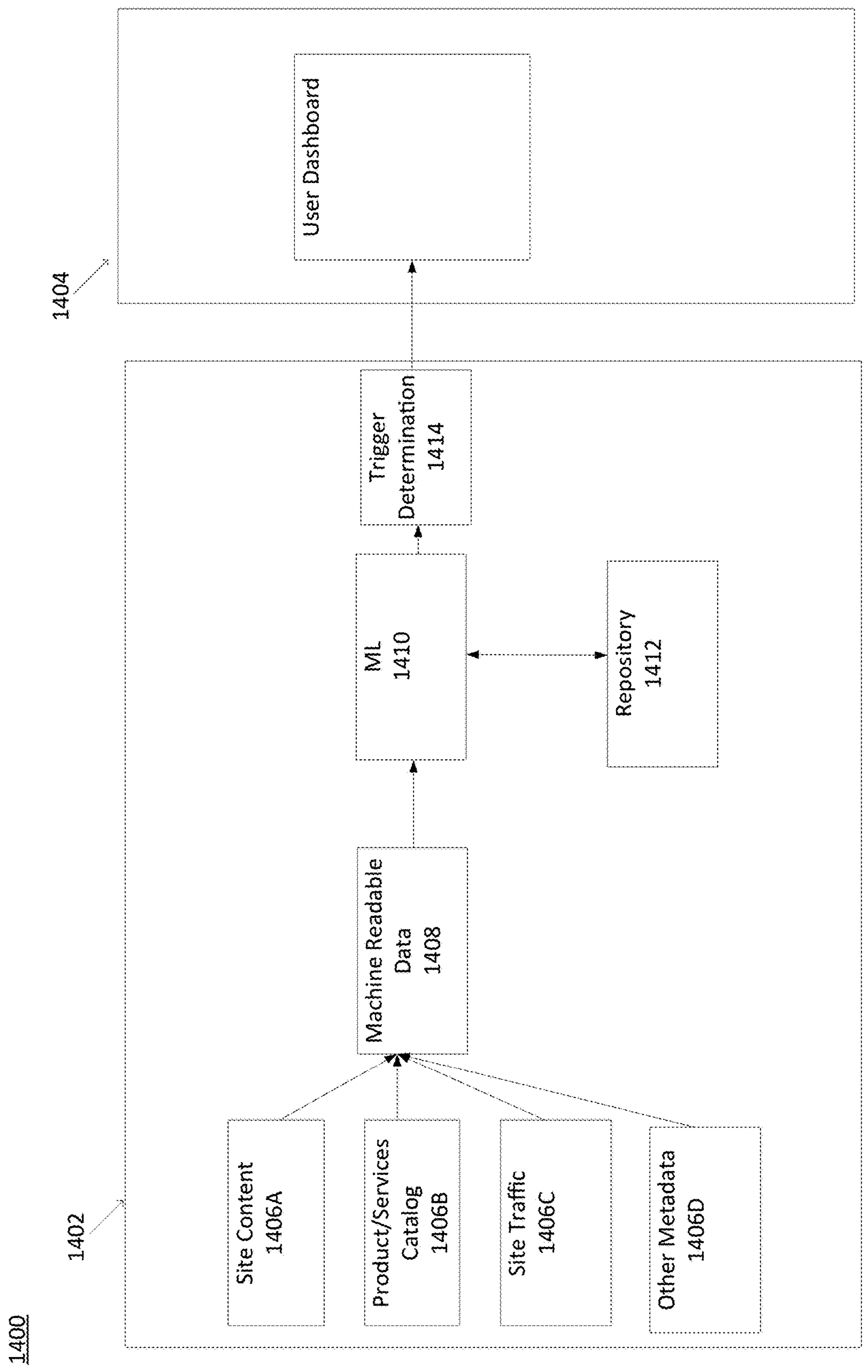
Figure 15A:
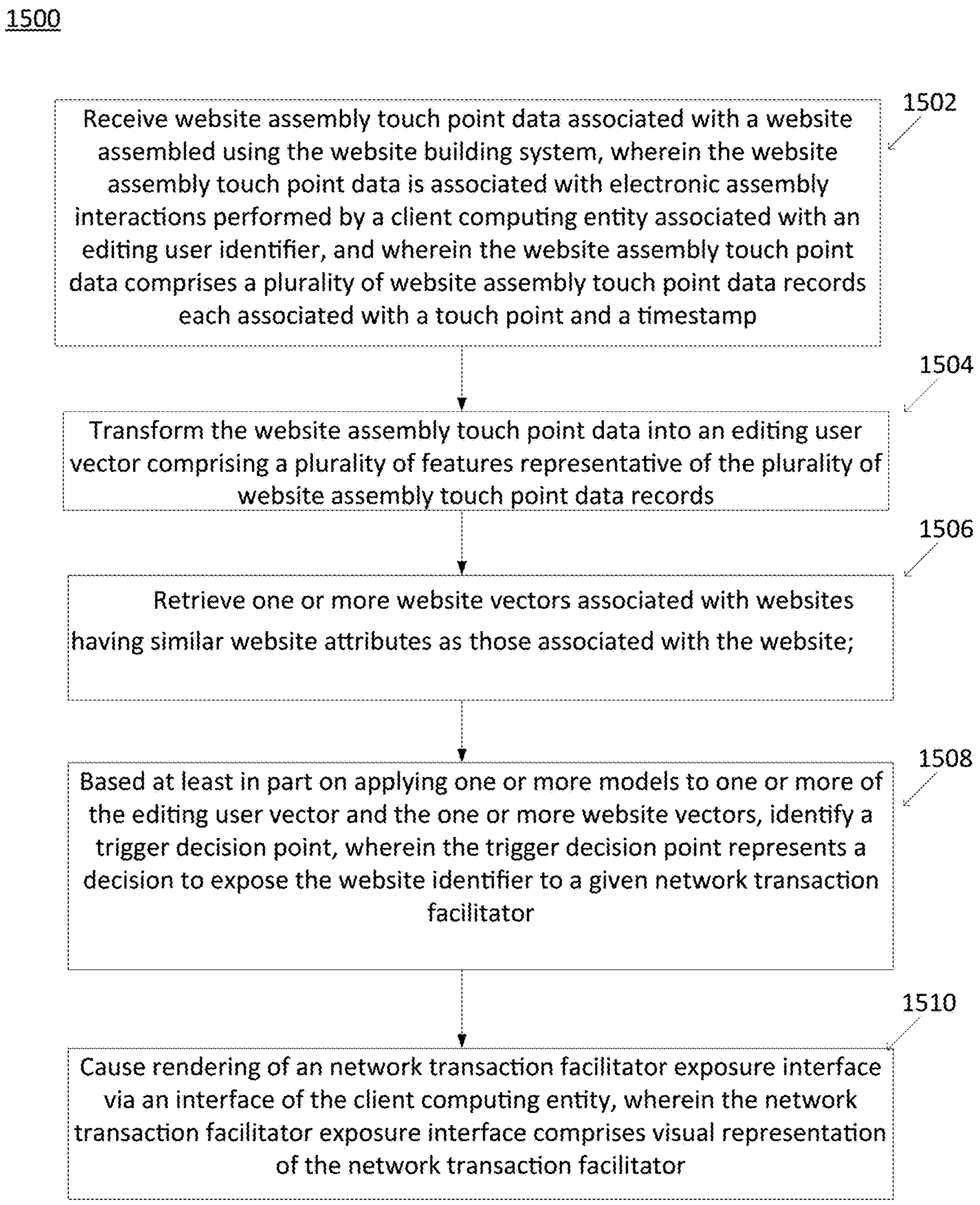
Figure 15B:
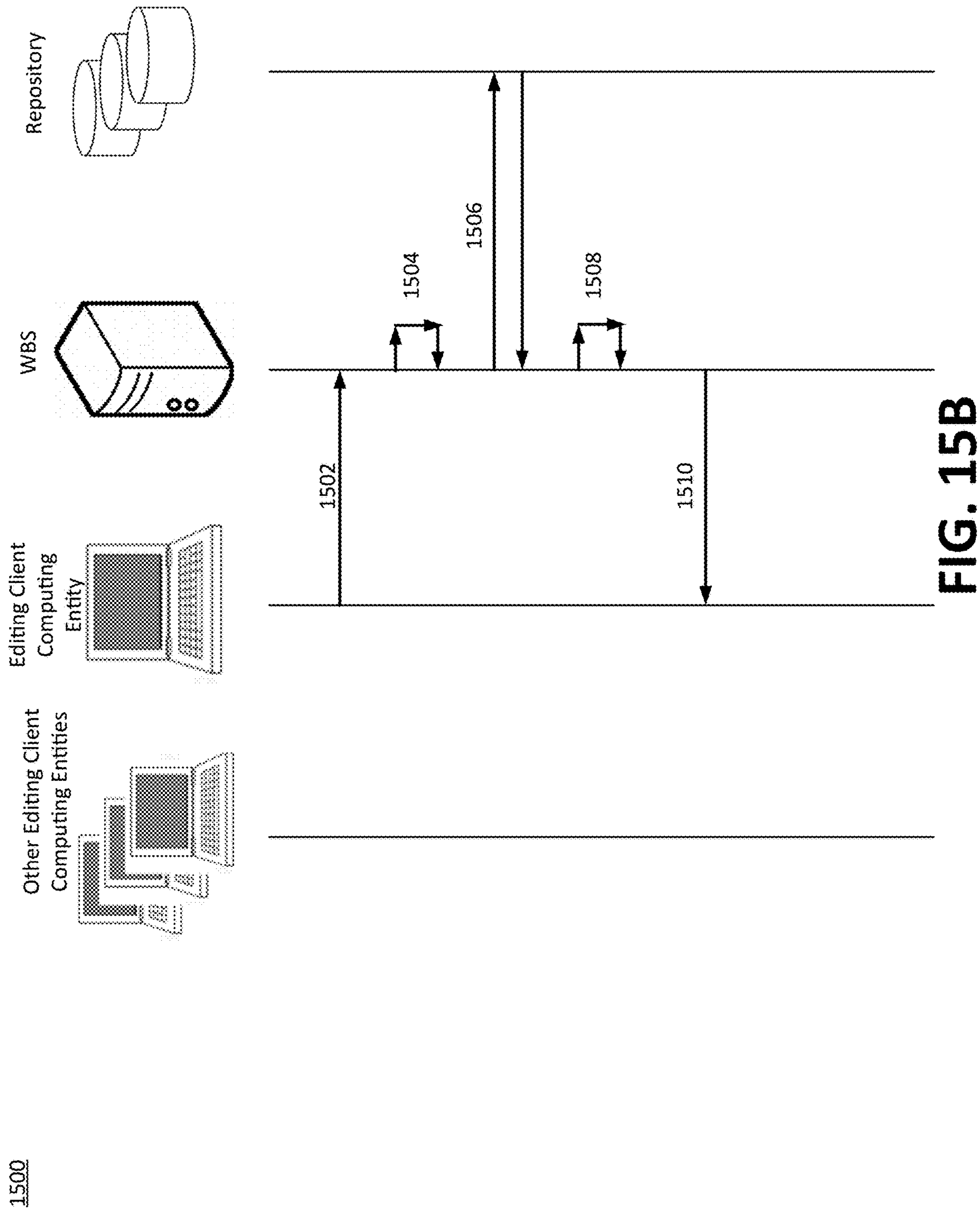
Figure 16A:
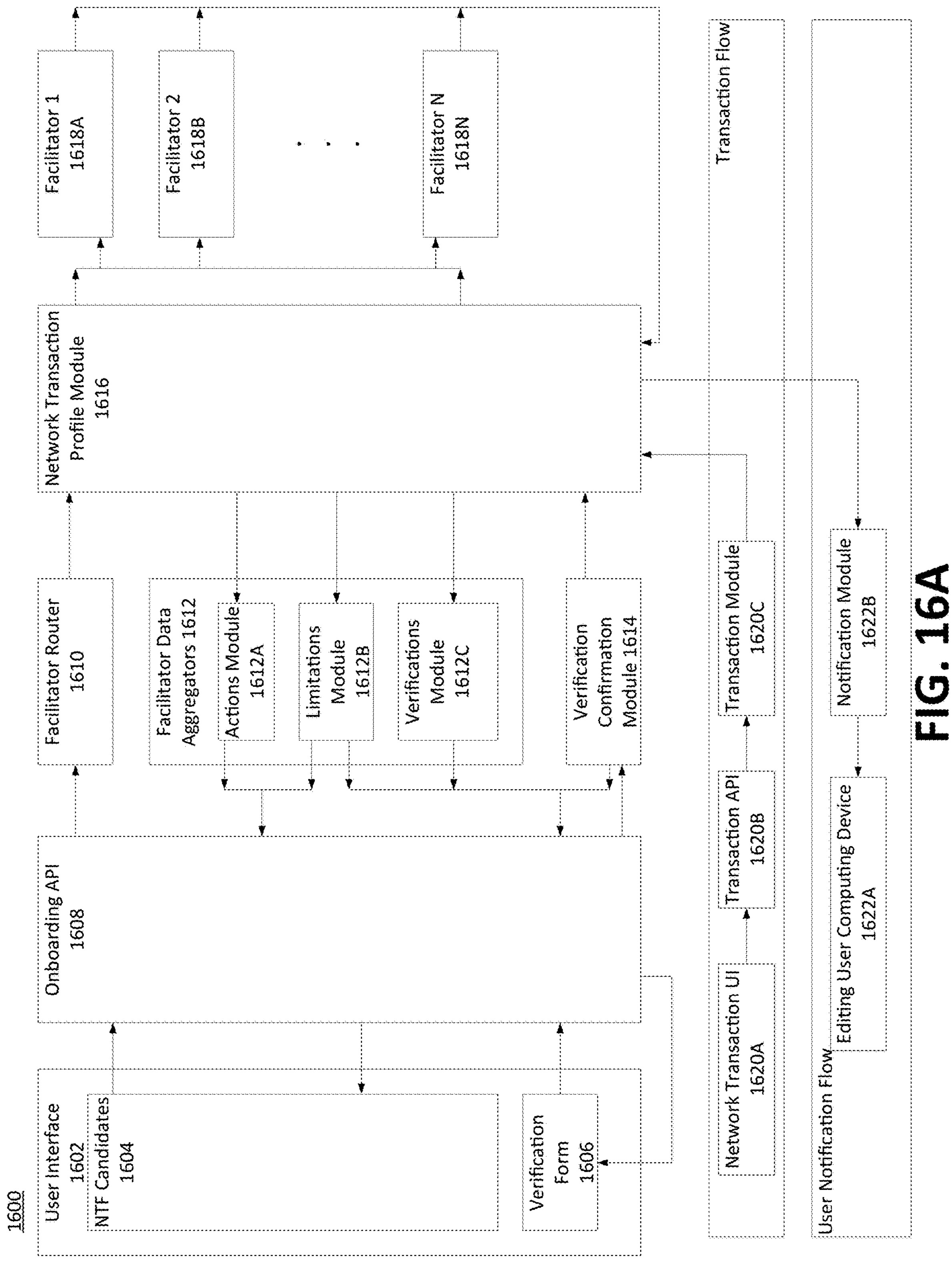
Figure 16B:
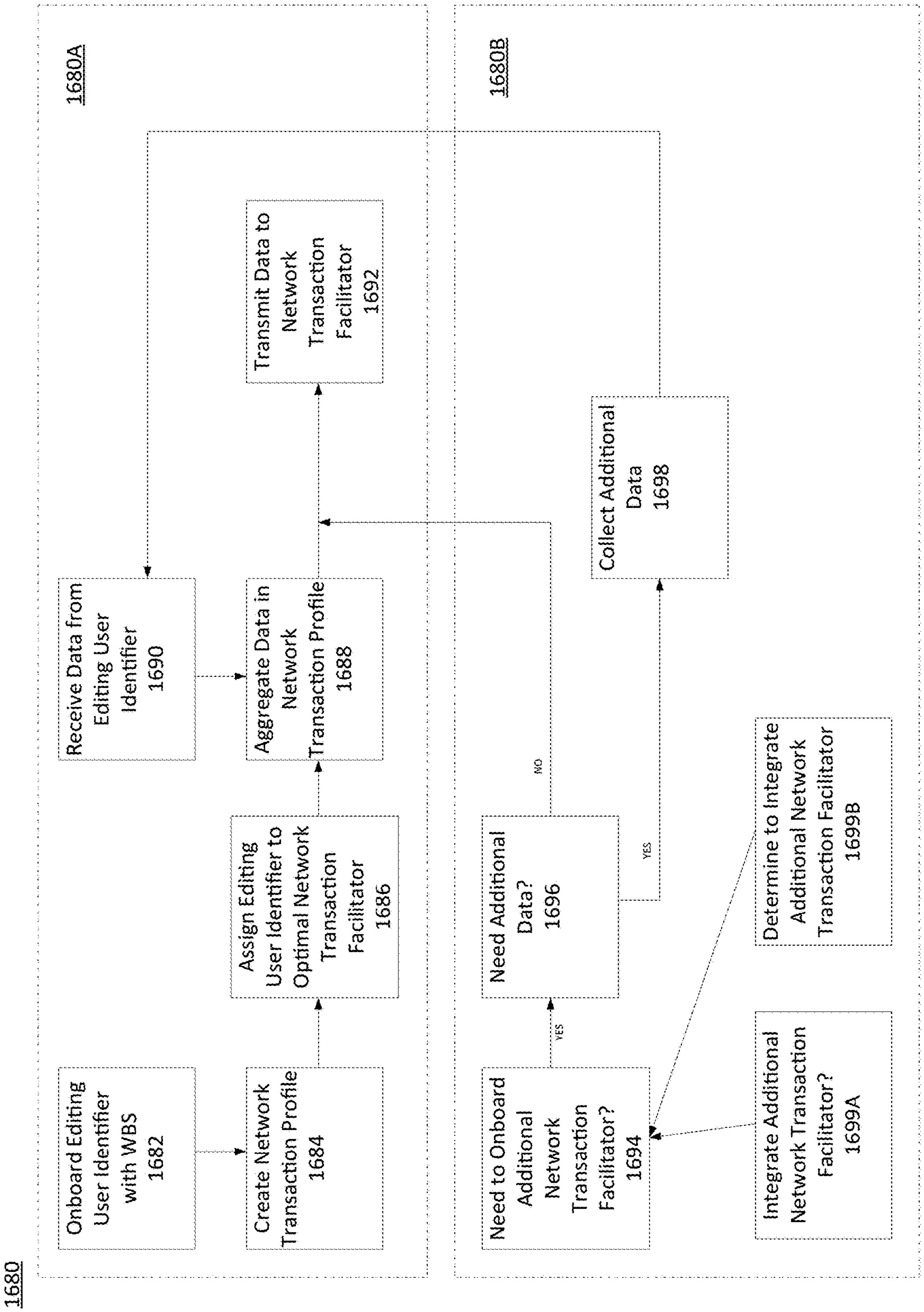
Figure 17A:
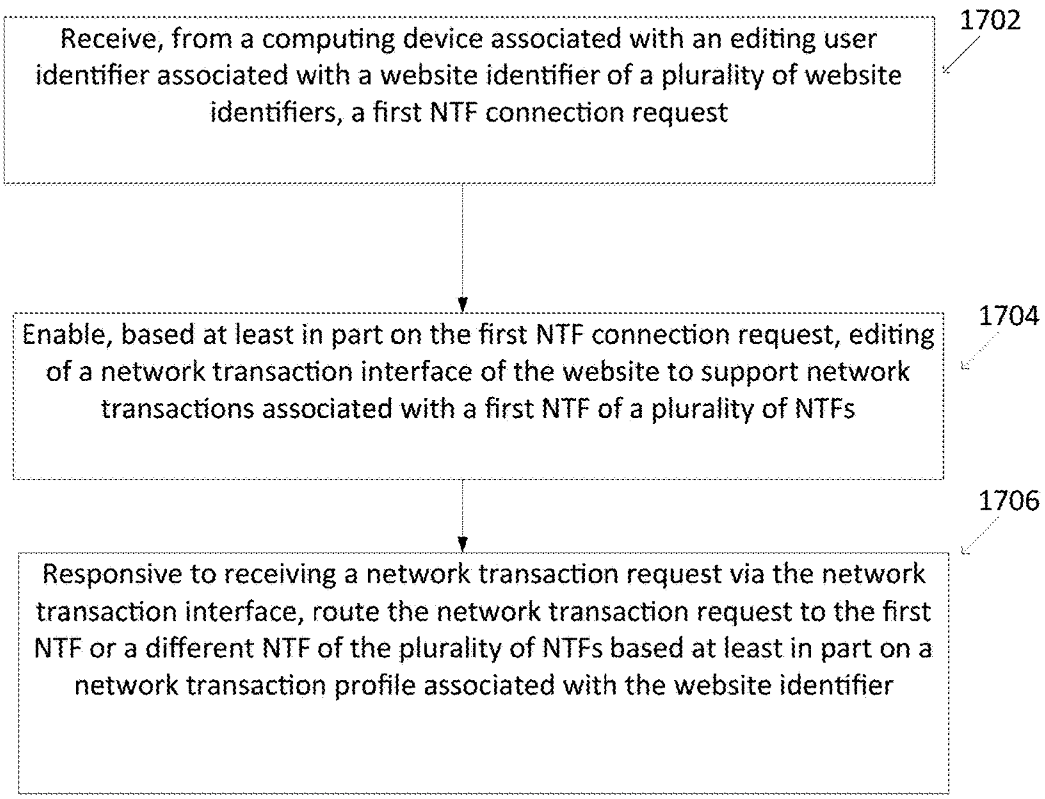
Figure 17B:
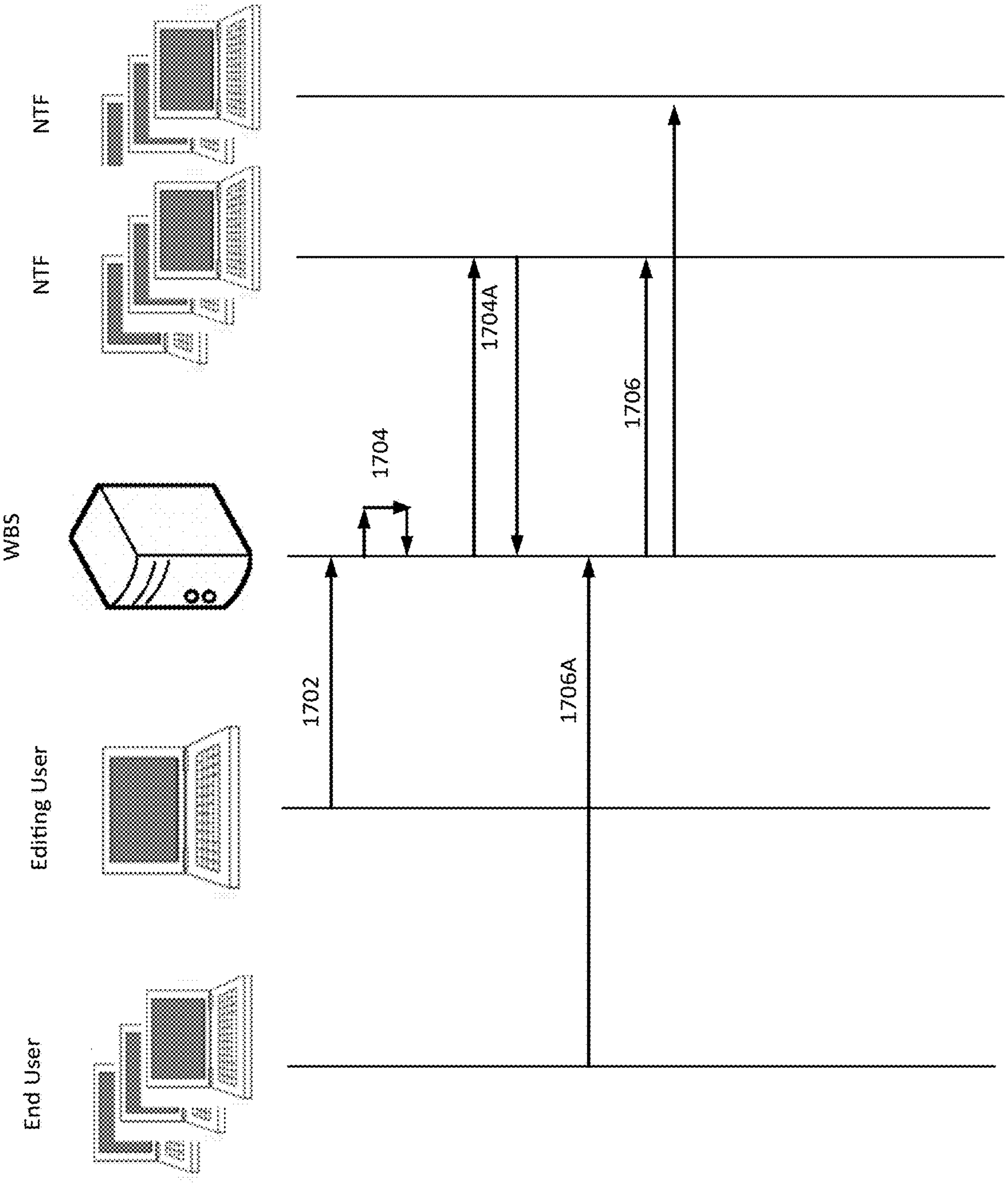
Figure 18:
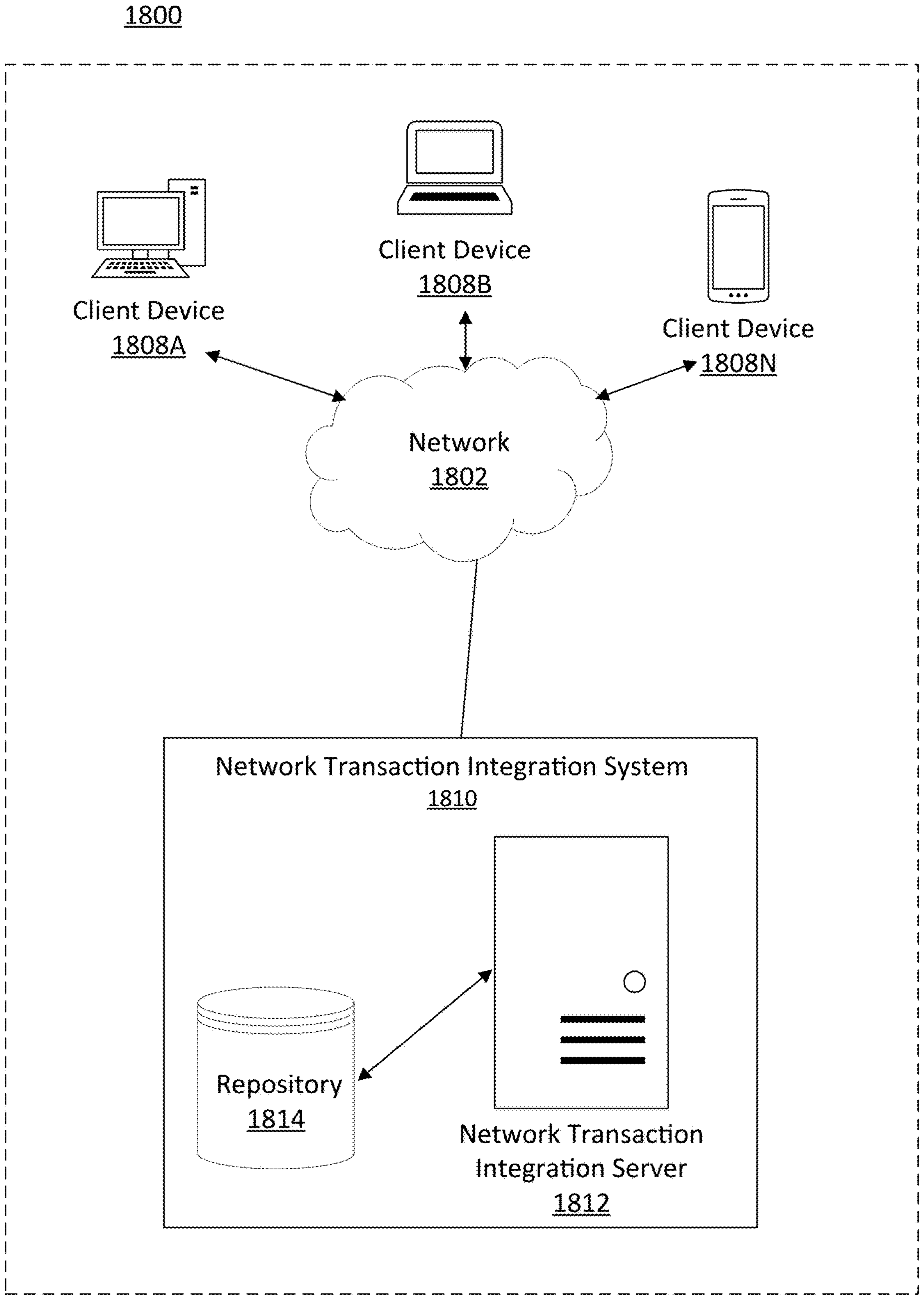
Figure 19:
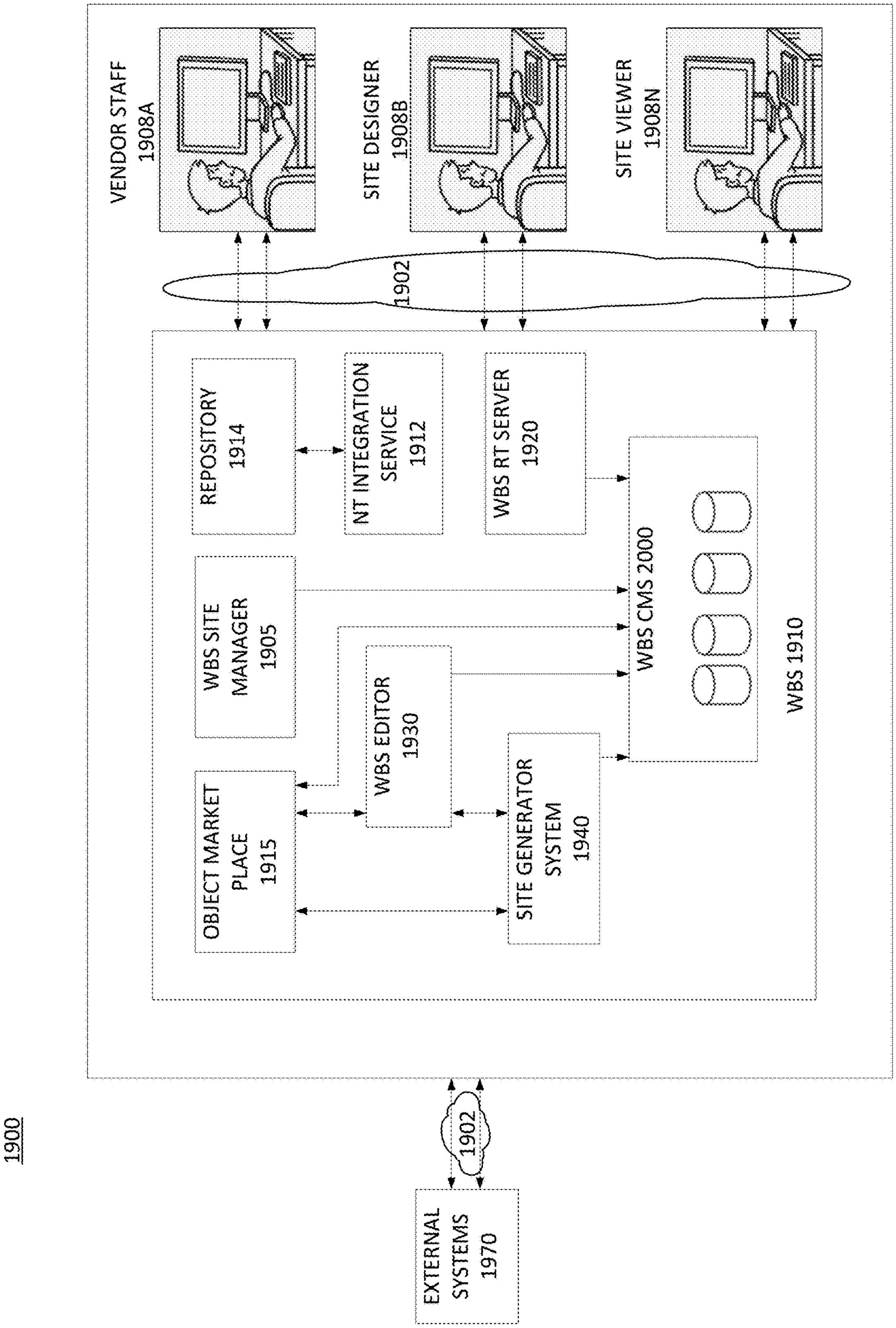
Figure 20:
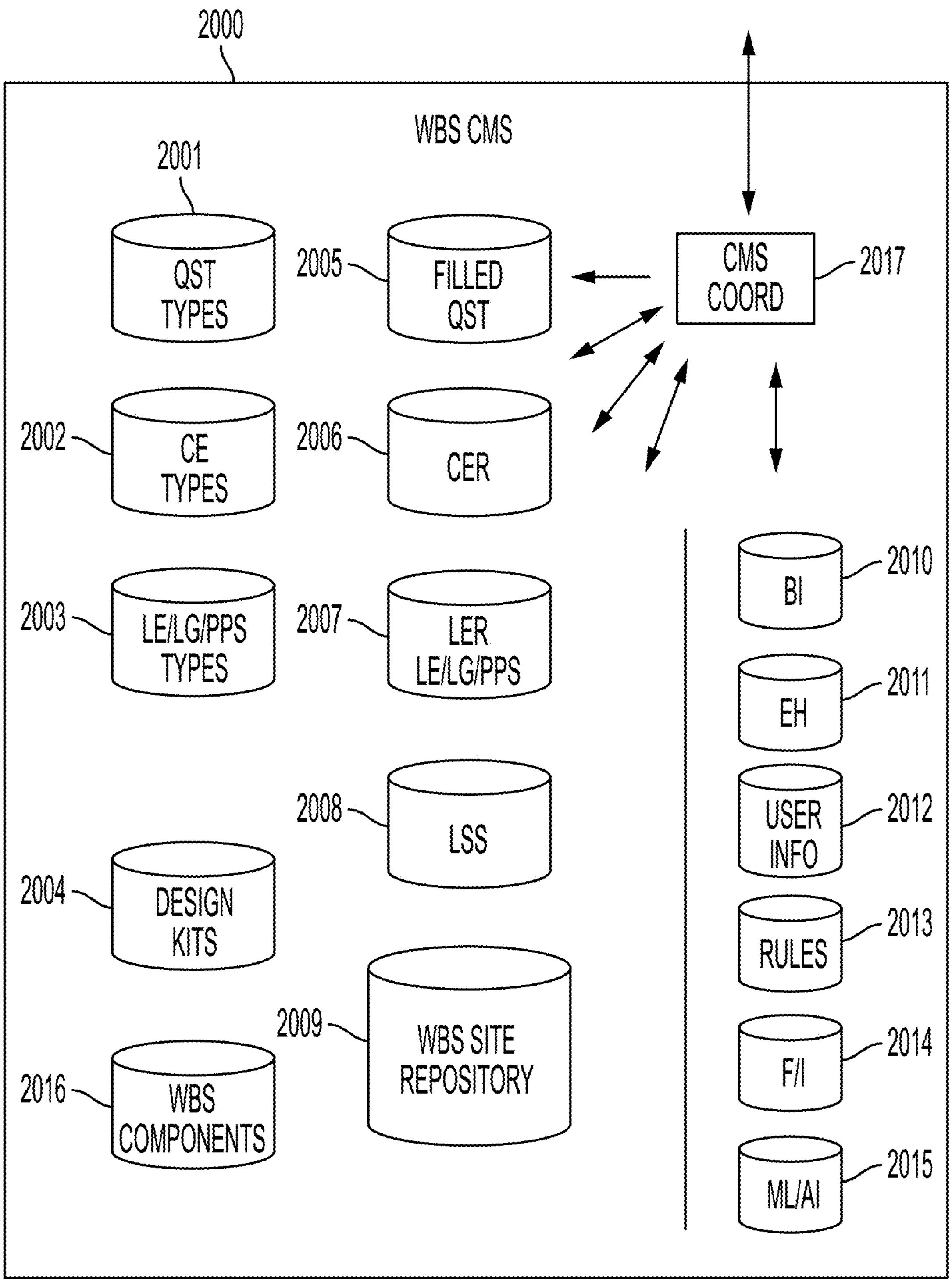
Figure 21:
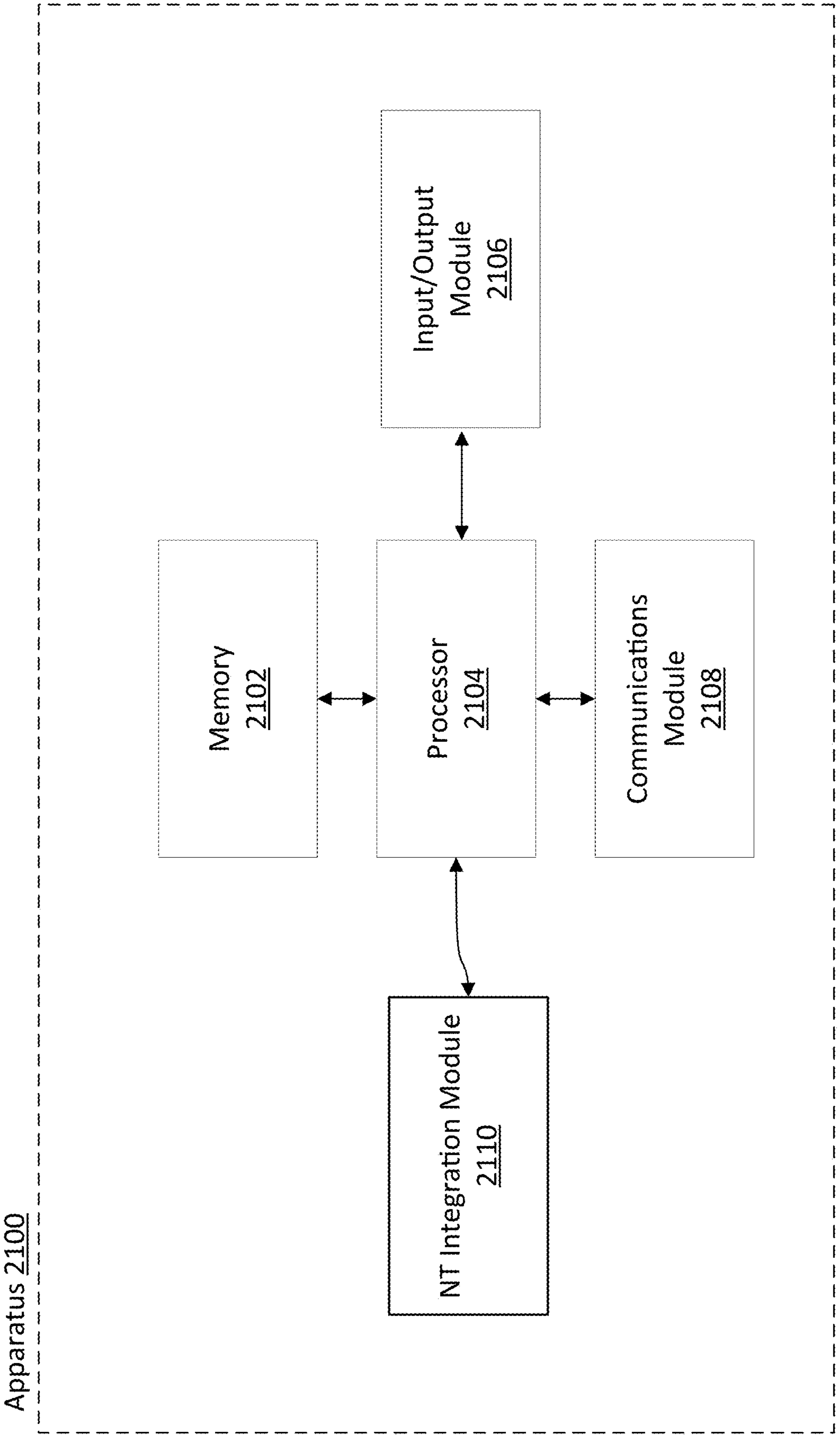
Figure 22:
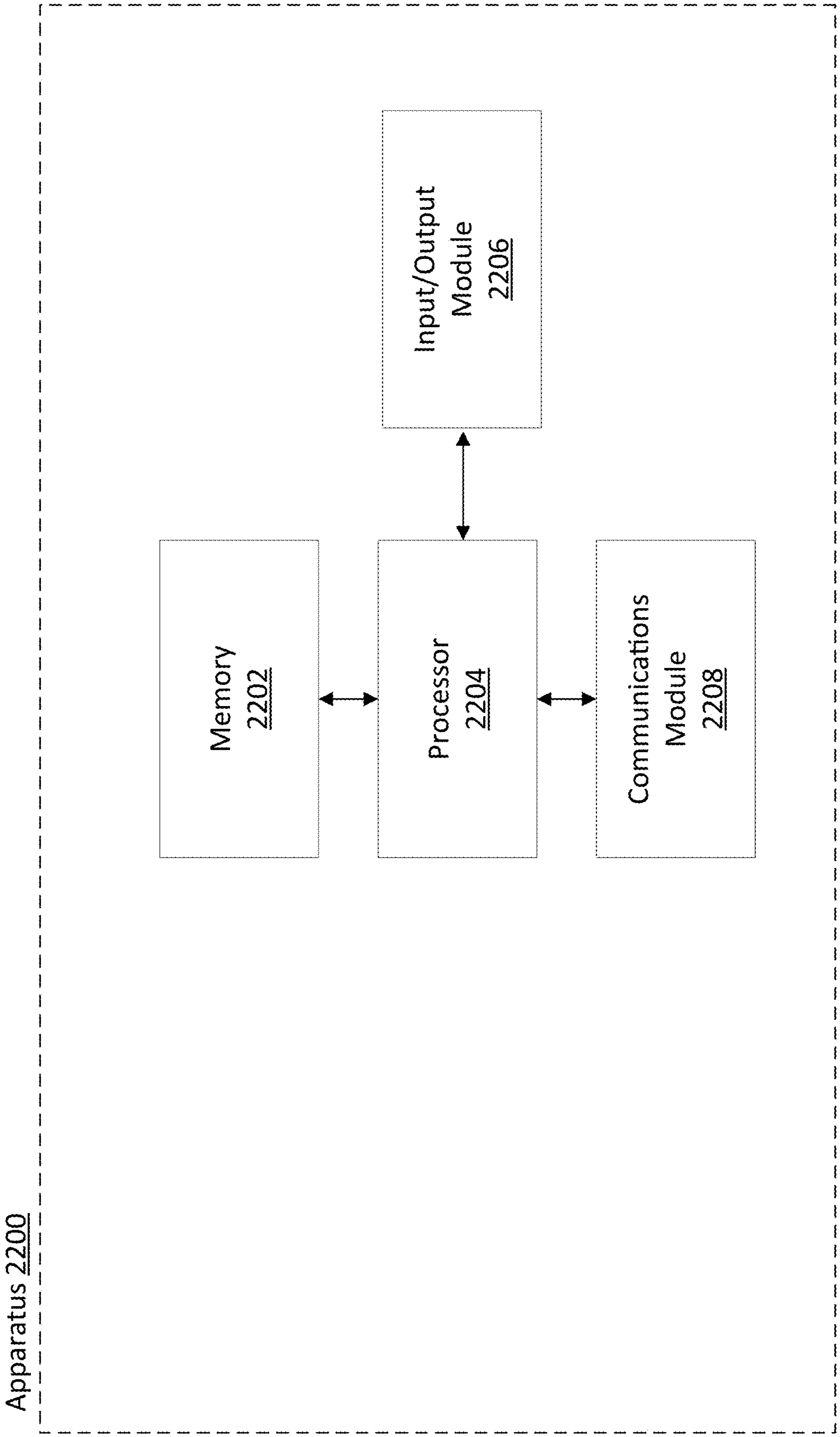
Figure 23A:
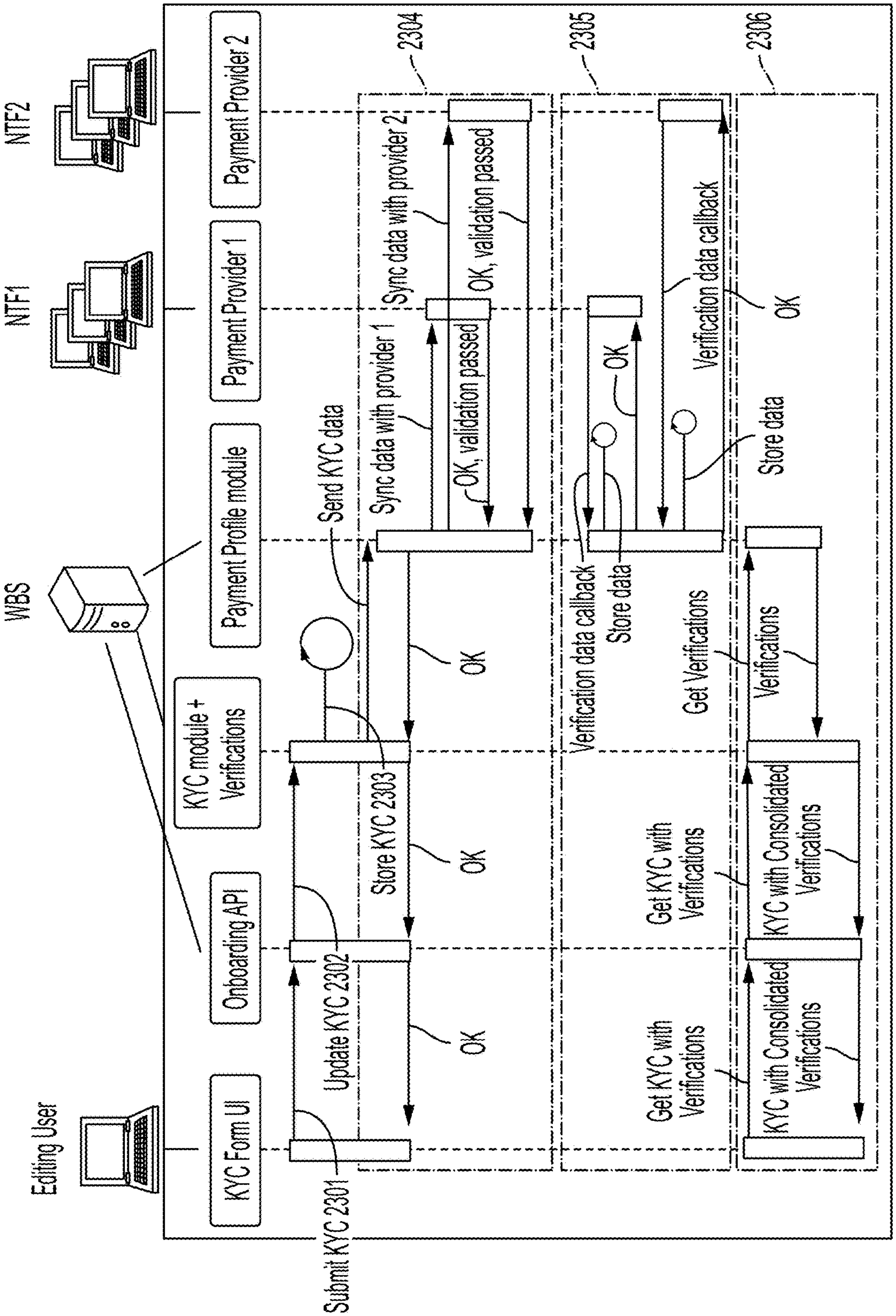
Figure 23B:
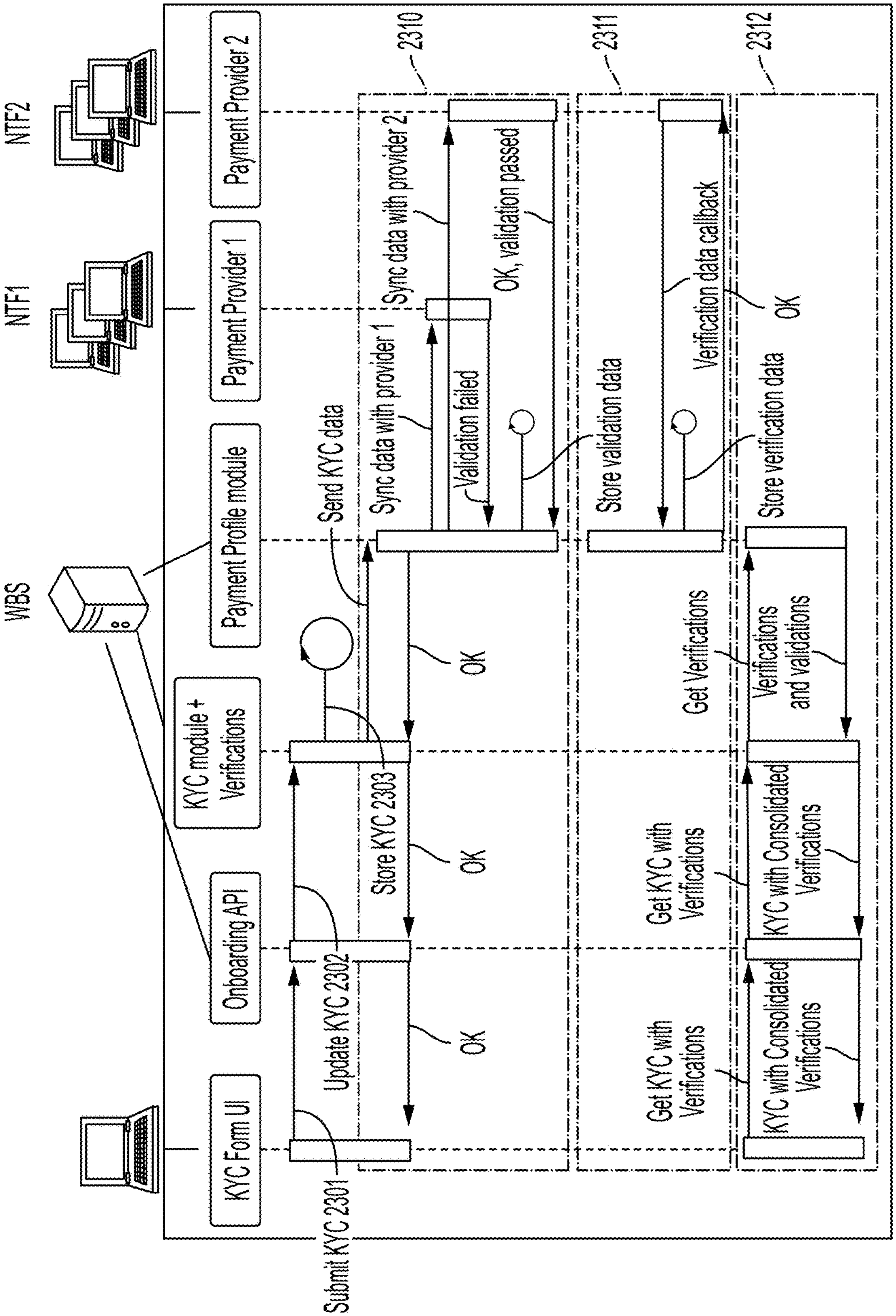

Having thus described certain example embodiments of the present disclosure in general terms above, non-limiting and non-exhaustive embodiments of the subject disclosure will now be described with reference to the accompanying drawings which are not necessarily drawn to scale. The components illustrated in the accompanying drawings may or may not be present in certain embodiments described herein. Some embodiments may include fewer (or more) components than those shown in the drawings. Some embodiments may include the components arranged in a different way:

FIG. 1 illustrates an example system architecture within which embodiments of the present disclosure may operate;

FIG. 2A illustrates a schematic block diagram of an example architecture for contextual compliance enforcement in accordance with some example embodiments described herein;

FIG. 2B illustrates a schematic block diagram of an example architecture for contextual compliance enforcement in accordance with example embodiments described herein;

FIG. 3A illustrates example operations associated with contextual compliance enforcement in accordance with some example embodiments described herein;

FIG. 3B illustrates a signal diagram of example operations associated with contextual compliance enforcement in accordance with some example embodiments described herein;

FIG. 4A illustrates a schematic block diagram of an example architecture for disputed transaction data structure management in accordance with some example embodiments described herein;

FIG. 4B illustrates a schematic block diagram of an example disputed transaction data structure lifecycle in accordance with example embodiments described herein;

FIG. 5A illustrates example operations associated with disputed transaction data structure management in accordance with some example embodiments described herein;

FIG. 5B illustrates a signal diagram of example operations associated with disputed transaction data structure management in accordance with some example embodiments described herein;

FIG. 6A illustrates a schematic block diagram of an example architecture for network transaction facilitator selection in accordance with some example embodiments described herein;

FIG. 6B illustrates a schematic block diagram of an example flow diagram for network transaction facilitator selection in accordance with example embodiments described herein;

FIG. 7A illustrates example operations associated with network transaction facilitator selection in accordance with some example embodiments described herein;

FIG. 7B illustrates a signal diagram of example operations associated with network transaction facilitator selection in accordance with some example embodiments described herein;

FIG. 8 illustrates a schematic block diagram of an example architecture for network transaction intermediary selection in accordance with some example embodiments described herein;

FIG. 9A illustrates example operations associated with network transaction intermediary selection in accordance with some example embodiments described herein;

FIG. 9B illustrates a signal diagram of example operations associated with network transaction intermediary selection in accordance with some example embodiments described herein;

FIGS. 9C, 9D, 9E, and 9F illustrate example user interfaces renderable in accordance with some example embodiments described herein;

FIG. 10 illustrates a schematic block diagram of an example architecture for resource provider designation in accordance with some example embodiments described herein;

FIG. 11A illustrates example operations associated with resource provider designation in accordance with some example embodiments described herein;

FIG. 11B illustrates a signal diagram of example operations associated with resource provider designation in accordance with some example embodiments described herein;

FIG. 12 illustrates a schematic block diagram of an example architecture for resource provider resilience prediction in accordance with some example embodiments described herein;

FIG. 13A illustrates example operations associated with resource provider resilience prediction in accordance with some example embodiments described herein;

FIG. 13B illustrates a signal diagram of example operations associated with resource provider resilience prediction in accordance with some example embodiments described herein;

FIG. 14 illustrates a schematic block diagram of an example architecture for identifying network transaction facilitator decision triggers in accordance with some example embodiments described herein;

FIG. 15A illustrates example operations associated with identifying network transaction facilitator decision triggers in accordance with some example embodiments described herein;

FIG. 15B illustrates a signal diagram of example operations associated with identifying network transaction facilitator decision triggers in accordance with some example embodiments described herein;

FIG. 16A illustrates a schematic block diagram of an example architecture for supporting integration of multiple network transaction facilitators in accordance with some example embodiments described herein;

FIG. 16B illustrates an example data flow for supporting integration of multiple network transaction facilitators in accordance with some example embodiments described herein;

FIG. 17A illustrates example operations associated with supporting integration of multiple network transaction facilitators in accordance with some example embodiments described herein;

FIG. 17B illustrates a signal diagram of example operations associated with supporting integration of multiple network transaction facilitators in accordance with some example embodiments described herein;

FIG. 18 illustrates a block diagram of an example system that may be specially configured within which embodiments of the present disclosure may operate;

FIG. 19 illustrates a schematic block diagram of example components of an example website building system in accordance with some example embodiments described herein;

FIG. 20 illustrates a schematic block diagram of example repositories of an example content management system of website building system in accordance with some example embodiments described herein;

FIG. 21 is a schematic block diagram of example modules for use in an example server apparatus in accordance with some example embodiments described herein;

FIG. 22 is a schematic block diagram of example modules for use in an example client apparatus in accordance with some example embodiments described herein; and FIGS. 23A and 23B illustrate signal diagrams of example operations associated with asynchronous updates for use with supporting integration of multiple network transaction facilitators in accordance with some example embodiments described herein.

DETAILED DESCRIPTION

One or more example embodiments now will be more fully hereinafter described with reference to the accompanying drawings, wherein like reference numerals are used to refer to like elements throughout. In the following description, for purposes of explanation, numerous specific details are set forth in order to provide a thorough understanding of the various embodiments. It is evident, however, that the various embodiments may be practiced without these specific details (and without applying to any particular networked environment or standard). It should be understood that some, but not all embodiments are shown and described herein. Indeed, the embodiments may be embodied in many different forms, and accordingly, this disclosure should not be construed as limited to the embodiments set forth herein. Rather, these embodiments are provided so that this disclosure will satisfy applicable legal requirements. As used herein, the description may refer to a server or client device as an example "apparatus." However, elements of the apparatus described herein may be equally applicable to the claimed system, method, and computer program product. Accordingly, use of any such terms should not be taken to limit the spirit and scope of embodiments of the present disclosure.

Example embodiments of the present disclosure may proceed to implement network transaction endpoint services (or network transaction integration) in a number of ways. Accordingly, various processes in accordance with the present disclosure are described herein. Each method or process described herein may include any number of operational blocks defining the process and/or a portion thereof. It should be appreciated that in some embodiments the various processes and/or sub-processes described herein may be combined in any manner, such that the embodiment is configured to perform each aspect of the various processes in combination, in parallel and/or serially. In some embodiments, at least one additional and/or at least one alternative operation is performed in one or more of the described processes, and/or at least one operation is removed from one or more of the described processes.

Additionally, optional operations may be depicted in the processes utilizing dashed (or "broken") lines. In this regard, it should be appreciated that the processes described herein are examples only and the scope of the disclosure is not limited to the exact operations depicted and described, and the depicted and described operations should not limit the scope and spirit of the embodiments described herein and covered in the appended claims.

Overview

Embodiments herein relate to leveraging unique insights and capabilities available to a website-building system to provide and optimize network transaction endpoint services for websites supported by and/or assembled using the website-building system. Embodiments herein further relate to leveraging unique insights and capabilities available to a website-building system to provide contextual compliance enforcement associated with websites supported by the website-building system.

Websites seeking network transaction capabilities face situations where automated (e.g., electronic) decisions need to be made based on unpredictable behavior associated with multiple reasonably autonomous layers or entities of network transaction systems. That is, the various entities that make up a network transaction system exhibit behaviors (e.g., making decisions to approve or deny a network transaction; making decisions to approve or deny a dispute initiated with respect to a network transaction; making decisions as to whether to review evidence submitted in support of a network transaction when the network transaction is in dispute, etc.) with respect to network transactions—each entity behaves in a manner that is dissimilar to other entities of the network transaction system, and each entity behaves in a manner that is unpredictable as compared to past behaviors exhibited by the entity. The vast range of possible behaviors that any given entity or group of entities can exhibit makes automating execution of actions with respect to network transactions difficult or even impossible.

In addition to the vast range of possible network behaviors, data from multiple disparate sources may be used to inform decisions, however, the data is voluminous (e.g., dozens of petabytes) and quickly changing. Processing the data according to a timeline such that the data remains meaningful for a respective decision point is not possible.

Websites associated with resource providers rely upon successful network transactions for various reasons, and uncertainty associated with or failure of network transactions can lead to detrimental situations for websites or resource providers.

Embodiments herein overcome the aforementioned limitations and more by informing network transaction-related decisions using data and insights uniquely available to a website building system, and powerful trained models to provide evaluations upon which decisions can be made and automatically executed. Embodiments provide for automated decisions or execution of actions based on machine learning models informed by multiple disparate and voluminous data sources in near real-time. Such automated decisions or execution of actions enable the appropriate actions to be taken at the appropriate time, and not according to approximations.

Moreover, websites must comply with various limitations placed by governments and commercially-tied entities in order to be approved to support network transactions. Breach of any of the limitations can cause termination of the website, cause damage to a website building system supporting the website, and can even carry penalties. Monitoring compliance with various limitations is computationally challenging due in part to the wide variety of data sources relied upon in determining compliance. Compliance also involves multiple domains; a website may be in compliance with all but a single domain, and therefore may go unnoticed if monitoring for general compliance.

Embodiments herein overcome the aforementioned drawbacks and more by providing contextual compliance enforcement functionality for use within a website building system. The contextual compliance enforcement functionality aggregates context-specific compliance scores for a given website, generated by interface service entities having their own context-specific rules (e.g., trained models) and their own unique data sources. In doing so, embodiments herein reduce computing resources and time dedicated to individual compliance evaluations. Further, embodiments herein enable calculation-based decisions, rather than relying on manual score assignments (which can be cumbersome and fraught with error). Consistency associated with monitoring compliance scores over time provides for accurate actions to be taken for only those entities for which compliance has been demonstrated as a problem (e.g., as opposed to overbroadly applying restrictions to entities that have been compliant as a result of data, timing, or consistency).

Embodiments herein further provide for informing a discrete website posture based on aggregating a multitude of data (e.g., dozens of petabytes or more) available to a website building system. Models according to embodiments herein are specially configured to quickly generate outputs despite being initially trained and continuously retrained using voluminous and ever changing data sets. Using the specially configured models described herein, embodiments provide for faster page loads (e.g., faster loading of post-network-transaction results pages and/or rendering of interfaces configured in accordance with embodiments herein), near real-time turnaround (e.g., low latency decision making and execution), use less data for making transaction routing or displaying decisions, and/or enable reduction in computing resources based on relationships between inputs having been factored more quickly into the models described herein (e.g., if models herein determine a relationship between various inputs are more relevant to a particular decision, embodiments herein may ignore other inputs or data points, thereby reducing computing and other resources).

It will be appreciated that, while example embodiments and implementations herein describe models and data sets associated with depicted embodiments or examples, each model or set of models described herein may share inputs, input training data, architecture, or updated training data with other models or implementations described herein to improve training, performance, feature extraction, and/or other model parameters associated with the other models without departing from the scope of the present disclosure.

Example Network Transaction Architecture

FIG. 1 illustrates an example system architecture within which embodiments of the present disclosure may operate. In an example system 100, a website building system (WBS) 102 supports network transaction capabilities between end-users 106 (e.g., purchasers) and websites or resource providers 104 (e.g., merchants). A network transaction is an electronic request initiated by an end-user or transaction requestor 106 associated with a currency transfer mechanism issued by a network transaction endpoint 108. The network transaction is associated with an agreement by the end-user or transaction requestor 106 to provide a currency value in exchange for a good, service, or other offerings from a website or resource provider (e.g., transaction beneficiary 104).

The network transaction can be initiated by the transaction requestor 106 via WBS 102, and the WBS can route the network transaction via a network transaction facilitator 112 to a network transaction intermediary 114. The network transaction intermediary 114 may act as an arbiter between a first network transaction endpoint 108 (e.g., associated with issuing the currency transfer (payment) mechanism to the end-user or transaction requestor 106) and a second network transaction endpoint 110 (e.g., associated with the website identifier, resource provider, or transaction beneficiary 104).

The network transaction facilitator 112 has connections to various network transaction intermediaries 114 and/or network transaction endpoints 108, and 110 and supplies authorization and settlement services to those network transaction intermediaries 114 and/or network transaction endpoints 108, and 110. In some embodiments, a network transaction facilitator is a payment processor or payment service provider (e.g., Adyen, PayPal, Stripe, and the like).

The network transaction intermediary 114 may process payment mechanisms of a specific category. In some examples, the payment mechanisms are payment cards. In some examples, the specific category is a brand of payment cards. In some examples, the network transaction intermediary 114 is a card association (e.g., American Express, Discover, Diners Club, Troy, JCB, Visa, Mastercard, and the like).

The network transaction endpoints 108, and 110 are entities responsible for serving as an ultimate endpoint for approving or receiving the proceeds associated with a network transaction. In some examples, a network transaction endpoint is a financial institution (e.g., a bank).

An issuing network transaction endpoint 108 issues payment mechanisms associated with a network transaction intermediary (e.g., branded payment cards) directly to end-users (e.g., consumers or cardholders). An end-user can initiate a network transaction (e.g., a purchase from a website or merchant via a website) and promises to pay the issuing network transaction endpoint for the network transaction. The issuing network transaction endpoint assumes liability for the network transaction on behalf of the end-user (e.g., if the consumer does not pay).

A recipient or acquiring network transaction endpoint 110 (e.g., the same or a different network transaction endpoint than 108) can be associated with acquiring or receiving as a result of a network transaction (e.g., referred to as an acquiring network transaction endpoint or acquirer), such that the network transaction endpoint accepts proceeds (e.g., funds) associated with the network transaction. The acquiring network transaction endpoint may be associated with a website identifier (e.g., a merchant). The acquiring network transaction endpoint assumes liability for the network transaction on behalf of the website identifier (e.g., the merchant) (e.g., if the merchant does not provide the goods or services purchased).

Example Contextual Compliance Enforcement Operation Overview and Embodiments

FIG. 2A illustrates a schematic block diagram of an example architecture for contextual compliance enforcement in accordance with some example embodiments described herein. In FIG. 2A, an example architecture 200 is configured to provide responses to queries regarding compliance associated with websites. An example architecture 200 includes a compliance system 202 for receiving requests (e.g., compliance requests or context-specific compliance requests) from requesting services or entities 204. For example, a requesting service or entity 204 may wish to know a compliance score associated with a user identifier or a website identifier and issues a request to a compliance system 202. The request may include information identifying the user and/or website, as well as other information about the user and/or website. The request may also include a context for which the requestor would like to know the compliance level. In embodiments, a website building system may support the request using an API call to the compliance system 202.

The compliance system 202 includes a compliance service system 202A or module configured to send requests to various data sources (206B, 208B, 208C, 210B, 212B, 214B) based on one or more contexts associated with a request. That is, a request may include one context, and a request may include multiple contexts. The compliance service 202A also receives responses from the data sources (206B, 208B, 208C, 210B, 212B, 214B). The compliance service 202A also provides the responses (e.g. from the data sources) to a scoring engine 202B configured to generate a compliance score based on the responses. The compliance service system 202A receives an aggregated compliance score from the scoring engine 202B and returns the score (e.g., also reasons for the score) to the requesting service or entity 204.

The compliance system 202 is connected to the data sources (206B, 208B, 208C, 210B, 212B, 214B) through interface service entities 206A, 208A, 210A, 212A, 214A, such that the interface service entities 206A, 208A, 210A, 212A, 214A request data from their respective data sources 206B, 208B, 208C, 210B, 212B, 214B in order to generate responses for providing to the compliance service system 202A.

For example, a website categorization service 210A may provide an interface for a data source that categorizes the website (e.g., flagging unapproved categories such as pornography). A sanctions service 212A may provide an interface for a sanctions list scanning service, which checks if a website's designer (or user) is listed as a regulatory sanctions list by a regulator (such as terrorist financing) or is in the otherwise forbidden region (such as these listed by OFAC). A reputation service 214A may provide an interface for an adverse media and law enforcement lists scanning service, which checks if the user is listed as a fraud-related criminal or has published problematic history. A product scan service 206A may provide an interface for a service that scans product categories associated with a website. Data sources may be internal to the website building system or third party. A data service 208A may provide an interface for machine learning powered by internal data to a website building system, such as money laundering detection 208B or website categorization 208C.

The scoring engine 202B processes results received by the compliance system service 202A from the various data sources or interface service entities and returns a numerical score representing an aggregated compliance score. The compliance system 202 returns the aggregated compliance score, as well as any reasons associated with the aggregated compliance score (and/or reasons associated with individual context-specific compliance scores) to the requesting service or entity 204. The reasons may explain how a score was reached, or whether, how, or why an individual context-specific compliance score impacted the aggregated compliance score.

FIG. 2B illustrates a schematic block diagram of an example architecture for contextual compliance enforcement in accordance with example embodiments described herein. In FIG. 2B, an example scoring engine 202B includes multiple sub-engines. Each sub-engine is associated with rules for one or more specific domains (e.g., website, sanctions, products), where the rules are applied to data received from the sub-engines corresponding data source(s). Each sub-engine is associated with one or more unique factors table, having a configurable list of factors. Each factor is an element of response from one or more data sources, where a factor goes through interpretation and scoring by the sub-engine. A factor may comprise a key and a value, where the key is matched to a corresponding rule from the sub-engine, and the value is then transformed into a numeric score. A reason for a score may be a string from the factor table, which is a result of mapping a specific value from a data source to a row in the factor table.

For example, a factor associated with website categorization may be received from a third party website categorization service. The factor key may be "initial website categorization" and the factor value may be "low," "medium," "high," or "critical." Matching numeric values for these factor values may be 0, 30, 90, and 100, respectively. Matching reasons for these factor values may be "no issues," "questionable category," "problematic category," or "restricted category," respectively. Other examples of factors may be "periodic website categorization," "initial user sanctions scanning," "periodic user sanctions scanning," "new product categorization," "updated product categorization," and the like.

The scoring engine 202B aggregates the scores from all of the sub-engines, applying weight values to each score based on data associated with the request, and generates an overall aggregated compliance score by applying rules or one or more models to the scores and associated weights from the sub-engines. It will be appreciated that each sub-engine can relate to one or more specific compliance domains (e.g., contextual domain).

FIGS. 3A and 3B illustrate example operations associated with contextual compliance enforcement in accordance with some example embodiments described herein. The operations illustrated in FIGS. 3A and 3B may, for example, be performed by a network transaction (NT) integration server 1812, which may include means, such as memory 2102, processor 2104, input/output module 2106, communications module 2108, NT integration module 2110, and/or the like, which are collectively configured for NT integration. The operations may further be performed by one or more client devices 1808A-N, which may include means, such as memory 2202, processor 2204, input/output module 2206, communications module 2208, and/or the like.

In some embodiments, shown in FIGS. 3A and 3B, at step/operation 302, a process 300 includes receiving, from a requesting entity, a contextual compliance request. The contextual compliance request can include a website identifier and one or more contextual records. A contextual record may be associated with a contextual domain representative of content associated with the website identifier, product data or service data provided by a resource provider associated with the website identifier, sanctions data associated with the website identifier, reputation data associated with the website identifier, or money laundering detection associated with the website identifier. It will be appreciated that various other contexts may be considered as part of the compliance evaluation and/or enforcement mechanisms herein.

In some embodiments, shown in FIGS. 3A and 3B, at step/operation 304, the process 300 includes transmitting, to one or more interface service entities and based at least in part on the one or more contextual records, a context-specific compliance score request. That is, if the context-specific compliance request is associated with only a signal contextual domain, a context-specific score request is transmitted to an interface service entity associated with the single contextual domain. An interface service entity is configured to generate context-specific compliance score structures based at least in part on determining a respective compliance score for the website identifier for a contextual domain of one or more contextual domains. The interface service entity generates the scores based on data requested (305A) and received (305B) from a contextual domain data service.

The one or more interface service entities may include a third-party product categorization service, configured to receive product categorization streaming data from one or more external scanning services. The one or more interface service entities may include a machine learning service, configured to receive verification streaming data from one or more external scanning services and configured to generate at least a money laundering detection score. The one or more interface service entities may include a website categorization service, configured to receive website categorization streaming data from one or more website scanning services. The one or more interface service entities may include a sanctions service, configured to receive sanctions streaming data from one or more external sanctions-related data services. The one or more interface service entities may include a reputation service, configured to receive reputational streaming data from one or more external reputational data services.

The one or more interface service entities may be associated with one or more of contextual domain-specific rules, a contextual domain-specific factor table, and one or more context-specific trained machine learning models. A contextual domain-specific factor table comprises a configurable factor list. The configurable factor list may include one or more factors, wherein each factor may include a factor key and a factor value and is an element received from a data source. The one or more context-specific trained machine learning models may be configured to generate one or more context-specific compliance scores based at least in part on the one or more factors.

In some embodiments, shown in FIGS. 3A and 3B, at step/operation 306, the process 300 includes receiving, from the one or more interface service entities, one or more context-specific compliance score structures. Each context-specific compliance score structure of the one or more context-specific compliance score structures may include a compliance score for the website identifier in accordance with a respective contextual record.

In some embodiments, shown in FIGS. 3A and 3B, at step/operation 308, the process 300 includes generating, based at least in part on applying one or more models to the one or more context-specific compliance score structures, an aggregated compliance score associated with the website identifier. The one or more models may be configured to apply one or more weights to the one or more context-specific compliance score structures to generate the aggregated compliance score.

In some embodiments, shown in FIGS. 3A and 3B, at step/operation 310, the process 300 includes generating, based at least in part on the one or more context-specific compliance scores and the aggregated compliance score, a contextual compliance response including the aggregated compliance score and one or more context-specific data structures. The one or more context-specific data structures may include one or more score justifications grouped according to their respective impact on the aggregated compliance score. An aggregated compliance level may be included in the response, representing a translation of the aggregated compliance score according to one or more contextual domains associated with the contextual compliance request.

In some embodiments, shown in FIGS. 3A and 3B, at step/operation 312, the process 300 includes transmitting, to the requesting entity, the contextual compliance response.

In some embodiments, shown in FIGS. 3A and 3B, at step/operation 314, the process 300 includes causing performance of one or more compliance enforcement actions based at least in part on one or more of the aggregated compliance score, one or more context-specific compliance scores, or a compliance score pattern associated with the website identifier. The one or more compliance enforcement actions can include one or more of notification transmissions, service interruptions, service limitations, additional action requirements, layout limitations, enabling or disabling of network transaction methods, and/or the like.

In some embodiments, the website identifier is associated with a website assembled in accordance with one or more website building tools stored by one or more website building repositories. The one or more website building tools can include one or more of pages, sub-pages, containers, components, atomic components, content elements, layout elements, templates, or layout rules. The requesting entity can be associated with a website building service associated with the website identifier. The requesting entity can be external to a website building service associated with the website identifier.

Example Disputed Transaction Data Structure Operation Overview and Embodiments FIG. 4A illustrates a schematic block diagram of an example architecture for disputed transaction data structure management in accordance with some example embodiments described herein. FIG. 4B illustrates various stages or statuses associated with an example disputed transaction data structure lifecycle in accordance with example embodiments described herein. In FIG. 4A, a network transaction data structure builder 402 is configured to support generating disputed network transaction data structures associated with disputed network transaction for a network transaction beneficiary 408. An intended network transaction beneficiary 408 may be a merchant, or a party who enters into an agreement with a network transaction facilitator 404 (e.g., a payment processor) and for whom the network transaction facilitator 404 processes transactions related to services and products offered by the network transaction beneficiary 408 (e.g., merchant). The network transaction data structure builder 402 compiles evidence documentation in support of disputed network transactions into a single data structure or file. The network transaction data structure builder 402 may be part of a website building system or provided as an API service by the website building system.

In some embodiments, a user interface (UI) may be provided through which a network transaction beneficiary 408 may interact with the network transaction data structure builder 402. The user interface (UI) provides for the network transaction beneficiary 408 to participate in (e.g., operate and control) the dispute (e.g., chargeback) defense process effectively, while the network transaction data structure builder 402 provides the feedback information that helps the network transaction beneficiary 408 in the decision-making process. The network transaction data structure builder 402 may provide notifications to the network transaction beneficiary 408 to inform the network transaction beneficiary 408 about the status of various aspects of the disputed network transaction process. Notifications may include email notifications, SMS notifications, electronic communications within the website building system, or notifications of early fraud detection.

In some embodiments, a dispute reason may be provided to the network transaction beneficiary 408 by the network transaction data structure builder 402, optionally along with a detailed description of the reason, and a deadline to submit evidence in support of the network transaction that has been disputed.

In some embodiments, a network transaction beneficiary 408 may opt to provide additional evidence and/or comments in support of a network transaction to the network transaction data structure builder 402 for inclusion in a disputed network transaction data structure.

A network transaction data structure builder 402 may be supported by one or more of an evidence size optimizer 402A, an automatic cover letter generator 402B, an automatic evidence compiler 402C, and a reversal score engine 402D. The evidence size optimizer 402A assists with compiling files with additional evidence and comments, that can be easily consumed by one or more of the network transaction facilitator 404 or the network transaction endpoint 406.

An automatic cover letter generator 402B may include logic to pre-populate a cover letter automatically using one or more of a business description, product type, and dispute reason to simplify the dispute process. An automatic evidence compiler 402C may include historical evidence, which may differ depending on the type of dispute and user responses. The automatic evidence compiler 402C may automatically capture data for data structure sections and pre-populate both API evidence object attributes and form fields when integration with the network transaction facilitator 404 supports such functionality.

A reversal score engine 402D generates a score representing the likelihood that a network transaction endpoint associated with the network transaction endpoint identifier will change a dispute status associated with the network transaction identifier. The reversal score engine 402D may be supported by one or more machine learning models.

FIGS. 5A and 5B illustrate example operations associated with disputed transaction data structure management in accordance with some example embodiments described herein. The operations illustrated in FIGS. 5A and 5B may, for example, be performed by an NT integration server 1812, which may include means, such as memory 2102, processor 2104, input/output module 2106, communications module 2108, NT integration module 2110, and/or the like, which are collectively configured for NT integration. The operations may further be performed by one or more client devices 1808A-N, which may include means, such as memory 2202, processor 2204, input/output module 2206, communications module 2208, and/or the like.

In some embodiments, shown in FIGS. 5A and 5B, at step/operation 502, the process 500 includes receiving a disputed network transaction notification. In some embodiments, the disputed network transaction notification includes a network transaction identifier, a website identifier, a dispute type identifier, a dispute status, and an end-user identifier.

In some embodiments, shown in FIGS. 5A and 5B, at step/operation 504, the process 500 includes based at least in part on the disputed status, retrieving one or more network transaction records associated with the network transaction identifier. In addition to network transaction data associated with the network transaction, a website-building system is uniquely positioned to retrieve and utilize additional data associated with end-user behavior as well as resource provider (e.g., editing user or website identifier) behavior for compiling a disputed network transaction data structure.

In some embodiments, shown in FIGS. 5A and 5B, at step/operation 506, the process 500 includes generating a disputed network transaction data structure based at least in part on one or more of the one or more network transaction records. The one or more network transaction records are arranged within the disputed transaction data structure based at least in part on one or more of the dispute type identifiers, a network transaction facilitator associated with the network transaction identifier, a network transaction intermediary associated with the network transaction identifier, or a network transaction endpoint associated with the network transaction identifier.

In some embodiments, a disputed transaction data structure comprises one or more evidence records associated with a transaction type identifier associated with the network transaction. The transaction type identifier may represent physical goods and one or more evidence records may include one or more of a receipt object, visual rendering of product description, return policy data, tracking information, delivery confirmation information, signature evidence, audio or video evidence demonstrating possession, or electronic communication evidencing possession. The transaction type identifier may represent services and one or more evidence records may include one or more of a service description object, electronic evidence documenting the physical presence and/or related transactions, signature evidence, review submission, or electronic communication evidencing possession. The transaction type identifier may represent digital goods and one or more evidence records may include one or more of a digital goods description object, usage activity or logs, IP address, geographic location associated with transaction, requests or provision of login credentials, or electronic communication evidencing possession.

In some embodiments, shown in FIGS. 5A and 5B, at step/operation 508, the process 500 includes generating, using one or more models and based at least in part on one or more of the end-user identifier, the website identifier, the dispute type identifier, a network transaction facilitator identifier associated with the network transaction identifier, a network transaction intermediary associated with the network transaction identifier, a network transaction endpoint associated with the network transaction identifier, or one or more network transaction records, a network transaction dispute reversal score representing a programmatically generated likelihood that a network transaction endpoint associated with the network transaction endpoint identifier will change a dispute status associated with the network transaction identifier. In some embodiments, the network transaction endpoint is a first network transaction endpoint, and changing the disputed status by the first network transaction endpoint in accordance with a second network transaction endpoint results in a transfer to an account associated with the second network transaction endpoint.

In some embodiments, shown in FIGS. 5A and 5B, at step/operation 510, the process 500 includes causing rendering of visual representation of the disputed transaction data structure, the network transaction dispute reversal score, and one or more network transaction attributes associated with the network transaction identifier, via a display interface of a client computing entity associated with the website identifier.

In some embodiments, shown in FIGS. 5A and 5B, at step/operation 512, the process 500 includes, responsive to receiving (511) an approval interaction from the client computing entity associated with the website identifier, causing transmission of the disputed transaction data structure to a computing entity associated with the network transaction endpoint.

In some embodiments, the network transaction was initiated in association with an end-user identifier via the website-building system. The website-building system may communicate regarding the network transaction with the network transaction facilitator. The network transaction facilitator may communicate with the network transaction intermediary regarding the network transaction. The network transaction intermediary may communicate with the network transaction endpoint regarding the network transaction.

In some embodiments, shown in FIGS. 5A and 5B, at step/operation 514, the process 500 includes, in an instance when the improper dispute prediction exceeds a threshold, causing the performance of one or more improper dispute mitigating actions. One or more improper dispute mitigating actions may include canceling a potentially fraudulent order, issuing a refund, stopping or revoking a shipment, blocking communication with an end-user associated with the end-user identifier, requesting additional documentation or communication from the end-user, storing additional documentation associated with the network transaction.

In some embodiments, the process may include (not shown), using one or more models, generating a first network transaction dispute reversal score representing a first programmatically generated likelihood that the network transaction endpoint associated with the network transaction endpoint identifier will change the dispute status associated with the network transaction identifier in an instance where the disputed transaction data structure remains unchanged. The process may further include (not shown), using one or more models, generating a second network transaction dispute reversal score representing a second programmatically generated likelihood that the network transaction endpoint associated with the network transaction endpoint identifier will change the dispute status associated with the network transaction identifier in an instance where the disputed transaction data structure is supplemented. The process may further include (not shown) causing rendering of visual representation of the first network transaction dispute reversal score and the second network transaction dispute reversal score.

In some embodiments, the process may further include (not shown), receiving, from a client computing entity associated with the website identifier, one or more additional data records for supplementing the disputed transaction data structure. The process may further include (not shown) generating a supplemented disputed transaction data structure. The process may further include (not shown), using one or more models and based at least in part on the supplemented disputed transaction data structure, generating a third network transaction dispute reversal score representing a third programmatically generated likelihood that the network transaction endpoint associated with the network transaction endpoint identifier will change the dispute status associated with the network transaction identifier. The process may further include (not shown) causing rendering of visual representation of the third network transaction dispute reversal score.

In some embodiments, one or more models are trained using historical transaction data including network transaction data associated with one or more of a plurality of end-user identifiers, a plurality of website identifiers, a plurality of dispute type identifiers, a plurality of network transaction facilitator identifiers, a plurality of network transaction intermediary identifiers, a plurality of network transaction endpoint identifiers, a plurality of dispute status change outcomes, a plurality of network transaction records, or historical website editing interactions associated with assembling websites associated with the plurality of website identifiers.

In some embodiments, the network transaction dispute reversal score may be generated further based at least in part on one or more of transaction history associated with the end-user identifier and the website identifier, a product or service type associated with the network transaction, a currency value associated with the network transaction, billing or shipping data associated with the end-user identifier, an IP address associated with the end-user identifier, or transaction history associated with the end-user identifier.

In some embodiments, prior to submitting the network transaction for servicing to a network transaction facilitator, the process may include (not shown) generating, using one or more improper dispute prediction models and based at least in part on the one or more network transaction attributes associated with the network transaction identifier, an improper dispute prediction representing a programmatically generated likelihood that a dispute will be improperly or fraudulently initiated following completion of the network transaction. The one or more improper dispute mitigating actions may include canceling a potentially fraudulent order, issuing a refund, stopping or revoking a shipment, blocking communication with an end-user associated with the end-user identifier, requesting additional documentation or communication from the end-user, storing additional documentation associated with the network transaction.

Example Network Transaction Facilitator Selection Operation Overview and Embodiments Embodiments herein provide for the automated selection of a network transaction facilitator for supporting a network transaction in order to increase a network transaction approval rate while having no or minimal increase in a transaction fraud rate. Legitimate network transactions initiated by legitimate end-users (e.g., purchasers) can be declined for fraud reasons, causing detriment to a resource provider. At the same time, fraudulent network transactions initiated by fraudulent end-users may be approved, also causing detriment to a resource provider. Embodiments herein overcome such drawbacks by providing for a resource provider to accept payments from legitimate transactions and be protected from fraudulent transactions.

While a single anti-fraud tool might err on the side of assuming legitimacy, providing an end-user with mechanisms by which the end-user may prove they are legitimate enables approval of more transactions. Once a transaction is approved risk-wise, it is routed to one of many network transaction facilitators which has the highest probability of approving the transaction. After a transaction is sent to the network transaction facilitator, it might be declined by the issuing network transaction endpoint (e.g., issuer), for various reasons, including: insufficient funds; suspicion that the transaction is fraudulent; the issuer might not approve the line of business of the merchant, and the reason might not be specified at all. At times, this can be a false decision. In embodiments, the end-user may be asked to provide another payment mechanism, in accordance with the denial reason and the end-user experience.

FIG. 6A illustrates a schematic block diagram of an example architecture for network transaction facilitator selection in accordance with some example embodiments described herein. FIG. 6B illustrates a schematic block diagram of an example flow diagram 650 for network transaction facilitator selection in accordance with example embodiments described herein.

In FIG. 6A, an example architecture includes a transaction risk engine 602 configured to manage the logic of calling risk-related components and services. A user interface 604 (e.g., a checkout interface) may be a component in a website (e.g., supported by or assembled in accordance with a website building system), where an end-user (e.g., purchaser) enters their payment mechanism information and/or receives feedback. A transaction API 606 may interact with a network transaction facilitator 608 (e.g., a payment provider) and trigger the transaction risk engine 602 upon initiation of a transaction through user interface 604.

In embodiments, a third party risk engine 616 (e.g., an anti-fraud engine) may determine a risk level of a transaction, and recommend whether it is safe for processing. A consortium network 614 may indicate whether the end-user initiating the network transaction is known as legitimate by, for example, merchants which are members of the network 614 (it will be appreciated that a consortium network 614 may additionally or alternatively include AI/ML models, or experts). An optimal NTF (network transaction facilitator) selector 612 may determine which NTF would be best to support a given network transaction. In embodiments, a network transaction facilitator is a payment service provider. A payment service provider (PSP) may be a third-party entity that assists businesses to accept a wide range of online payment methods. The PSP interacts with multiple network transaction endpoints (e.g., acquiring banks, issuing banks), and network transaction intermediaries (e.g., payment networks).

In some embodiments, if after an end-user initiates network transaction, additional verification is required, an authentication service 610 may be called and may present the end-user with a challenge (such as providing additional information). The result of the challenge is returned to the transaction risk engine 602.

In FIG. 6B, an end-user (EU) initiates a payment transaction with a resource provider (RP) via a payment details form. The payment transaction details are routed to an anti-fraud engine which provides an evaluation of the risk of fraud, and if the risk level is low, the transaction is routed to a step of evaluating the best network transaction facilitator to which the transaction should be routed. From there, the transaction can be processed internally (e.g., by the WBS) and with an issuing network transaction endpoint (NTEP) (e.g., a bank). If the transaction is processed successfully, one or more of the resource provider or the end user are notified of the successful transaction. If the transaction is not processed successfully, the resource provider (RP) may be offered an opportunity to provide additional information to increase the chances of success for the transaction to be processed again.

If, responsive to the evaluation of the risk of fraud, it is determined that the risk is high, the resource provider may be provided with multiple opportunities (e.g., sequential, according to a loop) to provide additional information to ensure the success of the transaction, prior to the transaction being routed to a network transaction facilitator.

FIGS. 7A and 7B illustrate example operations associated with network transaction facilitator selection in accordance with some example embodiments described herein. The operations illustrated in FIGS. 7A and 7B may, for example, be performed by an NT integration server 1812, which may include means, such as memory 2102, processor 2104, input/output module 2106, communications module 2108, NT integration module 2110, and/or the like, which are collectively configured for NT integration. The operations may further be performed by one or more client devices 1808A-N, which may include means, such as memory 2202, processor 2204, input/output module 2206, communications module 2208, and/or the like.

In some embodiments, shown in FIGS. 7A and 7B, at step/operation 702, the process 700 includes receiving a network transaction request data structure including a website identifier, an end-user identifier, and network transaction request metadata. The network transaction request metadata may include a transaction type, a transaction amount, a service type, a goods type, a payment mechanism type, historical transaction data associated with the end-user identifier, historical transaction data associated with the website identifier, or website data associated with the website identifier.

In some embodiments, shown in FIGS. 7A and 7B, at step/operation 706, the process 700 includes, responsive to determining (704A), based at least in part on the network transaction request metadata, that the network transaction request data structure is associated with a legitimacy score above a legitimacy threshold, for a subset of network transaction facilitator of a plurality of network transaction facilitators, generating, based at least in part on applying one or more models to the network transaction request metadata, a network transaction facilitator approval score. The network transaction facilitator approval score represents a programmatically generated likelihood that the network transaction facilitator will approve completion of a network transaction associated with the network transaction request data structure.

In some embodiments, shown in FIGS. 7A and 7B, at step/operation 708, the process 700 includes transmitting the network transaction request data structure to a network transaction facilitator of the subset of network transaction facilitators having an accepted network transaction facilitator approval score as compared to the other network transaction facilitators.

In some embodiments, shown in FIGS. 7A and 7B, at step/operation 703, the process 700 includes generating, using one or more legitimacy prediction models and the network transaction request metadata. The legitimacy score represents a programmatically generated likelihood that one or more attributes associated with the network transaction are legitimate.

In some embodiments, shown in FIGS. 7A and 7B, at step/operation 704B, the process 700 includes, in an instance when is it determined (704A) the legitimacy score is below the threshold, causing performance of one or more fraud mitigating actions. That is, the process 700 may include determining 704A that the legitimacy score is below the threshold (e.g., that the transaction or one or more attributes associated with the transaction may not be legitimate). In such examples, the system may require additional information in order to have confidence that the network transaction is legitimate before the network transaction is routed and/or processed. The system may then perform or cause performance 704B (shown in FIG. 7B) of one or more fraud mitigating actions accordingly. The one or more fraud mitigating actions can include requesting proof of control of an email address, phone number, social media account, or cryptocurrency address known to be associated with a known non-fraudulent end-user identifier, or requesting proof of physical possession of a payment mechanism associated with the network transaction.

In some embodiments, at step/operation 705A (shown in FIG. 7B), the process 700 includes generating, using one or more improper dispute prediction models and the network transaction request metadata, an improper dispute prediction representing a programmatically generated likelihood that a dispute will be improperly or fraudulently initiated following completion of the network transaction.

In some embodiments, at steps/operations 705B and 705C (shown in FIG. 7B), the process 700 includes, in an instance when the improper dispute prediction exceeds the threshold, causing performance of one or more improper dispute mitigating actions. The one or more improper dispute mitigating actions may include canceling a potentially fraudulent order, issuing a refund, stopping or revoking a shipment, blocking communication with an end-user associated with the end-user identifier, requesting additional documentation or communication from the end-user, storing additional documentation associated with the network transaction.

In some embodiments, the one or more models, legitimacy prediction models, and/or the one or more improper dispute models are trained using historical transaction data including network transaction data associated with one or more of a plurality of end-user identifiers, a plurality of website identifiers, a plurality of dispute type identifiers, a plurality of network transaction facilitator identifiers, a plurality of network transaction intermediary identifiers, a plurality of network transaction endpoint identifiers, a plurality of dispute status change outcomes, a plurality of network transaction records, or historical website editing interactions associated with assembling websites associated with the plurality of website identifiers.

Example Network Transaction Intermediary Selection Operation Overview and Embodiments Embodiments herein provide for optimizing integration of various network transaction intermediaries in association with a website of a website building system. Conventionally, websites supported by a website building system may not have insight into whether network transactions entered into by the website would be more successful if the websites enabled transactions to be supported by different network transaction intermediaries (e.g., offering Venmo or Affirm as payment options in addition to credit cards, debits cards, or prepaid cards).

Embodiments herein provide for matching optimal network transaction intermediaries with websites or resource providers such that the matching will result in increased conversion on checkout, fewer approval problems by the resource provider, increased satisfaction rate, or improvement in any related metric relevant to the website.

Embodiments herein provide for such functionality by clustering websites (or users associated with websites, such as resource providers) according to similar compliances, regulations, supported network transaction intermediary, or other offerings, similar products and transaction patterns, or similar end-users.

FIG. 8 illustrates a schematic block diagram of an example architecture for network transaction intermediary selection in accordance with some example embodiments described herein. In FIG. 8, an example architecture 800 includes both backend (802) and frontend (804) components. The backend component 802 may include data storage elements (site properties 806B, transactional data 806C, a repository 812), business optimization key performance indicators (KPIs) 806A for assessing the performance of users, segmentation 808 of users or websites into groups, and a recommendation engine 810 for generating recommendations. The frontend component exposes the recommendations via a user dashboard 814 (e.g., interface).

Optimization KPIs 806A can include performance indicators that are aimed to be optimized by following the action recommendations generated by the system. The KPIs are defined mathematically as individual metrics (such as total sales) or tradeoffs between several metrics (such as maximizing conversion rate with minimal boundaries on fraud ratio). Chosen KPIs are used in the segmentation engine and recommendations generator.

Site properties 806B represent data collected from various aspects of the website such as its content, products, and services sold, traffic, and the like. These data points are used as features by the user segmentation engine 808. Traffic information and information on buyer behavior on the website are stored and later combined with checkout and transactional data (for example, the buyer checkout conversion ratio which represents the proportion of buyers who completed the checkout process among those who started the process).

Transactions data 806C is stored on a dedicated database which includes all the relevant information about each transaction made on the website. Transactional data may include any commercial transaction (succeeded or failed) between the user and WBS vendor (or the payment service offeror) and also between the buyer and the seller on the website. For each transaction, the current status is updated and logged.

User segmentation 808 divides the users (e.g., websites or website owners) into groups of users who share similar properties. User groups may be distinct (e.g., "hard clustering") or overlapping (e.g., "soft clustering"). Similarity among users is defined by similarity measure which is based on a selection of attributes ("features") selected from the database. Attributes may be selected from the site properties database, the transactional information database, a user properties database, or a combination of these sources (see further examples below). The list of attributes selected is specific to each business use case and may be selected automatically or manually. Once attributes are selected, a dedicated data structure will be used to represent each user. The user segmentation process is done by applying a machine learning algorithm that finds the optimal separation of users into groups.

Recommendation generator 801 is configured to generate recommendations from clustered data. Recommendations may be generated by: observing each user segment and analyzing its properties, identifying "successful" and "less successful" sites within each segment, based on the KPIs; identifying properties within each segment that are associated with the success of users within a segment (e.g., may explain differences in KPI); generating recommendations that may attribute to the success of the user.

In some embodiments, recommendations are statistically validated to have a significant expected contribution to user success. Recommendations may be subject external to guidelines which may restrict or limit specific possible recommendations based on domain expertise (for example, some payment methods operate in a limited subset of countries).

A repository 812 may be employed to store recommendations and metadata for future analysis and monitoring.

The user dashboard 814 may be employed to present output. Information on these systems is enriched with relevant information which helps the end-user understand the rationale behind each recommendation and analyze its potential impact—subject to the privacy and confidentiality of other users.

In some embodiments, key performance indicators (KPIs) are identified for optimization. Possible optimization metrics can be checkout conversion rate, transaction approval rate, and total sales. Optimization metrics can also be a combination of other metrics. The optimization metric can be defined in mathematical terms and may be observed or calculated based on available data. Similarity parameters are defined by an automatic process or by domain experts. These parameters represent aspects of similarity between users. For example, the type of product or services offered by the user. Each similarity parameter is a qualitative or quantitative characteristic of the user or website which can be compared among a group of users. Once a set of similarities is defined, users can be represented by this set of characteristics. Each similarity parameter may be represented by a number or a vector of numbers.

Users may be grouped into sub-groups ("segments" or "clusters") in a way that each segment of users would consist of users who share high similarities. User segmentation can be achieved by a number of machine learning algorithms such as K-means clustering, or hierarchical clustering. The result of the clustering process is a finite number of sub-group and the affiliation of each user to a group. Users can also be affiliated with more than one group, where affiliation is defined by the distance between each user and the cluster. This distance (or "strength" of connection) is expressed mathematically by the probability of cluster assignment. Not all users are necessarily assigned to a segment. For example, if a user is isolated from all the clusters, it may not be assigned to any cluster.

The statistical properties of each segment are further analyzed. Characteristics of interest include the size of the segment, similarity properties such as statistical properties, and the distribution of the similarity index. In addition, the optimization metric is compared among users. In each segment, users are assigned a relative score that indicates their ranking with respect to the optimization metric.

Segment analysis can be used to generate actionable growth recommendations for the users within each segment. For example, the system can recommend the user to add an additional payment method. In addition, recommendations can highlight the potential gain of initiating a sales campaign of specific type (such as email/social media etc.) or adjusting the products/services offered and their price. This process is based on identifying specific parameters which differ between users who are ranked high in the segment and those users who are ranked low with respect to this metric (e.g., or using any other suitable ranking system). An actionable recommendation can also be generated by analysis of causality which estimates the effect of taking specific actions on the optimization metric. This type of analysis focuses on estimating the impact of specific actions done by the user. For example, when several actions are recommended such as adding a new payment method, initiating a sales campaign of specific type or adjusting the products/services offered and their price, the system will analyze the expected gain of each action and rank the recommendations by their expected impact.

The realized effect and change in the optimization metric are monitored over time. Supplementary factors are also monitored, such as the number of recommendations generated in each segment and the user action rate following the receiving of action recommendations. The system may take such supplementary factors into account in future recommendations.

FIGS. 9A and 9B illustrate example operations associated with network transaction intermediary selection in accordance with some example embodiments described herein. The operations illustrated in FIGS. 9A and 9B may, for example, be performed by a NT integration server 1812, which may include means, such as memory 2102, processor 2104, input/output module 2106, communications module 2108, NT integration module 2110, and/or the like, which are collectively configured for NT integration. The operations may further be performed by one or more client devices 1808A-N, which may include means, such as memory 2202, processor 2204, input/output module 2206, communications module 2208, and/or the like.

In some embodiments, shown in FIGS. 9A and 9B, at step/operation 902, the process 900 includes retrieving a first website identifier.

In some embodiments, shown in FIGS. 9A and 9B, at step/operation 904, the process 900 includes retrieving one or more website clusters. In embodiments, each website of the one or more website clusters is associated with one or more website attributes, and a website cluster of the one or more website clusters is generated based at least in part on similarity measures associated with their respective website attributes.

In some embodiments, shown in FIGS. 9A and 9B, at step/operation 906, the process 900 includes determining that the first website identifier is associated with a first website cluster of the one or more website clusters.

In some embodiments, shown in FIGS. 9A and 9B, at step/operation 908, the process 900 includes, for a subset of network transaction intermediaries of a plurality of network transaction intermediaries, generating a network transaction intermediary score based at least in part on applying one or more trained models to first attributes and historical network transaction intermediary data associated with the first website cluster. In embodiments, the network transaction intermediary score represents a programmatically generated likelihood that integration of the network transaction intermediary for supporting network transactions associated with the website identifier will result in one or more of an increase in conversion rate for the website identifier, an increase in network transaction approvals for the website identifier, an increase in satisfaction rate associated with the website identifier, or an increase in a selected metric associated with the website identifier.

In some embodiments, shown in FIGS. 9A and 9B, at step/operation 910, the process 900 includes, based at least in part on a determination (909), that a network transaction intermediary having an acceptable network transaction intermediary score is not associated with the first website identifier, causing display of a network transaction intermediary recommendation interface via an interface of a client computing entity associated with the first website identifier.

In embodiments, the process further includes (not shown) dividing a plurality of website identifiers into one or more groupings based at least in part on the similarity measures associated with the one or more website attributes. The one or more website attributes comprise one or more of website properties, historical transaction data, editing user properties associated with an editing user identifier associated with a website identifier, historical editing interactions associated with the website identifier, or attributes associated with the website identifier. The process further includes (not shown) segmenting the one or more groupings using one or more trained clustering models into the one or more website clusters. In some embodiments, the one or more website attributes further comprise one or more of compliances, supported network transaction intermediaries, product similarities, transaction pattern similarities, end-user identifier device data, end-user location data, end-user registration duration, end-user status data, end-user profile attributes, end-user email address domain, end-user identifier device parameters, end-user identifier device third party application parameters, or end-user identifier support history and analysis.

In some embodiments, the historical editing interactions include electronic interactions associated with a plurality of editing user identifiers assembling websites based at least in part on one or more website building repositories. The one or more website building repositories store one or more website building tools including one or more of pages, sub-pages, containers, components, atomic components, content elements, layout elements, templates, or layout rules.

In some embodiments, the website properties include one or more of content, products sold, and services sold, traffic information, and purchaser behavior. The historical transaction data includes one or more of historical network transaction data associated with a website identifier and/or one or more end-user identifiers.

In some embodiments, network transactions are initiated in association with an end-user identifier via the website building system. The website building system may communicate regarding the network transactions with a network transaction facilitator. The network transaction facilitator may communicate with the network transaction intermediary regarding the network transactions. The network transaction intermediary may communicate with the network transaction endpoint regarding the network transactions.

FIGS. 9C, 9D, 9E, and 9F illustrate example user interfaces renderable in accordance with some example embodiments described herein.

Example Resource Provider Designation Operation Overview and Embodiments

Resource provider designations (e.g., MCC Codes (or Merchant Category Codes)) are used to identify the type of business in which a merchant or resource provider is engaged. MCC codes may be assigned to accounts as part of the onboarding process to a website building system platform and may be changed later as part of underwriting review. Resource provider designations play an important role in transaction approval. For example, online gambling is only permitted in specific states in the United States. Specific MCCs may be prohibited/restricted and a specific list of allowed MCCs may change in time. MCCs can also affect processing rates (e.g., riskier lines of business may be required to pay higher fees; cash back and reward points may be handled differently; handling by the IRS (whether it is a service or merchandise) may differ) and risk attributes of the resource provider. Therefore, the correct assignment of MCC is critical to ensure each resource provider is connected to the right network transaction facilitator (e.g., payment processor) and to ensure adequate risk management. Improper classification may result in unnecessary user friction and user frustration, among other issues.

Embodiments herein extract relevant information from different sources. Specifically, information is collected from products and services which appear on a website. Information collected includes products/services names, product/services description, visual information from the product image, and any other information which is part of products/services such as available variations (e.g., quantities offered, sizes, colors, etc.). In addition, embodiments herein collect relevant information about the resource provider (e.g., merchant) and websites such as textual information from other pages in the site, information from the user engagement with the WBS, and any other information which may help in selecting an appropriate or correct resource provider designation. Once the information is collected, the textual and visual information (e.g., graphical and textual) is processed to generate machine-readable data which can be processed by a machine-learning algorithm. These processes include natural language processing (NLP) and computer vision (CV) algorithms techniques. For example, the textual processing may include cleaning of stop words and removal of irrelevant tokens. Visual processing may include extraction of relevant tags (by applying object detection algorithms for example) which may be relevant for the resource provider designation (MCC selection). The list of available designations may also be processed to ensure only relevant designations are included in the analysis. Non-relevant designations may be removed from the training and test sets. Closely related designations may be grouped to form a group-level designation. Designations with a low number of websites may also be joined together based on their similarity.

Post-processing, machine-readable data may be provided or input to a machine-learning model. The model may be trained to map textual information into probabilistic prediction, where each designation (e.g., MCC) is assigned with a probability, based on its relevancy to the input data. Predictions are made on the product level, meaning the product or service is assigned with MCC distribution which reflects the probability it belongs to each MCC code. Product-level predictions are then aggregated to form a site-level prediction that reflects the main line of business of the site. The chosen MCC at the site level may be the MCC with the highest assigned MCC. Based on MCC distribution at the site level and the specific MCCs assigned the top probabilities, in cases where a general MCC is preferable, the chosen MCC may be any MCC that was assigned a high probability, not necessarily the top probability.

In some embodiments, a suggested MCC may be selected for suggestion, recommendation, or presentation based on whether the MCC makes the most sense for the given time and website. For example, a website with several offerings with similar MCCs may benefit from a higher level, more general MCC (and not necessarily one with high probability). In some embodiments, a suggested MCC may be selected for suggestion, recommendation, or presentation based on whether the MCC most accurately describes the merchant's business (e.g., a primary type of business in which the merchant is engaged). In some embodiments, a suggested MCC may be selected for suggestion, recommendation, or presentation based on whether it describes the business associated with the merchant that has the highest sales volume. In some embodiments, a suggested MCC may be selected for suggestion, recommendation, or presentation based on whether a miscellaneous MCC is appropriate for the merchant's business.

In some embodiments, a website building system may monitor offerings associated with a website and provide predictive changes or recommendations in anticipation of a beneficial change in MCCs for the website. In some embodiments, a website building system may monitor offerings associated with a website and provide predictive changes or recommendations in anticipation of a negative change in MCCs for the website (e.g., if a website is associated with an MCC for offering online books but starts selling ammunition and will be part of regulatory monitoring).

FIG. 10 illustrates a schematic block diagram of an example architecture for resource provider designation in accordance with some example embodiments described herein. In FIG. 10, a backend component 1002 may include data sources 1006A, 1006B, 1006C, and 1006D. The data sources may include information gathered regarding product/services titles 1006A, products/services descriptions

1006B, products/services visual information 1006C, and metadata 1006D of the website and user (e.g., industry name, type of editor used to create the site, the self-declared goal of the site, information about social media connected to the site, etc.). A machine-readable data module 1008 performs data processing, including data selection, data cleaning, tokenization, embedding, feature extraction, and any other process which is needed to make the data ready to be consumed by machine learning algorithms (1010).

A machine learning module 1010 maps data into probabilities which indicate the likelihood of the individual product to match each designation (e.g., MCC). A variety of machine learning models can be used for this mapping, including artificial neural networks, decision trees (e.g., CatBoost, adversarial machine learning, and Random Forests) and logistic regression. An engineering infrastructure is responsible for triggering model training at predefined intervals and prepares the relevant data for training. A repository 1012 is employed for storing raw data, model predictions of each stage, and final results, for later analysis. The data is consumed by reporting and visualization modules. A resource provider designation prediction module 1014 aggregates results from individual products. A frontend module 1004 includes a user dashboard 1016 (e.g., user interface) for reporting, visualization, and recommendations applications where model predictions are exposed to the final user in their raw form or as recommendations.

In some embodiments, a flow associated with architecture 1000 includes an initial phase of model training where labeled data is used to adjust model parameters. A next phase is inference, where the trained model is applied to new product data which is not labeled (e.g., not part of the training data). The output of this phase is a list of probabilities, representing the likelihood of the individual product to match each MCC or resource provider designation. The higher the probability, the more likely the product information associates with products from the specific MCC. As the site usually contains more than a single product or service, predictions of the individual product/service need to be aggregated into a site-level prediction. The aggregation process weighs individual products/services by their probability or by their rank. It will be appreciated that, in some embodiments weights for the aggregation may be determined by other factors such as the distribution of probabilities for the individual product, or any other suitable aggregation method.

The ranked MCCs per site represent the overall site category and probability of each MCC. Following MCC aggregation, additional considerations can be used depending on the final results of the aggregation process. For example, if the several MCCs share similar probability (which may occur in some drop-shipping sites or sites which see a variety of products), the system may choose to override the top MCC with a more general MCC which covers several relevant MCCs. User geo-location and other legal or compliance considerations may be applied.

FIGS. 11A and 11B illustrate example operations associated with resource provider designation in accordance with some example embodiments described herein. The operations illustrated in FIGS. 11A and 11B may, for example, be performed by an NT integration server 1812, which may include means, such as memory 2102, processor 2104, input/output module 2106, communications module 2108, NT integration module 2110, and/or the like, which are collectively configured for NT integration. The operations may further be performed by one or more client devices 1808A-N, which may include means, such as memory 2202, processor 2204, input/output module 2206, communications module 2208, and/or the like.

In some embodiments, shown in FIGS. 11A and 11B, at step/operation 1102, the process 1100 includes, retrieving website attributes associated with a first website identifier. In some embodiments, the website attributes include website context, product names offered by a website associated with the first website identifier, service names offered by the website, production descriptions offered by the website, service descriptions offered by the website, or visual data associated with products or services offered by the website.

In some embodiments, shown in FIGS. 11A and 11B, at step/operation 1104, the process 1100 includes, retrieving historical transaction data associated with an editing user identifier associated with the first website identifier and/or other website identifiers having similar website attributes to those of associated with the first website identifier. In some embodiments, the historical transaction data includes data associated with successful historical network transactions and unsuccessful historical network transaction.

In some embodiments, shown in FIGS. 11A and 11B, at step/operation 1106, the process 1100 includes, for a subset of resource provider designations of a plurality of resource provider designations, generating a resource provider designation score based at least in part on applying one or more trained models to the website attributes and the historical transaction data. In some embodiments, the resource provider designation score represents a programmatically generated likelihood that one or more network transaction endpoints will complete one or more future network transactions associated with the resource provider designation for the first website identifier. A resource provider designation represents a categorical classification associated with one or more products or services offered by a resource provider via one or more websites or webpages of a website. The resource provider designation is used in conjunction with one or more future network transactions.

In some embodiments, shown in FIGS. 11A and 11B, at step/operation 1108, the process 1100 includes, based at least in part on a determination (1107) that a resource provider designation has an acceptable resource provider designation score compared to resource provider designations, causing display of an resource provider designation recommendation interface via an interface of a client computing entity associated with the first website identifier.

An acceptable resource provider designation score is associated with at least a threshold high enough likelihood that one or more network transaction endpoints will complete one or more of the future network transactions associated with the resource provider designation. In other embodiments, an acceptable resource provider designation score may be associated with other criteria for selection of the resource provider through which a network transaction may be routed.

In some embodiments, the process further includes (not shown) extracting textual and visual elements associated with the first website identifier, and transforming the extracted textual and visual elements into a website attribute vector. Transforming the extracted textual and visual elements into the website attribute vector may include one or more of natural language processing, or computer vision processing.

In some embodiments, the process further includes (not shown) selecting the subset of resource provider designations of the plurality of resource provider designations based at least in part on eliminating less relevant resource provider designations. Generating the resource provider designation score is further based at least on probabilistic predictions assigned to each resource provider designation score in accordance with a product or service offered by the website, and then aggregating the probabilistic predictions.

Example Resource Provider Resilience Prediction Operation Overview and Embodiments Resource provider resilience prediction is directed to predicting or estimating a future well-being of a resource provider (e.g., merchant) at a specific network time or time period, such as the next week, month, quarter, year or other future time.

FIG. 12 illustrates a schematic block diagram of an example architecture for resource provider resilience prediction in accordance with some example embodiments described herein. Shown in FIG. 12, a backend component 1202 may include multiple data sources, including site content 1206A, a user catalog of products and services 1206B (including names of products and services, descriptions of products and services, images and other visual information), site traffic 106C, and metadata 1206D (e.g., associated with the website and/or user (for example, industry name, type of editor used to create the site, self-declared goal of the site, information about social media connected to the site, user interaction with the website building system (e.g., user engagement, site updates, interaction with user support), etc.)). A module processes the data to make it machine readable 1208. This module is responsible for all types of data processing, including data selection, data cleaning, tokenization, embedding and any other process which is needed to make the data ready to be consumed by machine learning algorithms. A machine learning (ML) module 1210 maps the data into a prediction 1214 of resource provider resilience. A variety of machine learning models can be used, including artificial neural networks, linear regression, decision trees (such as CatBoost, adversarial machine learning, and Random Forests) and Bayesian regression models. A repository 1212 is employed to store all data. A frontend module 1204 includes a user dashboard (e.g., user interface 1216) for reporting, visualization (e.g., textual and graphical), and recommendation applications.

FIGS. 13A and 13B illustrate example operations associated with resource provider resilience prediction in accordance with some example embodiments described herein. The operations illustrated in FIGS. 13A and 13B may, for example, be performed by a NT integration server 1812, which may include means, such as memory 2102, processor 2104, input/output module 2106, communications module 2108, NT integration module 2110, and/or the like, which are collectively configured for NT integration. The operations may further be performed by one or more client devices 1808A-N, which may include means, such as memory 2202, processor 2204, input/output module 2206, communications module 2208, and/or the like.

In some embodiments, shown in FIGS. 13A and 13B, at step/operation 1302, the process 1300 includes retrieving website resilience metadata associated with a website identifier. In some embodiments, the website resilience metadata includes historical network transaction data associated with the website identifier, editing user attributes associated with an editing user identifier associated with the website identifier, historical editing interactions associated with the editing user identifier, and website attributes associated with the website identifier.

In some embodiments, shown in FIGS. 13A and 13B, at step/operation 1304, the process 1300 includes, based at least in part on applying one or models to the website resilience metadata, generating a resource volume prediction and a disputed network transaction prediction associated with the website identifier. In some embodiments, the one or more models comprise a first trained model configured to generate the resource volume prediction and a second trained model configured to generate the disputed network transaction prediction. In some embodiments, a resource volume prediction represents a programmatically generated expected resource volume associated with a future network time and is based at least in part on one or more of site traffic, user conversion, site promotion, sales campaigns, interest rates, inflation, or seasonality. In some embodiments, the one or more models comprise a unified trained model configured to generate the resource volume prediction and the disputed network transaction prediction.

In some embodiments, shown in FIGS. 13A and 13B, at step/operation 1306, the process 1300 includes, based at least in part on the resource volume prediction and the disputed network transaction prediction, generating a resource provider resilience score associated with the website identifier. In some embodiments, a unified model is employed to generate the resource provider resilience score associated with the website identifier. In some embodiments, the resource provider resilience score represents a financial health measure associated with a website identifier at a given network time. In some embodiments, resource volume includes collections from successful network transactions associated with offerings sold by the website. In some embodiments, a disputed network transaction prediction represents a programmatically generated number of future disputes likely to be initiated in association with future network transactions initiated by end-users associated with the website identifier.

In some embodiments, shown in FIGS. 13A and 13B, at step/operation 1308, the process 1300 includes transmitting or causing rendering of the resource provider resilience score via a display of a computing entity.

In some embodiments, shown in FIGS. 13A and 13B, at step/operation 1310, the process 1300 includes, responsive to determining that the resource provider resilience score is below a resilience threshold, cause performance of one or more resilience mitigating actions. The one or more resilience mitigation actions include notification transmissions, service interruptions, service limitations, additional action requirements, layout limitations, enabling or disabling of network transaction methods.

In some embodiments, the one or models are trained using historical website attributes, historical transaction data associated with the website building system, historical resource volume associated with websites assembled using the website building system, historical disputed network transaction data associated with the websites, historical transaction data associated with the websites, and editing user data. The one or more models may be one or more of neural networks, decision trees, or regression models.

In some embodiments, the historical editing interactions comprise electronic interactions associated with a plurality of editing user identifiers assembling websites based at least in part on one or more website building repositories. The one or more website building repositories store one or more website building tools comprising one or more of pages, sub-pages, containers, components, atomic components, content elements, layout elements, templates, or layout rules.

Example Network Transaction Facilitator Decision Trigger Identification Operation Overview and Embodiments Embodiments herein further provide for identifying decision trigger points where a website building system may expose a website identifier to a given network payment facilitator. This task is especially challenging because it involves finding the optimal time and means for exposing the website identifier to the network payment facilitator (e.g., and cannot be left to approximations).

FIG. 14 illustrates a schematic block diagram of an example architecture for identifying network transaction facilitator decision triggers in accordance with some example embodiments described herein. In FIG. 14, an example architecture 1400 includes a backend component 1402 including multiple data sources such as website content and building events 1406A (e.g., how many times the website draft was saved/published, how long did it take for the user to do it, did the user add features such as SEO, various personality insights (e.g., hesitancy, decisiveness, and more) associated with the user that are learned from their website content and building behavior, etc.), website traffic 1406C, catalog of products and services 1406B (e.g., including names of products and services, descriptions of products and services, images and other visual information), other metadata 1406D (e.g., user account metadata, for example, industry name, type of editor used to create the site, self-declared goal of the site, information about social media connected to the site, etc.).

A data processing module converts data into machine readable data 1408, providing all types of data processing, including data selection, data cleaning, tokenization, embedding and any other process which is needed to make the data ready to be consumed by machine learning algorithms.

A trigger determination engine 1414 provides for determination of trigger decisions as described herein. A repository 1412 is employed for storage of all data. A frontend component 1404 includes a user dashboard (e.g., user interface) for reporting, visualization (e.g., graphical and textual) and recommendations.

FIGS. 15A and 15B illustrate example operations associated with identifying network transaction facilitator decision triggers in accordance with some example embodiments described herein. The operations illustrated in FIGS. 15A and 15B may, for example, be performed by a NT integration server 1812, which may include means, such as memory 2102, processor 2104, input/output module 2106, communications module 2108, NT integration module 2110, and/or the like, which are collectively configured for NT integration. The operations may further be performed by one or more client devices 1808A-N, which may include means, such as memory 2202, processor 2204, input/output module 2206, communications module 2208, and/or the like.

In some embodiments, shown in FIGS. 15A and 15B, at step/operation 1502, the process 1500 includes receiving website assembly touch point data associated with a website assembled using the website building system. The website assembly touch point data is associated with electronic assembly interactions performed by a client computing entity associated with an editing user identifier. The website assembly touch point data comprises a plurality of website assembly touch point data records each associated with a touch point and a timestamp.

In some embodiments, shown in FIGS. 15A and 15B, at step/operation 1504, the process 1500 includes transforming the website assembly touch point data into an editing user vector comprising a plurality of features representative of the plurality of website assembly touch point data records.

In some embodiments, shown in FIGS. 15A and 15B, at step/operation 1506, the process 1500 includes retrieving one or more website vectors associated with websites having similar website attributes as those associated with the website.

In some embodiments, shown in FIGS. 15A and 15B, at step/operation 1508, the process 1500 includes, based at least in part on applying one or more models to one or more of the editing user vector and the one or more website vectors, identifying a trigger decision point, wherein the trigger decision point represents a decision to expose the website identifier to a given network transaction facilitator.

In some embodiments, shown in FIGS. 15A and 15B, at step/operation 1510, the process 1500 includes causing rendering of a network transaction facilitator exposure interface via an interface of the client computing entity, wherein the network transaction facilitator exposure interface comprises visual representation (e.g., graphical and textual) of the network transaction facilitator. In some embodiments, in addition to or instead of rendering the network transaction facilitator exposure interview, the process may include (not shown) initiating, triggering, or executing a workflow associated with exposing the website to the network transaction facilitator.

In some embodiments, the electronic assembly interactions comprise electronic interactions associated the editing user identifier assembling the website based at least in part on one or more website building repositories. The one or more website building repositories store one or more website building tools comprising one or more of pages, subpages, containers, components, atomic components, content elements, layout elements, templates, or layout rules.

Example Multiple Network Transaction Facilitator Overview and Embodiments

Embodiments provide for integration and support of multiple network transaction facilitators. In addition to the aforementioned technical drawbacks addressed by embodiments herein, as well as the technical solutions provided by embodiments herein, embodiments further provide for a virtual umbrella profile that results in flexible routing of network transactions to multiple integrated and supported network transaction facilitators ("NTF"). Not only does supporting routing of network transactions to multiple NTFs provide for flexibility in completing network transactions, but such technical implementations also eliminate the need for an editing user to build and integrate a complicated network transaction interface (e.g., a non-trivial task). Moreover, supporting multiple NTFs provides for routing of network transactions according to a wide variety of reasons and parameters, including optimizing transaction activity, ensuring transaction continuity when one or more NTFs is in a failure state, and more.

In some examples, an existing editing user (e.g., a merchant) may decide to provide new services via a website and associate those services with NTFs (e.g., accept payment for the services). The editing user may be onboarded via a first NTF (e.g., third-party payment provider, or a local one). The website associated with the editing user may now offer a new service that requires passing the editing user's information to a third party. The virtual umbrella profile associated with the editing user herein can provide the required information and to enable the new service without any additional requirements (e.g., additional information or electronic interactions) from the user.

In some examples, a new editing user (e.g., a merchant) may be onboarded via a first NTF and then provide a new service via a second NTF. Embodiments herein may utilize the virtual umbrella profile to onboard the editing user to the second NTF seamlessly and without any effort (e.g., additional information or electronic interactions) from the editing user.

In some examples, an editing user is onboarded via a first NTF or via both a first NTF and a second NTF. Embodiments herein utilize one or more trained machine learning models to discover relationships among editing user data, network transaction data, and more to determine that there is a high probability that either the first NTF or the second NTF is an optimal choice for routing network transactions. In such embodiments, network transactions may be automatically routed (as discussed in the present disclosure).

In some examples, an editing user is onboarded via a first NTF and the first NTF is about to suspend network transactions associated with the first NTF or one or more trained machine learning models are utilized to predict that there is a high probability that the user will be suspended. Embodiments herein ensure network transaction continuity for the editing user by automatically onboarding the editing user to a second NTF so that network transactions can be routed and completed through the second NTF.

In some examples, an editing user is onboarded via a first NTF and the first NTF is temporarily in an error or failure state (e.g., the provider service is down or unavailable). Embodiments herein ensure network transaction continuity for the editing user by automatically onboarding the editing user to a second NTF so that network transactions can be routed and completed through the second NTF. In addition or alternatively, embodiments herein detect that the first NTF is in an error or failure state and automatically route network transactions to the second NTF (e.g., if the editing user had previously been onboarded to the second NTF) while the first NTF is in the failure state and routes back to the first NTF when its service is restored.

Embodiments herein provide for centralized management of network transaction. By funneling multiple NTFs into one NTF profile (e.g., virtual master account or virtual umbrella profile), editing users and websites can streamline network transaction execution processes. This centralization simplifies network transaction management and reduces the complexity of handling transactions across different platforms.

Embodiments herein provide for flexibility and convenience. Users have the flexibility to automatically switch NTFs between NTF profiles, allowing them to adapt to changing needs and preferences. An example WBS has the flexibility to automatically switch NTFs between NTF profiles (temporarily switch to an active profile, when the current NTF is down, etc.). Additionally, the solution offers the convenience of using popular NTFs (e.g., PayPal, Venmo, and Stripe), which are widely recognized and trusted in the industry.

Embodiments herein provide for risk assessment and control. Embodiments herein involve conducting risk assessments before onboarding users to the NTF profile. This helps mitigate potential risks associated with network transactions and ensures a secure environment. Moreover, having control over network transactions through the master NTF profile enables editing users (e.g., merchants) to monitor and manage their transaction activities more effectively, all in one place.

FIG. 16A illustrates a schematic block diagram of an example architecture 1600 for supporting integration of multiple network transaction facilitators in accordance with some example embodiments described herein.

In FIG. 16A, NTF candidates 1604 may be rendered within a user interface 1602 accessible to a client computing device associated with an editing user identifier. In some embodiments, UI 1602 is a component of an example WBS, where the editing user identifies NTF candidates (e.g., payment methods) she wants to support for processing via her website. Rendering of the NTF candidates 1604 can also provide for rendering of NTF verification statuses and actions needed from the editing user to allow processing and receiving payouts associated with network transactions.

In FIG. 16A, a verification form 1606 may be rendered within user interface 1602. The verification form 1606 user interface 1602 is a component of the example WBS, where the editing user provides verification data (e.g., personal data required for a "know your customer" or "KYC" verification). The data required for verification (e.g., KYC) can be adjusted per context (e.g., per country, or otherwise).

In FIG. 16A, an onboarding API 1608 is a communication interface (e.g., an application programming interface) for receiving connections for NTFs, submission of verification data, NTF verification data, and retrieval of verification (e.g., enriched with consolidated 3rd party NTF verifications).

Also in FIG. 16A, a facilitator (e.g., NTF) router 1610 is configured to support configuration generation during connection and/or integration of NTFs, which includes both the selection of a network transaction profile for an NTF (e.g., using one or more trained machine learning models configured to predict an optimal NTF for the editing user, according to parameters associated with the website associated with the editing user (e.g., a line of business and network transaction acceptance rate, context such as location, site content, business type, etc. for context mapping)), triggering network transaction profile creation or updating in the network transaction profile module 1616.

Also in FIG. 16A, a verification confirmation module 1614 is configured to validate (e.g., or verify) and store verification data. The verification confirmation module 1614 is further configured to trigger verification synchronization with $3^{rd}$ party NTFs through the network transaction profile module 1616.

The network transaction profile module 1616 is configured to store network transaction profile configuration for an editing user's NTF candidates under a virtual umbrella profile as well as integration with $3^{rd}$ party NTFs. Integration further includes creating NTF accounts, updating NTF accounts, and listening to NTF callbacks. In some examples, an NTF profile is a 1-to-1 reflection of an NTF, and multiple NTFs can be a part of a user's overall profile (e.g., virtual umbrella profile).

Under NTF data aggregators 1612, an actions module 1612A is a data aggregator configured to map NTF verification data to actions (e.g., communications to an editing user regarding NTF verifications and associated statuses). Also under NTF data aggregators 1612, a limitations module 1612B is a data aggregator configured to map NTF verification data to limitations (e.g., capabilities of the editing user to receive pay-ins and payouts per NTF, update specific KYC form fields, etc.). Also under NTF data aggregators 1612, a verifications module 1612C is a data aggregator configured to map NTF verification data to verifications (e.g., errors during NTF verifications mapped to unified errors, which includes absent or incorrect field/field block/document).

In FIG. 16A, facilitator 1 1618A, facilitator 2 1618B, . . . facilitator N 1618N are NTFs that assist websites (or other merchants) with execution and completion of network transactions (NTFs and network transaction are defined below).

Also in FIG. 16A, a network transaction user interface (UI)(e.g., a checkout UI) 1620A is a component within a website, whereby transaction data (e.g., payment card data) is received from a client computing device, feedback is presented/rendered, and where network transactions are ultimately initiated by an end user. The transaction API 1620B is an interface for interacting with a transaction module 1620C that triggers network transaction processing. The transaction module 1620C retrieves a corresponding or optimized NTF profile from the NTF profile module 1616 and triggers execution or initiates execution of a network transaction with an associated NTF (1618A, 1618B, . . . 1618N). A notification module 1622B is configured to generate and transmit communications to an editing user computing device 1622A.

FIG. 16B illustrates a schematic block diagram of an example data flow 1680 for supporting integration of multiple network transaction facilitators in accordance with some example embodiments described herein.

In FIG. 16B, a first data flow 1680A may include onboarding an editing user identifier with a WBS 1682 and creating a network transaction profile 1684 for the editing user identifier and associated website. The editing user identifier can then be assigned to an optimal network transaction facilitator 1686. Once the editing user provides verification data 1690, it is aggregated and stored in a NTF profile 1688 for the user/website. The verification data can also be transmitted to an NTF.

In FIG. 16B, a second data flow 1680B may include a secondary onboarding triggered by an editing user integrating an additional NTF 1699A or the system determining to integrate an additional NTF 1699B. Accordingly, onboarding an additional NTF 1694 is triggered. An NTF router determines whether additional data is needed 1696 (e.g., missing from the NTF profile) for the onboarding of the editing user to the new NTF. If so, the user is prompted to provide it, and the data is submitted to the new NTF. If no additional data is necessary, the appropriate data from the NTF profile is sent to the new NTF.

FIGS. 17A and 17B illustrate example operations associated with supporting integration of multiple network transaction facilitators in accordance with some example embodiments described herein. The operations illustrated in FIGS. 17A and 17B may, for example, be performed by a NT integration server 1812, which may include means, such as memory 2102, processor 2104, input/output module 2106, communications module 2108, NT integration module 2110, and/or the like, which are collectively configured for NT integration. The operations may further be performed by one or more client devices 1808A-N, which may include means, such as memory 2202, processor 2204, input/output module 2206, communications module 2208, and/or the like.

In FIGS. 17A and 17B, a process 1700 starts at operation 1702, where a first network transaction facilitator connection request is received from a computing device associated with an editing user identifier associated with a website identifier of a plurality of website identifiers. The website identifier is associated with a website assembled using one or more website building repositories of the website building system.

In FIGS. 17A and 17B, process 1700 continues at operation 1704, where a first NTF of a plurality of NTFs is integrated, based at least in part on the first network transaction facilitator (NTF) connection request, with a network transaction interface of the website. In some embodiments, integration involves a verification handshake (e.g., 1704A) with the first NTF.

In FIGS. 17A and 17B, process 700 continues at operation 1706, where, responsive to receiving (1706A) a network transaction request via the network transaction interface, the network transaction request is routed to the first NTF or a different NTF of the plurality of NTFs based at least in part on a network transaction profile associated with the website identifier. In some embodiments, routing the network transaction request comprises transmitting the network transaction request or an electronic message including some or all of the network transaction request to the appropriate NTF.

In some embodiments, the one or more website building repositories store one or more website building components and one or more website editing historical interactions associated with a plurality of editing user identifiers.

In some embodiments, a first verification request is transmitted to the first NTF associated with the first network transaction facilitator request, a first verification request. Responsive to receiving, from the first NTF, a first verification confirmation, the first NTF is integrated with the network transaction interface of the website such that editing of the website (e.g., the network transaction interface) is enabled to include the first NTF as an option for supporting or completing network transactions via the network transaction interface. In some embodiments, enabling editing of the interface comprises removing editing limitations or restrictions associated with the network transaction interface such that an editing user (or other user) may add the first NTF as an option for supporting or completing network transactions to the network transaction interface.

In some embodiments, a second NTF connection request is received from the computing device associated with the first editing user identifier. A second verification request is transmitted to a second NTF associated with the second NTF request, a second verification request. Responsive to receiving, from the second NTF, a second verification confirmation, the second NTF is integrated with the network transaction interface of the website such that editing of the website (e.g., the network transaction interface) is enabled to include the second NTF as an option for supporting or completing network transactions via the network transaction interface.

In some embodiments, an NTF recommendation interface is generated, based at least in part on the network transaction profile associated with the website identifier and one or more trained machine learning models, generate a NTF recommendation interface for rendering via a client computing device associated with the editing user identifier.

In some embodiments, asynchronous data updating is achieved by, responsive to receiving an NTF verification request from the first NTF, transmitting verification data to the first NTF. The first NTF is selected for the editing user identifier based at least in part on attributes associated with the editing user identifier and the website.

In some embodiments, the network transaction requested is received via a network transaction application programming interface (API) associated with the network transaction interface. In some embodiments, the network transaction request is routed to the first NTF via an NTF application programming interface (API). In some embodiments, an NTF account is established or updated with the first NTF provider on behalf of the editing user identifier (e.g., without input from or action by the editing user identifier).

FIGS. 23A and 23B illustrate signal diagrams of example operations associated with asynchronous updates for use with supporting integration of multiple network transaction facilitators in accordance with some example embodiments described herein.

In FIG. 23A, an asynchronous third party NTF data synchronization is illustrated where data submission success is confirmed for multiple NTFs. Via a verification form (e.g., "KYC Form UI"), a submission of verification data 2301 is received and an editing user can be onboarded via an Onboarding API. The user's verification data is updated 2302 via a verification module (e.g., "KYC module+Verifications"), and stored 2303 in a repository (e.g., "Store KYC"). Subsequently, asynchronous data synchronization 2304 with 3rd party NTFs can occur. For example, if verification data passes validation (e.g., is verified) at the NTF, the NTF may later send callbacks 2305 about verification status, a consolidated version of which the user can view as rendered via the KYC Form UI 2306. It will be appreciated that asynchronous data synchronization 2304 with NTF1 and NTF2 (among other NTFs) and callbacks 2305 from the NTFs (and responses to the same) are some examples of a verification handshake 1704 and 1704A.

Referring to 2304, when the user's verification data is received, it can be provided to NTFs (e.g., NTF1, NTF2), and the NTF can send a message in return indicating validation has passed. Referring to 2305, when a verification data callback is received from an NTF, associated data with the verification status is stored and an acknowledgment may be sent back to the NTF. Referring to 2306, responsive to receiving a request for verification from an editing user device, verifications can be provided from a payment profile module of a WBS and transmitted to the editing user device for display.

In FIG. 23B, an asynchronous third party NTF account update is illustrated where data submission failure is confirmed for some or all of multiple NTFs. Via a verification form (e.g., "KYC Form UI") a submission of verification data is received 2301 and an editing user can be onboarded via an Onboarding API. The user's verification data is updated 2302 via a verification module (e.g., "KYC module+Verifications"), and stored in a repository 2303 (e.g., "Store KYC"). Subsequently, asynchronous data synchronization 2310 with 3rd party payment provider NTFs can occur. For example, if verification/validation failed at the NTF, a validation/verification failure is stored in the NT profile ("Payment Profile") module, and after other 3rd party NTFs later send callbacks 2311 about verification status, the user can view, rendered via KYC Form UI, a consolidated version 2312 of them together with validation errors.

It will be appreciated that asynchronous data synchronization 2310 with NTF1 and NTF2 (among other NTFs) and callbacks 2311 from the NTFs (and responses to the same) are some examples of a verification handshake 1704 and 1704A.

Referring to 2310, when an attempt to synchronize data with an NTF fails—as shown in FIG. 23B with respect to 2310 and NTF1, a message is received from the NTF (e.g., NTF1) indicating the validation has failed and validation data is stored accordingly. Further with reference to 2310, when an attempt to synchronize data with an NTF is successful—as shown in FIG. 23B with respect to 2310 and NTF2, a message indicating validation has passed is received. Referring to 2311, a verification data callback can be received from an NTF (e.g., NTF2), verification data is stored, an acknowledgment may be sent to the NTF (e.g., NTF2). Referring to 2312, subsequent requests for retrieval of verification data ("KYC with verifications") can be requested from an editing user, and verifications and validations can be transmitted to the editing user for display.

Example Terminology

The term "network transaction" refers to an electronic request initiated by an end-user associated with a currency transfer mechanism issued by a network transaction endpoint, where the network transaction is associated with an agreement by the end-user to provide a currency value in exchange for a good, service, or other offering from a website identifier. A network transaction can be initiated by an end-user via a website building system, and the website building system can route the network transaction via a network transaction facilitator to a network transaction intermediary. The network transaction intermediary may act as an arbiter between a first network transaction endpoint (e.g., associated with issuing the currency transfer (payment) mechanism to the end-user) and a second network transaction endpoint (e.g., associated with the website identifier or resource provider).

The term "network transaction identifier" refers to one or more items of data by which a network transaction may be uniquely identified. For example, a network transaction identifier may comprise one or more of ASCII text, encryption keys, identification certificates, a pointer, an IP address, a URL, a MAC address, a memory address, an object signature, a HASH value, or other unique identifier, or combinations thereof.

The terms "network transaction facilitator" of "NTF" refer to a network entity that enables transactions between websites (e.g., associated with a website identifier and resource provider) and client computing devices associated with end-user identifiers (e.g., consumers or customers). The network transaction facilitator has connections to various network transaction intermediaries and/or network transaction endpoints and supplies authorization and settlement services to those network transaction intermediaries and/or network transaction endpoints. In some embodiments, a network transaction facilitator is a payment processor or payment service provider (e.g., Adyen, PayPal, Stripe, Venmo, and the like). A network transaction facilitator may be associated with a network transaction facilitator identifier, which is one or more items of data by which the network transaction facilitator may be uniquely identified.

The term "virtual umbrella profile" refers to a data structure comprising data representative of NTFs available for servicing network transactions for a given website identifier. In some embodiments, a virtual umbrella profile may store NTF identifiers and/or additional data associated with the website identifier (e.g., and/or an editing user associated with the website identifier) in order to interact (e.g., establish accounts, support transactions, verify accounts, update accounts) with NTFs associated with the NTF identifiers.

The term "network transaction intermediary" refers to a network entity of a layer of entities comprising network transaction endpoints that process payment mechanisms of a specific category. In some examples, the payment mechanisms are payment cards. In some examples, the specific category is a brand of payment cards. In some examples, the network transaction intermediary is a card association (e.g., American Express, Discover, Diners Club, Troy, JCB, Visa, Mastercard, and the like).

The term "network transaction endpoint" refers to an entity responsible for serving as an ultimate endpoint for approving or receiving the proceeds associated with a network transaction. In some examples, a network transaction endpoint is a financial institution (e.g., a bank).

A network transaction endpoint can be associated with issuing a payment mechanism (e.g., referred to as an issuing network transaction endpoint or issuer), such that the network transaction endpoint issues payment mechanisms associated with a network transaction intermediary (e.g., branded payment cards) directly to end-users (e.g., consumers or cardholders). An end-user can initiate a network transaction (e.g., a purchase from a website or merchant via a website) and promises to pay the issuing network transaction endpoint for the network transaction. The issuing network transaction endpoint assumes liability for the network transaction on behalf of the end-user (e.g., if the consumer does not pay).

A network transaction endpoint (e.g., the same or a different network transaction endpoint) can be associated with acquiring or receiving as a result of a network transaction (e.g., referred to as an acquiring network transaction endpoint or acquirer), such that the network transaction endpoint accepts proceeds (e.g., funds) associated with the network transaction. The acquiring network transaction endpoint may be associated with a website identifier (e.g., a merchant). The acquiring network transaction endpoint assumes liability for the network transaction on behalf of the website identifier (e.g., the merchant) (e.g., if the merchant does not provide the goods or services purchased).

The term "website building tools" refers to structural objects or electronic building blocks used to assemble a website in accordance with a website building system as described herein. By way of example, website building tools may include pages, sub-pages, containers, components, atomic components, content elements, layout elements, templates, layouts, layout rules, add-on applications, third-party applications, procedural code, application programming interfaces, and the like.

The terms "website editing historical interactions," "editing historical interactions," and "historical editing interactions" refer to electronic interactions performed by client computing devices associated with editing user identifiers in the course of assembling a website in accordance with a website building system as described herein. For example, such interactions may include editing or selections of content, logic, layout, templates, elements, attributes, and/or temporal aspects of the interactions including timing between edits or selections. By way of further example, such interactions may include electronic interactions (e.g., mouse clicks, touch screen selections, cursor hovers, cursor selections, and/or the like) with website building tools, and/or temporal aspects of the interactions including timing between the electronic interactions.

The term "editing user identifier" refers to one or more items of data by which an editing user (e.g., a user building or editing a website using a website building system in accordance with embodiments herein) may be uniquely identified. For example, an editing user identifier may comprise one or more of ASCII text, encryption keys, identification certificates, a pointer, an IP address, a URL, a MAC address, a memory address, an object signature, a HASH value, or other unique identifier, or combinations thereof.

The term "website identifier" refers to one or more items of data by which a website may be uniquely identified. For example, a website identifier may comprise one or more of ASCII text, encryption keys, identification certificates, a pointer, an IP address, a URL, a MAC address, a memory address, an object signature, a HASH value, or other unique identifier, or combinations thereof.

The term "end-user data" refers to electronic interaction data associated with a plurality of end-user identifiers accessing a plurality of websites assembled in accordance with a website building system as defined herein.

The term "end-user identifier" refers to one or more items of data by which an end-user (e.g., a user accessing or interacting with a website assembled using a website building system in accordance with embodiments herein) may be uniquely identified. For example, an end-user identifier may comprise one or more of ASCII text, encryption keys, identification certificates, a pointer, an IP address, a URL, a MAC address, a memory address, an object signature, a HASH value, or other unique identifier, or combinations thereof.

The term "electronic interaction data" refers to electronic interactions performed by client devices with electronic interfaces (e.g., websites). Electronic interaction data may include interactions with a touch screen, mouse clicks, cursor positions, cursor hoverings, and the like. Electronic interaction data may further be associated with metadata, such as timestamps at a time which the electronic interaction occurred, such that the electronic interaction data includes temporal aspects.

The term "contextual compliance enforcement" refers to automated mechanisms for ensuring websites associated with a website building system are in compliance with standards in various contextual domains or contexts. Compliance may refer to meeting a threshold required in accordance with a particular domain.

The term "requesting entity" refers to a computing entity responsible for issuing a contextual compliance request associated with a website identifier. In some examples, the requesting entity may be a computing entity associated with an underwriting entity.

The term "contextual compliance request" refers to one or more items of data representing an electronic transmission from a requesting entity for compliance data associated with a website identifier in accordance with one or more contexts.

The term "contextual domain" refers to a subject, area, or particular domain of compliance for a website. In some examples, a contextual domain may refer to types or categories of a website (e.g., such that the website is not associated with forbidden subjects). In some embodiments, categorization of the website may be supported by third party data and/or machine learning or other AI applied to website attributes or other data known to a website building system supporting the website. In some examples, a contextual domain may refer to types or categories of products or services offered by a website. In some examples, a contextual domain may refer to whether financial transactions associated with a website are part of money laundering operations. In some embodiments, money laundering detection may be supported by machine learning or other AI applied to website attributes, transaction data, or other data known to a website building system supporting the website. In some examples, a contextual domain may refer to sanctions associated with the website (e.g., are one or more users associated with the website listed on regulatory lists associated with terrorism; is the website subject to other sanctions). In some examples, a contextual domain may refer to reputation data obtained via third party services or websites (e.g., crawling websites for comments or other information having positive or negative sentiments associated with a website or users associated with a website).

The term "contextual record" refers to a data structure identifying a contextual domain associated with a contextual compliance request. In some embodiments, the contextual domain may be associated with a unique identifier (e.g., a contextual domain identifier).

The term "resource provider" refers to an external entity (e.g., external to a website building system) that offers resources (e.g., digital goods, physical goods, services, and/or the like) to end-users via a website. The resource provider may offer the resources in exchange for payment, completed via network transactions. In some examples, the resource provider offers resources via a website supported by and/or assembled using a website building system. In some examples, the resource provider is a merchant or retailer.

The term "sanctions data" refers to one or more items of data associating a website identifier with a regulatory sanctions list by a regulator, terrorist financing, or otherwise forbidden activities, products, or services.

The term "reputation data" refers to one or more items of data associating a website identifier with one or more of positive sentiment data or negative sentiment data. In some examples, reputation data can be based on content associated with the website identifier on one or more websites.

The term "money laundering detection" refers to a determination as to whether currency transfers associated with a website identifier are performed in accordance with unlawful activities, such as money laundering.

The term "interface service entity" refers to an entity, module, service, or circuitry configured to generate, in response to a context-specific compliance score request, context-specific compliance score structures based at least in part on determining a respective compliance measure for a website identifier for a contextual domain of one or more contextual domains. In some embodiments a "context-specific compliance score request" is an electronic request for a compliance score (e.g., as part of a context-specific data structure) associated with a website identifier in accordance with a given context associated with the particular interface service entity.

The terms "compliance score" or "context-specific compliance score" refer to one or more items of data representative of a programmatically generated quantification of a level of compliance for a given website identifier within a given contextual domain. In some examples, the compliance score may represent how close to a compliance threshold for a given context a website identifier is at a given point of network time.

The term "aggregated compliance score" refers to one or more items of data representative of a programmatically generated quantification of a level of compliance for a given website identifier across multiple contextual domains (e.g., an aggregation of multiple context-specific compliance scores). In some examples, the aggregated compliance score may represent how close to an aggregated compliance threshold for multiple contexts a website identifier is at a given point of network time. In some examples, the aggregated compliance score is generated using one or more trained machine learning models. In some examples weights are applied to different context-specific compliance scores based on the selected contextual domains of a context-specific compliance request.

The term "aggregated compliance measure" refers to a digital translation or transformation of an aggregated compliance score into one or more buckets, levels, categorizations, or groupings. For example, an aggregated compliance score representing a website that is close to being out of compliance overall may be associated with an aggregated compliance measure representative of high risk.

The term "context-specific data structure" refers to a data structure having multiple records (e.g., also data structures) where each record can contain items of data associated with compliance scores for a given website identifier. In some examples, the records of a context-specific data structure provide reasons or justifications for an aggregated compliance score or one or more context-specific compliance scores. In some examples, the reasons or justifications may be indicative of whether, how, or why an aggregated compliance score was impacted by any of one or more context-specific compliance scores.

The term "contextual compliance response" refers to an electronic transmission provided to a requesting entity, where the electronic transmission includes one or more items of data representative of compliance associated with a website identifier. In some embodiments, a contextual compliance response may include an aggregated compliance score and one or more context-specific data structures.

The term "factor" refers to an item of data received from a source supporting an interface service entity (e.g., context-specific data). A factor is an input to a machine learning model (e.g., subject to scoring) and includes a key and a value.

The term "contextual domain specific factor table" refers to a data structure having multiple records (e.g., possibly a multi-dimensional matrix) comprising factors. In examples, the factors are elements of data received from data sources supporting context-specific interface service entities. In some examples, the contextual domain specific factor table is a configurable list. In some examples, a factor is received from a data source, and the key of the factor is matched to a contextual domain specific rule associated with the contextual domain specific factor table and the value of the factor is transformed into a numeric value and stored in the factor table.

The term "score justification" refers to one or more programmatically generated reasons for any given compliance score (e.g., whether context-specific or aggregated). In some embodiments, a score justification may provide insight as to what context-specific compliance scores impacted an aggregated compliance score. In some embodiments, a score justification may provide insight as to why factors impacted any given context-specific compliance scores. In some embodiments, a score justification may provide insight as to how a compliance score was impacted by factors or other compliance scores (e.g., increased, decreased, not impacted).

The term "compliance enforcement action" refers to an executable task that may be triggered based on a compliance score exceeding or not meeting a threshold. In some embodiments, compliance enforcement actions may include notification transmissions, service interruptions, service limitations, additional action requirements, layout limitations, enabling or disabling of network transaction methods.

The term "compliance score pattern" refers to a recurrence (e.g., multiple occurrences over time) of compliance scores violating a threshold.

The term "disputed network transaction" or "dispute" refers to a network transaction that an issuing network transaction endpoint reverses after the transaction requestor or cardholder disputes a charge on associated with a payment account held by the cardholder. In some examples, a dispute is referred to as a chargeback. In some examples, when a cardholder disputes a payment, an issuing network transaction endpoint (e.g., bank) will re-evaluate the transaction and, if the reason for the chargeback is legitimate (e.g., according to the bank), a credit is issued to the cardholder's account while the chargeback claim is processed and eventually resolved (e.g., either in favor of the cardholder or the merchant).

The term "disputed transaction data structure" refers to an electronic data structure having multiple records representing a programmatically generated compilation of data records or evidence records (e.g., one or more items of data containing evidence in support of the legitimacy or accuracy of a network transaction) associated with a network transaction associated with a disputed transaction.

The term "disputed network transaction notification" refers to one or more items of data representing initiation of or change associated with a dispute associated with a network transaction.

The term "dispute type identifier" refers to one or more items of data by which a dispute type may be uniquely identified. For example, a dispute type identifier may comprise one or more of ASCII text, encryption keys, identification certificates, a pointer, an IP address, a URL, a MAC address, a memory address, an object signature, a HASH value, or other unique identifier, or combinations thereof.

The term "dispute status" refers to a state of a disputed network transaction at a given network time. In some examples, a dispute status may be one of open, closed, under review, refunded, affirmed, or reversed. In some examples, an issuing network transaction endpoint controls the dispute status.

The term "network transaction record" refers to a data structure storing one or more items of data associate with a network transaction.

The term "network transaction dispute reversal score" refers to a programmatically generated likelihood that an issuing network transaction endpoint will change a dispute status associated with a disputed network transaction. In some embodiments, the network transaction dispute reversal score is generated using one or more machine learning models. In some embodiments, factors impacting a network transaction dispute reversal score include which issuing network transaction endpoint is associated with the disputed network transaction, a dispute reason, historical network transactions involving an end-user identifier (e.g., purchaser) and a website identifier (e.g., resource provider) associated with the disputed network transaction, a product or service type associated with the disputed network transaction, a transaction amount associated with the disputed network transaction, billing and/or shipping details associated with the disputed network transaction, an IP address of the end-user identifier (e.g., purchaser), previous transaction history (e.g., purchase history) associated with the end-user identifier, and/or a network transaction intermediary associated with the disputed network transaction. In some examples, a network transaction dispute reversal score may be transformed into a numerical value (e.g., 1-5), where each numerical value represents a bucket of percentage of likelihood the dispute status will be changed (e.g., the dispute will be reversed in favor of the resource provider and the resource provider will receive disputed funds honoring the transaction). In some examples, a value of 1 may represent 0-10% chance of change of dispute status, a value of 2 may represent 11-20% chance of change of dispute status, a value of 3 may represent 21-50% chance of change of dispute status, a value of 4 may represent 51-70% chance of change of dispute status, a value of 5 may represent 71-100% chance of change of dispute status. The foregoing values are merely examples for illustrative purposes and are not intended to be limiting.

In some examples, the network transaction dispute reversal score may be generated in part based on insights learned by a website building system with which the end-user identifier interacts and/or which supports the website associated with the disputed network transaction. In such examples, insights learned about the end-user identifier may impact the network transaction dispute reversal score based on whether the end-user identifier is associated with a bucket associated with behavior (e.g., conservative, etc.). In such examples, insights learned about a user associated with the website (e.g., the resource provider) may impact the network transaction dispute reversal score based on whether the user is associated with a bucket associated with behavior (e.g., conservative, etc.).

In some examples, a network transaction dispute reversal score may further be impacted based on a reputation associated with the resource provider and the network transaction endpoint (issuer). For example, a resource provider may have a reputation, from a viewpoint of the network transaction endpoint, of partially delivering or failing to deliver goods. In such a situation, the network transaction endpoint may be less inclined to change the dispute status such that it is reversed in favor of the resource provider.

The term "network transaction attribute" refers to one or more items of data associated with a network transaction. In some embodiments, a network transaction attribute may include a transaction amount, an end-user identifier, a network transaction identifier, a dispute status, a resource provider identifier, a website identifier, a network transaction endpoint identifier (e.g., an issuer and/or an acquirer), a network transaction intermediary identifier, a network transaction facilitator identifier, a product or service identifier or other description, a timestamp, payment mechanism details, and/or the like.

The term "approval interaction" refers to an electronic interaction whereby a selection is made via an interface and the selection represents approval of a data structure for submission to a network transaction endpoint.

The term "transaction type identifier" refers to one or more items of data by which a transaction type may be uniquely identified. For example, a transaction type identifier may comprise one or more of ASCII text, encryption keys, identification certificates, a pointer, an IP address, a URL, a MAC address, a memory address, an object signature, a HASH value, or other unique identifier, or combinations thereof.

The term "historical network transaction data" refers to historical transaction data comprising network transaction data associated with one or more of a plurality of end-user identifiers, a plurality of website identifiers, a plurality of dispute type identifiers, a plurality of network transaction facilitator identifiers, a plurality of network transaction intermediary identifiers, a plurality of network transaction endpoint identifiers, a plurality of dispute status change outcomes, a plurality of network transaction records, or historical website editing interactions associated with assembling websites associated with the plurality of website identifiers.) (historical transaction data comprises data associated with successful historical network transactions and unsuccessful historical network transaction.

The term "network transaction facilitator selection" refers to an automated mechanism for selecting a network transaction facilitator to which a network transaction should be routed based on an optimized likelihood of successful completion of the network transaction if it is routed to the network transaction facilitator.

The term "network transaction request data structure" refers to a data structure having one or more records (e.g., also data structures) storing network transaction request metadata.

The term "network transaction request metadata" refers to one or more items of data associated with a network transaction request (e.g., a transaction initiated by an end-user to purchase goods or services). In some examples, network transaction request metadata includes a transaction type, a transaction amount, a service type, a goods type, a payment mechanism type, historical transaction data associated with the end-user identifier, historical transaction data associated with the website identifier, website data associated with the website identifier, and/or the like.

The term "network transaction facilitator approval score" refers to a programmatically generated likelihood that a specific network transaction facilitator will approve completion of a network transaction. In some embodiments, a network transaction facilitator approval score may also represent a likelihood that the network transaction will not result in a dispute loss for the resource provider if the network transaction is routed through the specific network transaction facilitator.

The term "legitimacy prediction model" refers to one or more trained machine learning models configured to generate a legitimacy score.

The term "legitimacy score" refers to a programmatically generated likelihood that one or more attributes associated with the network transaction are legitimate.

The term "legitimate" refers to non-fraudulent attributes. In some examples, fraud is intentional deception and may cause loss of money or merchandise.

The term "fraud mitigating action" refers to an action automatically executable in order to mitigate the likelihood that a network transaction will be fraudulently completed. In some examples, fraud mitigating actions may include requesting proof of control of an email address, phone number, social media account, or cryptocurrency address known to be associated with a known non-fraudulent end-user identifier, requesting proof of physical possession of a payment mechanism associated with the network transaction, and/or the like.

The terms "improper dispute model" or "improper dispute prediction model" refer to one or more trained machine learning models configured to predict whether a given network transaction will result in a dispute being improperly or fraudulently initiated by the end-user initiating the given network transaction.

The term "improper dispute prediction" refers to a programmatically generated likelihood that a dispute will be improperly or fraudulently initiated following completion of the network transaction.

The term "improper dispute mitigating action" refers to an action automatically executable in order to mitigate the likelihood that a network transaction will be associated with an improperly initiated dispute. An improperly initiated dispute is one where an end-user initiates a dispute (e.g., chargeback) without proper reasoning (e.g., the end-user received the goods and is now requesting that their credit card company refund their money by way of reversing the transfer of funds to the merchant). Examples of improper dispute mitigating actions may include canceling a potentially fraudulent order, issuing a refund, stopping or revoking a shipment, blocking communication with an end-user, requesting additional documentation or communication from the end-user, storing additional documentation associated with the network transaction, and/or the like.

The term "website cluster" refers to a grouping of websites (e.g., data objects or vectors representing the websites) in such a way that websites in the same cluster are more similar (e.g., in some sense) to one another than to those websites in other website clusters. Website clusters may be generated or determined based on various website attributes associated with the websites and based on clustering analysis and/or machine learning.

The term "website attribute" refers to attributes associated with a website. In some examples, website attributes may include compliances, supported network transaction intermediaries, product similarities, transaction pattern similarities, end-user identifier device data, end-user location data, end-user registration duration, end-user status data, end-user profile attributes, end-user email address domain, end-user identifier device parameters, end-user identifier device third party application parameters, end-user identifier support history and analysis, website context, product names offered by a website, service names offered by the website, production descriptions offered by the website, service descriptions offered by the website, visual data associated with products or services offered by the website, and/or the like.

The term "similarity measure" refers to one or more items of data that quantify the similarity between two objects. In some examples, a similarity measure based on a distance metric or is an inverse of a distance metric (e.g., they take on large values for similar objects and either zero or a negative value for very dissimilar objects, or vice versa). Examples of functions for generating similarity measures include cosine similarity or RBF kernel functions.

The term "network transaction intermediary score" refers to a programmatically generated likelihood that integration of the network transaction intermediary for supporting network transactions associated with a website identifier will result in one or more of an increase in conversion rate for the website identifier, an increase in network transaction approvals for the website identifier, an increase in satisfaction rate associated with the website identifier, or an increase in a selected metric associated with the website identifier.

The term "historical network transaction intermediary data" refers to one or more items of data associated with a given network transaction intermediary for historical network transactions associated with websites having particular attributes. For example, historical network transaction intermediary data may represent patterns of successful or unsuccessful network transactions for websites having particular attributes when the network transactions were associated with a given network transaction intermediary.

The term "resource provider designation" refers to represents a categorical classification associated with one or more products or services offered by a resource provider via one or more websites or webpages of a website. In some examples, a resource provider designation is a merchant category code (e.g., a four-digit number listed in ISO 18245 for financial services). In some examples, a resource provider designation is used to reflect a category in which a merchant does business. A resource provide designation may be used to determine various fees changed to a resource provider, by network transaction endpoints when offering incentives (e.g., for spending in various categories), by network transaction intermediaries to define rules and restrictions for network transactions, and for tax purposes (e.g., whether a network transaction is associated with services or merchandise).

The term "resource provider designation score" refers to a programmatically generated likelihood that one or more network transaction endpoints will complete one or more future network transactions associated with a given resource provider designation for a website identifier. That is, the resource provider designation score represents a likelihood of successful network transactions if the resource provider were associated with a given resource provider designation. A resource provider designation score may be generated using one or more trained machine learning models and may be generated for multiple resource provider designations so that a resource provider may device which resource provider designation with which to be associated for network transactions.

The term "resource provider designation recommendation interface" refers to a computing environment that is configured to display one or more interface elements representative of recommendations associated with one or more resource provider designations.

The term "resource provider resilience" refers to resilience associated with a resource provider at a specific future time (e.g., next week, next month, next quarter, next year). In some examples, resilience refers to financial well-being. In some examples, financial well-being refers to the ability of a resource provider to successfully manage their platform (e.g., manage their inventory, generate revenues, pay bills and expenses, manage chargebacks, pay their debts and deal with unexpected financial emergencies). Resource provider resilience can impact financial planning, budget allocation, inventory management, supply chain optimization, and more.

The term "website resilience metadata" refers to one or more items of data associated with a website identifier. In some examples, website resilience metadata includes historical network transaction data associated with the website identifier, editing user attributes associated with an editing user identifier associated with the website identifier, historical editing interactions associated with the editing user identifier, and website attributes associated with the website identifier.

The term "resource volume prediction" refers to a programmatically generated expected resource volume associated with a future network time for a given website identifier. In some examples, a resource volume prediction is generated using a resource volume predictive model (e.g., one or more models) and is based at least in part on historical network transactions associated with the website identifier or similar websites. The resource volume prediction may further be based on one or more of site traffic, user conversion, site promotion, sales campaigns, interest rates, inflation, or seasonality. Resource volume may refer to collections (e.g., payments) from successful network transactions associated with offerings sold by the website.

The term "disputed network transaction prediction" refers to a programmatically generated number of future disputes likely to be initiated in association with future network transactions initiated by end-users associated with the website identifier. In some examples, a disputed network transaction prediction is generated using a disputed network transaction predictive model (e.g., one or more models) and is based at least in part on historical network transactions (e.g., and associated dispute statuses) associated with the website identifier or similar websites.

The term "resource provider resilience score" refers to a programmatically generated value representative of resource provider resilience associated with a specific resource provider. In some examples, the resource provider resilience score is generated using one or more trained machine learning models and is based at least in part on a disputed network transaction prediction and a resource volume prediction associated with the resource provider. In some examples, the one or more trained machine learning models are generated using models that are trained using historical website attributes, historical transaction data associated with the website building system, historical resource volume associated with websites assembled using the website building system, historical disputed network transaction data associated with the websites, historical transaction data associated with the websites, editing user data, and/or the like.

The term "resilience threshold" refers to a level of required, desired, or acceptable resilience associated with a resource provider. In some examples, a resource provider resilience score may be compared to a resilience threshold to determine whether resilience-mitigating actions should be executed.

The term "resilience mitigating action" refers to an automatically executable action for mitigating a lack of resilience associated with a resource provider (e.g., or a resource provider approaching resilience below a threshold). In some examples, resilience mitigating actions may be notification transmissions, service interruptions, service limitations, additional action requirements, layout limitations, enabling or disabling of network transaction methods, and/or the like.

The term "trigger decision point" refers to an instance of network time or an instance of interaction with a website at which a website building system initiates an exposure to a given network transaction facilitator (e.g., payment processor) for the website.

The term "website assembly touch point data" refers to one or more items of data associated with electronic assembly interactions performed by a client computing entity associated with an editing user identifier. In some examples, website assembly touch point data includes a plurality of website assembly touch point data records each associated with a touch point and a timestamp. A touch point may be a step or landing page associated with building a website via a website building system. A touch point data record may be a data structure containing a touch point identifier (e.g., one or more items of data by which a touch point may be uniquely identified) and associated with a timestamp (e.g., an indication of network time at which an editing user identifier interacted with the touch point represented by the touch point identifier).

The term "editing user vector" refers to a data structure having multiple records (e.g., also data structures) storing data representative of an editing user and a plurality of features representative of a plurality of website assembly touch point data records associated with the editing user (e.g., also can be associated with or store an editing user identifier).

The term "website vector" refers to a data structure having multiple website records (e.g., also data structures) storing data representative of and associated with a website.

The term "network transaction facilitator exposure interface" refers to a computing environment that is configured to display one or more interface elements representative of data associated with exposing a user to a network transaction facilitator.

The terms "trained machine learning model," "machine learning model," "model," or "one or more models" refer to a machine learning or deep learning task or mechanism. Machine learning is a method used to devise complex models and algorithms that lend themselves to prediction. A machine learning model is a computer-implemented algorithm that may learn from data with or without relying on rules-based programming. These models enable reliable, repeatable decisions and results and uncovering of hidden insights through machine-based learning from historical relationships and trends in the data. In some embodiments, the machine learning model is a clustering model, a regression model, a neural network, a random forest, a decision tree model, a classification model, or the like.

A machine learning model is initially fit or trained on a training dataset (e.g., a set of examples used to fit the parameters of the model). The model may be trained on the training dataset using supervised or unsupervised learning. The model is run with the training dataset and produces a result, which is then compared with a target, for each input vector in the training dataset. Based on the result of the comparison and the specific learning algorithm being used, the parameters of the model are adjusted. The model fitting may include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g., the number of hidden units in a neural network). In some embodiments, the model can be trained and/or trained in real-time (e.g., online training) while in use.

The machine learning models, one or more models, trained machine learning models, legitimacy prediction models, improper dispute prediction models, resource volume prediction models, and disputed network transaction prediction models as described above may make use of multiple ML engines, e.g., for analysis, recommendation generating, transformation, and other needs.

The system may train different ML models for different needs and different ML-based engines. The system may generate new models (based on the gathered training data) and may evaluate their performance against the existing models. Training data may include any of the gathered information, as well as information on actions performed based on the various recommendations.

The ML models may be any suitable model for the task or activity implemented by each ML-based engine. Machine learning models are known in the art and are typically some form of neural network. The term refers to the ability of systems to recognize patterns on the basis of existing algorithms and data sets to provide solution concepts. The more they are trained, the greater knowledge they develop.

The underlying ML models may be learning models (supervised or unsupervised). As examples, such algorithms may be prediction (e.g., linear regression) algorithms, classification (e.g., decision trees, k-nearest neighbors) algorithms, time-series forecasting (e.g., regression-based) algorithms, association algorithms, clustering algorithms (e.g., K-means clustering, Gaussian mixture models, DBscan), or Bayesian methods (e.g., Naïve Bayes, Bayesian model averaging, Bayesian adaptive trials), image to image models (e.g., FCN, PSPNet, U-Net) sequence to sequence models (e.g., RNNs, LSTMs, BERT, Autoencoders, transformer-based), models combining planning with other models (e.g., PDDL-based), or Generative models (e.g., GANs, diffusion-based models).

Alternatively, ML models may implement statistical algorithms, such as dimensionality reduction, hypothesis testing, one-way analysis of variance (ANOVA) testing, principal component analysis, conjoint analysis, neural networks, support vector machines, decision trees (including random forest methods), ensemble methods, and other techniques. Other ML models may be generative models (such as Generative Adversarial Networks, diffusion-based or auto-encoders) to generate definitions and elements.

In various embodiments, the ML models may undergo a training or learning phase before they are released into a production or runtime phase or may begin operation with models from existing systems or models. During a training or learning phase, the ML models may be tuned to focus on specific variables, to reduce error margins, or to otherwise optimize their performance. The ML models may initially receive input from a wide variety of data, such as the gathered data described herein.

In various embodiments and when appropriate for the particular task, one or more of the ML models may be implemented with rule-based systems, such as an expert system or a hybrid intelligent system that incorporates multiple AI techniques.

A rule-based system is used to store and manipulate knowledge to interpret information in a useful way. It is often used in artificial intelligence applications and research. Rule-based systems constructed using automatic rule inference, such as rule-based machine learning, may be included in this system type. An example a rule-based system is a domain-specific expert system that uses rules to make deductions or choices. For example, an expert system might help a doctor choose the correct diagnosis based on a cluster of symptoms, or select tactical moves to play a game. Rule-based systems can be used to perform lexical analysis to compile or interpret computer programs, or in natural language processing. Rule-based programming attempts to derive execution instructions from a starting set of data and rules.

A hybrid intelligent system employs, in parallel, a combination of methods and techniques from artificial intelligence subfields, such as: Neuro-symbolic systems; Neuro-fuzzy systems; Hybrid connectionist-symbolic models; Fuzzy expert systems; Connectionist expert systems; Evolutionary neural networks; Genetic fuzzy systems; Rough fuzzy hybridization; and/or Reinforcement learning with fuzzy, neural, or evolutionary methods as well as symbolic reasoning methods.

An example hybrid is a hierarchical control system in which the lowest, reactive layers are sub-symbolic. The higher layers, having relaxed time constraints, are capable of reasoning from an abstract world model and performing planning. Intelligent systems usually rely on hybrid reasoning processes, which include induction, deduction, abduction and reasoning by analogy.

The terms "client device," "computing device," "user device," "client computing entity" and the like may be used interchangeably to refer to computer hardware that is configured (either physically or by the execution of software) to access one or more of an application, service, or repository made available by a server and, among various other functions, is configured to directly, or indirectly, transmit and receive data. The server is often (but not always) on another computer system, in which case the client device accesses the service by way of a network.

Example client devices include, without limitation, smartphones, tablet computers, laptop computers, wearable devices (e.g., integrated within watches or smartwatches, eyewear, helmets, hats, clothing, earpieces with wireless connectivity, and the like), personal computers, desktop computers, enterprise computers, the like, and any other computing devices known to one skilled in the art in light of the present disclosure. In some embodiments, a client device is associated with a user.

The terms "data," "content," "digital content," "digital content object," "signal," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like.

The term "computer-readable storage medium" refers to a non-transitory, physical or tangible storage medium (e.g., volatile or non-volatile memory), which may be differentiated from a "computer-readable transmission medium," which refers to an electromagnetic signal. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization, or other physical properties transmitted through the transmission media.

Examples of non-transitory computer-readable media include a magnetic computer-readable medium (e.g., a floppy disk, hard disk, magnetic tape, or any other magnetic medium), an optical computer-readable medium (e.g., a compact disc read-only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer may read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

The terms "application," "software application," "app," "product," "service" or similar terms refer to a computer program or group of computer programs designed to perform coordinated functions, tasks, or activities for the benefit of a user or group of users. A software application may run on a server or group of servers (e.g., physical or virtual servers in a cloud-based computing environment). In certain embodiments, an application is designed for use by and interaction with one or more local, networked or remote computing devices, such as, but not limited to, client devices. Non-limiting examples of an application comprise website editing services, document editing services, word processors, spreadsheet applications, accounting applications, web browsers, email clients, media players, file viewers, collaborative document management services, videogames, audio-video conferencing, and photo/video editors.

In some embodiments, an application is a cloud product. When associated with a client device, such as a mobile device, communication with hardware and software modules executing outside of the application is typically provided via application programming interfaces (APIs) provided by the mobile device operating system.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The terms "illustrative," "example," "exemplary" and the like are used herein to mean "serving as an example, instance, or illustration" with no indication of qualitative assessment or quality level. Any implementation described herein as "exemplary" is not necessarily to be construed as preferred or advantageous over other implementations.

The phrases "in one embodiment," "according to one embodiment," and the like generally mean that the particular feature, structure, or characteristic following the phrase may be included in the at least one embodiment of the present disclosure and may be included in more than one embodiment of the present disclosure (importantly, such phrases do not necessarily refer to the same embodiment).

The terms "about," "approximately," or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "plurality" refers to two or more items.

The term "set" refers to a collection of one or more items. In some embodiments, a "set" may refer to a data structure or a construct having zero items such that it is an empty set.

The term "or" is used herein in both the alternative and conjunctive sense, unless otherwise indicated.

Having set forth a series of definitions called-upon throughout this application, an example system architecture and example apparatus are described below for implementing example embodiments and features of the present disclosure.

Example Computing Systems, Methods, and Apparatuses of the Disclosure

Methods, apparatuses, systems, and computer program products of the present disclosure may be embodied by any of a variety of computing devices. For example, the method, apparatus, system, and computer program product of an example embodiment may be embodied by a networked device, such as a server or other network entity, configured to communicate with one or more devices, such as one or more client devices. Additionally, or alternatively, the computing device may include fixed computing devices, such as a personal computer or a computer workstation. Still, further, example embodiments may be embodied by any of a variety of mobile devices, such as a portable digital assistant (PDA), mobile telephone, smartphone, laptop computer, tablet computer, wearable, or any combination of the aforementioned devices.

FIG. 18 illustrates a block diagram of an example system that may be specially configured within which embodiments of the present disclosure may operate. In this regard, FIG. 18 illustrates an overview of a computing system 1800 which may include one or more devices and sub-systems that are configured for performing some or all of the various operations and processes described herein. In some examples, such a system 1800 implements network transaction (NT) integration within a WBS via a network transaction integration system 1810 in accordance with some embodiments described herein.

The computing system 1800 is illustrated with an NT integration system 1810 communicably connected via a network 1802 to one or more client devices 1808A, 1808B, . . . 1808N (referred to as "client devices 1808"; the depictions in FIG. 18 of "N" client devices are merely for illustration purposes). Said differently, users may access the NT integration system 1810 over at least one communications network 1802 using one or more of client devices 1808. In some embodiments, each of the client devices 1808A-N is embodied by one or more user-facing computing devices embodied in hardware, software, firmware, and/or a combination thereof, configured for performing some or all of the NT integration system functionality described herein. That is, the client devices 1808A-N may include circuitry, modules, networked processors, a suitable network server, and/or other types of processing device (e.g., a controller or computing device of the client device 1808). For example, in some embodiments, a client device 1808A-N is embodied by a personal computer, a desktop computer, a laptop computer, a computing terminal, a smartphone, a netbook, a tablet computer, a personal digital assistant, a wearable device, a smart home device, and/or other networked devices that may be used for any suitable purpose in addition to performing some or all of the NT integration system functionality described herein. In some example contexts, the client device 1808A-N is configured to execute one or more computing programs to perform the various functionality described herein. For example, the client device 1808A-N may execute a web-based application or applet (e.g., accessible via a website), a software application installed to the client device 1808A-N (e.g., an "app"), or other computer-coded instructions accessible to the client device 1808.

In some embodiments, the client devices 1808A-N may include various hardware, software, firmware, and/or the like for interfacing with the NT integration system 1810. Said differently, a client device 1808A-N may be configured to access the NT integration system 1810 and/or to render information provided by the NT integration system 1810 (e.g., via a software application executed on the client device 1808). According to some embodiments, the client device 1808A-N comprises a display for rendering various interfaces. For example, in some embodiments, the client device 1808A-N is configured to display such interface(s) on the display of the client device 1808A-N for viewing, editing, and/or otherwise interacting with at least a selected component, which may be provided by the NT integration system 1810.

In some embodiments, the NT integration system 1810 includes one or more servers, such as NT integration server 1812. In some embodiments, the NT integration system 1810 comprises other servers and components, as described below with respect to the exemplary depicted embodiment of a website building system 1910 in FIG. 19.

NT integration server 1812 may be any suitable network server and/or other type of processing device. In this regard, the NT integration server 1812 may be embodied by any of a variety of devices, for example, the NT integration server 1812 may be embodied as a computer or a plurality of computers. For example, NT integration server 1812 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least a portion of the components illustrated with respect to server apparatus 2100 in FIG. 21 and described in connection therewith. The NT integration server 1812 may, in some embodiments, comprise several servers or computing devices performing interconnected and/or distributed functions. Despite the many arrangements contemplated herein, NT integration server 1812 is shown and described herein as a single computing device to avoid unnecessarily overcomplicating the disclosure.

In some embodiments, the NT integration server 1812 is configured, via one or more software modules, hardware modules, or a combination thereof, to access communications network 1802 for communicating with one or more of the client devices 1808. Additionally or alternatively, the NT integration server 1812 is configured, via software, hardware, or a combination thereof, to is configured to execute any of a myriad of processes associated with the implementing NT integration. Said differently, NT integration server 1812 may include circuitry, modules, networked processors, or the like, configured to perform some or all of the NT integration functionality, as described herein. In this regard, for example, in some embodiments, the NT integration server 1812 receives and processes data. For example, the client devices 1808A-N and/or an application may communicate with the NT integration system 1810 (e.g., NT integration server 1812) via one or more application programming interfaces (APIs), web interfaces, web services, or the like.

In some embodiments, the NT integration system 1810 includes at least one repository, such as repository 1814. Such repository(ies) may be hosted by the NT integration server 1812 or otherwise hosted by devices in communication with the NT integration server 1812. As depicted, in some embodiments, the NT integration server 1812 is communicably coupled with the repository 1814. In some embodiments, the NT integration server 1812 may be located remotely from repository 1814. In this regard, in some embodiments, the NT integration server 1812 is directly coupled to repository 1814 within the NT integration system 1810.

Alternatively or additionally, in some embodiments, the NT integration server 1812 is wirelessly coupled to the repository 1814. In yet other embodiments, the repository 1814 is embodied as a sub-system(s) of the NT integration server 1812. That is, the NT integration server 1812 may comprise repository 1814. Alternatively or additionally, in some embodiments, the repository 1814 is embodied as a virtual repository executing on the NT integration server 1812.

The repository 1814 may be embodied by hardware, software, or a combination thereof, for storing, generating, and/or retrieving data and information utilized by the NT integration system 1810 for performing the operations described herein. The repository 1814, in some embodiments, may comprise an object repository, a structure repository, a semi-structured repository, or a non-structured repository. For example, repository 1814 may be stored by any suitable storage device configured to store some or all of the information described herein (e.g., memory 2102 of the NT integration server 1812 or a separate memory system separate from the NT integration server 1812, such as one or more database systems, backend data servers, network databases, cloud storage devices, or the like provided by another device (e.g., online application or 3rd party provider), such as a Network Attached Storage (NAS) device or devices, or as a separate database server or servers). Repository 1814 may comprise data received from the NT integration server 1812 (e.g., via a memory 2102 and/or processor(s) 2104) and/or a client device 1808, and the corresponding storage device may thus store this data. The repository 1814 may store various data in any of a myriad of manners, formats, tables, computing devices, and/or the like. For example, in some embodiments, the repository 1814 includes one or more sub-repositories that are configured to store specific data processed by the NT integration system 1810. Repository 1814 includes information accessed and stored by the NT integration server 1812 to facilitate the operations of the NT integration system 1810.

NT integration system 1810 (e.g., NT integration server 1812) may communicate with one or more client devices 1808A-N via communications network 1802. Communications network 1802 may include any one or more wired and/or wireless communication networks including, for example, a wired or wireless local area network (LAN), personal area network (PAN), metropolitan area network (MAN), wide area network (WAN), or the like, or combinations thereof, as well as any hardware, software and/or firmware required for implementing the one or more networks (e.g., network routers, switches, hubs, etc.). For example, communications network 1802 may include a cellular telephone, mobile broadband, long-term evolution (LTE), GSM/EDGE, UMTS/HSPA, IEEE 802.11, IEEE 802.16, IEEE 802.20, Wi-Fi, dial-up, and/or WiMAX network.

Furthermore, the communications network 1802 may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. For instance, the networking protocol may be customized to suit the needs of the NT integration system 1810, such as JavaScript Object Notation (JSON) objects sent via a WebSocket channel. In some embodiments, the protocol is JSON over RPC, JSON over REST/HTTP, the like, or combinations thereof.

In some embodiments, the NT integration system 1810 is a standalone system. In other embodiments, the NT integration system 1810 is embedded inside a larger editing system. For example, in certain embodiments, the NT integration system 1810 is associated with a visual design system and further still, in some embodiments, the visual design system is one or more of a document building system, a website building system, or an application building system.

An example of an NT integration system (e.g., NT integration system 1810 as depicted in FIG. 18) is depicted in FIG. 19. In particular, FIG. 19 depicts a computing system 1900 including a website building system ("WBS") 1910 as an example NT integration system for the creation and/or update of, for example, hierarchical websites.

A WBS 1910 may be online (e.g., applications are edited and stored on a server or server set), off-line, or partially online (with web sites being edited locally but uploaded to a central server for publishing). A WBS 1910 may be accessed by a variety of users via a network 1902, including designers, subscribers, subscribing users or site editors, and code editors, which are the users designing the web sites, as well as end users which are the "users of users" accessing the created web sites. Although end users may typically access the WBS 1910 in a read-only mode, a WBS (and web sites) may allow end users to perform changes to a web site, such as adding or editing data records, adding talkbacks to news articles, adding blog entries to blogs, and/or the like.

In some embodiments, a WBS 1910 may allow multiple levels of users and different permissions and capabilities may be associated with and/or assigned to each level. For example, users may register with the WBS 1910 (e.g., via the WBS server which manages the users, web sites, and access parameters of the end users).

With reference to FIG. 19, in addition to an NT integration service 1912, and a repository 1914, a WBS 1910 may comprise a WBS site manager 1905, an object marketplace 1915, a RT (runtime) server 1920, a WBS editor 1930, a site generation system 1940 and a WBS content management system 2000. WBS 1910 is depicted in communication with embodiments of the client devices 1808A-N which are depicted as being operated by WBS vendor staff 1908A, WBS site designer 1908B (e.g., a user), a site viewer 1908N (e.g., a user of a user), as well as external systems 1970. For example, WBS vendor staff 1908A may be an employee of the pertinent website building system vendor and may create and maintain various WBS elements such as templates, content/layout elements, and/or the like. In some embodiments, a site designer 1908B may use WBS 1910 to build his site for use by site viewers 1908N.

Additionally or alternatively, a site designer 1908B may be an external site designer or consultant, though the website building system vendor may employ site designers 1908B, for example for the creation of template sites for inclusion in the WBS 1910. In some embodiments, site viewers 1908N may only view the system. Additionally or alternatively, in some embodiments, site viewers 1908N may be allowed some form of site input or editing (e.g., talkback sending or blog article posting). In still further embodiments, WBS 1910 comprises a limited site generation system 1940 configured to allow a viewer 1908N to build (e.g., a user page) within a social networking site. It is contemplated by this disclosure that a site viewer 1908N may also include a site designer 1908B.

In some embodiments, WBS site manager 1905 is used by site designer 1908B to manage his created sites (e.g., to handle payment for the site hosting or set permissions for site access). In some embodiments, WBS RT (runtime) server 1920 handles run-time access by one or more (e.g., possibly numerous) site viewers 1908N. In some embodiments, such access is read-only, but in certain embodiments, such access involves interactions that may affect back-end data or front-end display (e.g., purchasing a product or posting a comment in a blog). In some embodiments, WBS RT server 1920 serves pages to site designers 1908B (e.g., when previewing the site, or as a front-end to WBS editor 1930).

In some embodiments, object marketplace 1915 allows trading of objects (e.g., as add-on applications, templates, and element types) between object vendors and site designers 1908B through WBS 1910. In some embodiments, WBS editor 1930 allows site designer 1908B to edit site pages (e.g., manually or automatically generated), such as editing content, logic, layout, attributes, and/or the like. For example, in some embodiments, WBS editor 1930 allows site designer 1908B to adapt a particular template and its elements according to his business or industry.

In some embodiments, site generation system 1940 creates the actual site based on the integration and analysis of information entered by site designer 1908B (e.g., via questionnaires), pre-specified and stored in content management system 2000 together with information from external systems 1970 and internal information held within CMS 2000 that may be gleaned from the use of the WBS 1910 by other designers. Additionally or alternatively, CMS 2000 is held in centralized storage or locally by site designer 1908B. Example repositories of a CMS 2000 are described below with respect to FIG. 20.

With reference to FIG. 20, an example CMS 2000 is illustrated. The WBS 1910 may utilize a CMS 2000, comprising a series of repositories, stored over one or more servers or server farms, to support the creation of various websites. For example, CMS 2000 may include one or more of user information/profile repository 2012, WBS component repository 2016, WBS site repository 2009, business intelligence (BI) repository 2010, and editing history repository 2011. Additionally or alternatively, CMS 2000 may include one or more of questionnaire type repository 2001, content element (CE) type repository 2002, LE (layout element) type repository 2003, design kit repository 2004, filled questionnaires repository 2005, CER (content element repository) 2006, LER (layout element repository) 2007, layout selection store 2008, rules repository 2013, family/industry repository 2014, and ML/AI (machine learning/artificial intelligence) repository 2015. A CMS 2000 may also include a CMS coordinator 2017 to coordinate and control access to such one or more repositories.

It is contemplated by this disclosure that the WBS 1910 may be used to create and/or update hierarchical websites based on visual editing or automatic generation based on collected business knowledge, where collected business knowledge refers to the collection of relevant content to the web site being created which may be gleaned from, for example, external systems 670 or other sources. Further details regarding collected business knowledge are described in commonly-owned U.S. Pat. No. 10,073,923 which was filed May 29, 2017 as U.S. patent application Ser. No. 15/607,586, and is entitled "SYSTEM AND METHOD FOR THE CREATION AND UPDATE OF HIERARCHICAL WEBSITES BASED ON COLLECTED BUSINESS KNOWLEDGE," which application is incorporated by reference herein in its entirety.

In some embodiments, WBS 1910 uses internal data architecture to store WBS-based sites. For example, this architecture may organize the handled sites' internal data and elements inside the WBS 1910. This architecture may be different from the external view of the site (as seen, for example, by the end-users) and may also be different from the way the corresponding HTML pages sent to the browser are organized. For example, in some embodiments, the internal data architecture contains additional properties for each element in the page (e.g., creator, creation time, access permissions, link to templates, SEO-related information, and/or the like) that are relevant for the editing and maintenance of the site in the WBS 1910 but are not externally visible to end-users (or even to some editing users). The internal version of the sites may be stored in a site repository as further detailed below.

In some embodiments, a WBS 1910 is used with applications. For example, a visual application is a website including pages, containers, and components. Each page is separately displayed and includes one or more components. In some embodiments, components include containers as well as atomic components. In some embodiments, the WBS 1910 supports hierarchical arrangements of components using atomic components (e.g., text, image, shape, video, and/or the like) as well as various types of container components which contain other components (e.g., regular containers, single-page containers, multi-page containers, gallery containers, and/or the like). The sub-pages contained inside a container component are referred to as mini-pages, each of which may contain multiple components. Some container components may display just one of the mini-pages at a time, while others may display multiple mini-pages simultaneously.

In some examples, pages may use templates—general page templates or component templates. In an exemplary embodiment, an application master page containing components replicated in all other regular pages is a template. In another exemplary embodiments, an application header/footer, which repeats on all pages, is a template. In some embodiments, templates may be used for the complete page or page sections. A WBS 1910 may provide inheritance between templates, pages or components, possibly including multi-level inheritance, multiple inheritance and diamond inheritance (e.g., A inherits from B and C, and both B and C inherit from D). In some embodiments, a WBS 1910 supports site templates.

In some embodiments, the visual arrangement of components inside a page is a layout. In some embodiments, a WBS 1910 supports dynamic layout processing whereby the editing of a given component (or other changes affecting it such as externally-driven content change) may affect other components. Further details regarding dynamic layout processing are described in commonly-owned U.S. Pat. No. 10,185,703, which was filed Feb. 20, 2013 as U.S. patent application Ser. No. 13/771,119, and is entitled "WEB SITE DESIGN SYSTEM INTEGRATING DYNAMIC LAYOUT AND DYNAMIC CONTENT," which patent is incorporated by reference herein in its entirety.

In some embodiments, a WBS 1910 is extended using add-on applications, such as third-party applications and components, list applications, and WBS configurable applications. In certain embodiments, such add-on applications may be added and integrated into designed web sites. Such add-on applications may be purchased (or otherwise acquired) through a number of distribution mechanisms, such as being pre-included in the WBS design environment, from an application store (e.g., integrated into the WBS object marketplace 1915 or external) or directly from the third-party vendor. Such third-party applications may be hosted on the servers of the WBS vendor, the servers of the third-party application's vendor, and/or a 4th party server infrastructure.

In some embodiments, a WBS 1910 allows procedural code to be added to some or all of the entities (e.g., applications, pages, elements, components, and the like). Such code could be written in a standard language (such as JavaScript), an extended version of a standard language or a language proprietary to the specific WBS 1910. The executed code may reference APIs provided by the WBS 1910 itself or external providers. The code may also reference internal constructs and objects of the WBS 1910, such as pages, components and their attributes.

In some embodiments, the procedural code elements may be activated via event triggers which may be associated with user activities (e.g., mouse move or click, page transition and/or the like), activities associated with other users (e.g., an underlying database or a specific database record being updated by another user and/or the like), system events or other types of conditions. The activated code may be executed inside the WBS's client element (e.g., client devices 1808), the server platform, a combination of the two or a dynamically determined execution platform. Further details regarding activation of customized back-end functionality are described in commonly-owned U.S. Pat. No. 10,209,966, which was filed on Jul. 24, 2018 as U.S. patent application Ser. No. 16/044,461, and is entitled "CUSTOM BACK-END FUNCTIONALITY IN AN ONLINE WEBSITE BUILDING ENVIRONMENT," which patent is incorporated by reference herein in its entirety.

FIG. 21 illustrates a block diagram of an example apparatus that may be specially configured in accordance with an example embodiment of the present disclosure. In some embodiments, NT integration system 1810 and/or NT integration server 1812 is embodied by one or more computing systems, such as the apparatus 2100 as depicted and described in FIG. 21.

FIG. 21 shows a schematic block diagram of example modules or circuitry, some or all of which may be included in server apparatus 2100. As illustrated in FIG. 21, in accordance with some example embodiments, the server apparatus 2100 may include various means, such as memory 2102, processor 2104, input/output module 2106, communications module 2108, and/or NT integration module 2110. The server apparatus 2100 may be configured, using one or more of the modules 2102-2110, to execute the operations regarding implementing NT integration functionality with respect to FIGS. 1-20. Said differently, systems, methods, apparatuses, and/or computer program products as described herein are configured to transform or otherwise manipulate a general-purpose computer(s) so that it functions as a special-purpose computer to provide NT integration as described herein.

Although the use of the terms "module" and "circuitry" as used herein with respect to components 2102-2110 are described in some cases using functional language, it should be understood that the particular implementations necessarily include the use of particular hardware configured to perform the functions associated with the respective module or circuitry as described herein. It should also be understood that certain of these components 2102-2110 may include similar or common hardware. For example, two or more modules may both leverage use of the same processor, network interface, storage medium, or the like to perform their associated functions, such that duplicate hardware is not required for each module. It will be understood in this regard that some of the components or modules described in connection with the NT integration server 1812, for example, may be housed within this device, while other components or modules are housed within another of these devices, or by yet another device not expressly illustrated in FIG. 21. Said differently, in some embodiments, one or more external systems (such as a remote cloud computing and/or data storage system) may also be leveraged to provide at least some of the functionality discussed herein.

While the terms "module" and "circuitry" should be understood broadly to include hardware, in some embodiments, the terms "module" and "circuitry" also include software for configuring the hardware. That is, in some embodiments, each of the modules 2102-2110 may be embodied by hardware, software, or a combination thereof, for performing the operations described herein. In some embodiments, some of the modules 2102-2110 may be embodied entirely in hardware or entirely in software, while other modules are embodied by a combination of hardware and software. For example, in some embodiments, the terms "module" and "circuitry" may include processing circuitry, storage media, network interfaces, input/output devices, and the like. In some embodiments, other elements of the server apparatus 2100 may provide or supplement the functionality of a particular module or circuitry. For example, the processor 2104 may provide processing functionality, the memory 2102 may provide storage functionality, the communications module 2108 may provide network interface functionality, and the like.

In some embodiments, one or more of the modules 2102-2110 may share hardware, to eliminate duplicate hardware requirements. Additionally or alternatively, in some embodiments, one or more of the modules 2102-2110 may be combined, such that a single module includes means configured to perform the operations of two or more of the modules 2102-2110. Additionally or alternatively, one or more of the modules 2102-2110 may be embodied by two or more submodules.

In some embodiments, the processor 2104 (and/or co-processor or any other processing circuitry assisting or otherwise associated with the processor) may be in communication with the memory 2102 via a bus for passing information among components of, for example, NT integration server 1812. The memory 2102 is non-transitory and may include, for example, one or more volatile and/or non-volatile memories, or some combination thereof. In other words, for example, the memory 2102 may be an electronic storage device (e.g., a non-transitory computer readable storage medium). The memory 2102 may be configured to store information, data, content, applications, instructions, or the like, for enabling server apparatus 2100 (e.g., NT integration server 1812) to carry out various functions in accordance with example embodiments of the present disclosure.

Although illustrated in FIG. 21 as a single memory, memory 2102 may comprise a plurality of memory components. The plurality of memory components may be embodied on a single computing device or distributed across a plurality of computing devices. In various embodiments, memory 2102 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 2102 may be configured to store information, data, applications, instructions, or the like for enabling server apparatus 2100 to carry out various functions in accordance with example embodiments discussed herein. For example, in at least some embodiments, memory 2102 is configured to buffer data for processing by processor 2104. Additionally or alternatively, in at least some embodiments, memory 2102 is configured to store program instructions for execution by processor 2104. Memory 2102 may store information in the form of static and/or dynamic information. This stored information may be stored and/or used by the server apparatus 2100 (e.g., NT integration server 1812) during the course of performing its functionalities.

Processor 2104 may be embodied in a number of different ways and may, for example, include one or more processing devices configured to perform independently. Additionally, or alternatively, processor 2104 may include one or more processors configured in tandem via a bus to enable independent execution of instructions, pipelining, and/or multithreading. Processor 2104 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the apparatus, and/or remote or "cloud" processors. Accordingly, although illustrated in FIG. 21 as a single processor, in some embodiments, processor 804 comprises a plurality of processors. The plurality of processors may be embodied on a single computing device or may be distributed across a plurality of such devices collectively configured to function as NT integration server 1812. The plurality of processors may be in operative communication with each other and may be collectively configured to perform one or more functionalities of NT integration server 1812 as described herein.

In an example embodiment, processor 2104 is configured to execute instructions stored in the memory 2102 or otherwise accessible to processor 2104. Alternatively, or additionally, the processor 2104 may be configured to execute hard-coded functionality. As such, whether configured by hardware or software methods, or by a combination thereof, the processor 2104 may represent an entity (e.g., physically embodied in circuitry) capable of performing operations according to an embodiment of the present disclosure while configured accordingly. Alternatively, as another example, when the processor 2104 is embodied as an executor of software instructions, the instructions may specifically configure processor 2104 to perform one or more algorithms and/or operations described herein when the instructions are executed. For example, these instructions, when executed by processor 2104, may cause the server apparatus 2100 (e.g., NT integration server 1812) to perform one or more of the functionalities of system 1800 as described herein.

In some embodiments, the server apparatus 2100 further includes input/output module 2106 that may, in turn, be in communication with processor 2104 to provide an audible, visual, mechanical, or other output and/or, in some embodiments, to receive an indication of an input from a user, a client device 1808, or another source. In that sense, input/output module 2106 may include means for performing analog-to-digital and/or digital-to-analog data conversions. Input/output module 2106 may include support, for example, for a display, touchscreen, keyboard, button, click wheel, mouse, joystick, an image capturing device (e.g., a camera), motion sensor (e.g., accelerometer and/or gyroscope), microphone, audio recorder, speaker, biometric scanner, and/or other input/output mechanisms. Input/output module 2106 may comprise a user interface and may comprise a web user interface, a mobile application, a client device, a kiosk, or the like. The processor 2104 and/or user interface circuitry comprising the processor 2104 may be configured to control one or more functions of a display or one or more user interface elements through computer program instructions (e.g., software and/or firmware) stored on a memory accessible to the processor 2104 (e.g., memory 2102, and/or the like). In some embodiments, aspects of input/output module 2106 may be reduced as compared to embodiments where server apparatus 2100 may be implemented as an end-user machine or other type of device designed for complex user interactions. In some embodiments (like other components discussed herein), input/output module 2106 may even be eliminated from server apparatus 2100. Input/output module 2106 may be in communication with memory 2102, communications module 2108, and/or any other component(s), such as via a bus. Although more than one input/output module 2106 and/or other component may be included in server apparatus 2100, only one is shown in FIG. 21 to avoid overcomplicating the disclosure (e.g., like the other components discussed herein).

Communications module 2108, in some embodiments, includes any means, such as a device or circuitry embodied in either hardware, software, firmware or a combination of hardware, software, and/or firmware, that is configured to receive and/or transmit data from/to a network and/or any other device, circuitry, or module in communication with server apparatus 2100. In this regard, communications module 2108 may include, for example, a network interface for enabling communications with a wired or wireless communication network. For example, in some embodiments, communications module 2108 is configured to receive and/or transmit any data that may be stored by memory 2102 using any protocol that may be used for communications between computing devices. For example, communications module 2108 may include one or more network interface cards, antennae, transmitters, receivers, buses, switches, routers, modems, and supporting hardware and/or software, and/or firmware/software, or any other device suitable for enabling communications via a network. Additionally or alternatively, in some embodiments, communications module 2108 includes circuitry for interacting with the antenna(s) to cause transmission of signals via the antenna(e) or to handle receipt of signals received via the antenna(e). These signals may be transmitted by NT integration server 1812 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. Communications module 2108 may additionally or alternatively be in communication with the memory 2102, input/output module 2106 and/or any other component of server apparatus 2100, such as via a bus.

In some embodiments, NT integration module 2110 is included in the server apparatus 2100 and configured to perform the functionality discussed herein related to NT integration. In some embodiments, NT integration module 2110 includes hardware, software, firmware, and/or a combination of such components, configured to support various aspects of such NT integration-related functionality, features, and/or services of the NT integration module 2110 as described herein.

It should be appreciated that, in some embodiments, NT integration module 2110 performs one or more of such exemplary actions in combination with another module of the server apparatus 2100, such as one or more of memory 2102, processor 2104, input/output module 2106, and communications module 2108. For example, in some embodiments, NT integration module 2110 utilizes processing circuitry, such as the processor 2104 and/or the like, to perform one or more of its corresponding operations. In a further example, some or all of the functionality of NT integration module 2110 may be performed by processor 2104 in some embodiments. In this regard, some or all of the example NT integration processes and algorithms discussed herein may be performed by at least one processor 2104 and/or NT integration module 2110. It should also be appreciated that, in some embodiments, NT integration module 2110 may include a separate processor, specially configured field programmable gate array (FPGA), or application specific integrated circuit (ASIC) to perform its corresponding functions.

Additionally or alternatively, in some embodiments, NT integration module 2110 utilizes memory 2102 to store collected information. For example, in some implementations, NT integration module 2110 includes hardware, software, firmware, and/or a combination thereof, that interacts with repository 1914 (as illustrated in FIG. 19) and/or memory 2102 to send, retrieve, update, and/or store data values embodied by and/or associated with the NT integration module 2110.

FIG. 22 illustrates a block diagram of an example client apparatus that may be specially configured in accordance with an example embodiment of the present disclosure. In some embodiments, the client device 1808A, 1808B, 1808N is embodied by one or more computing systems, such as the client apparatus 2200 as depicted and described in FIG. 22. The client apparatus 2200 includes a memory 2202, processor 2204, input/output module 2206, and communications module 2208. The client apparatus 2200 may be configured using one or more of the sets of circuitry to execute the operations described herein. The modules 2202-2208 may function similarly or identically to the similarly-named modules depicted and described with respect to the server apparatus 2100. For purposes of brevity, repeated disclosure with regard to the functionality of such similarly-named sets of circuitry is omitted herein.

In some embodiments, one or more of the modules 2202-2208 are combinable. Alternatively or additionally, in some embodiments, one or more of the modules perform some or all of the functionality described associated with another component. For example, in some embodiments, one or more of the modules 2202-2208 are combined into a single module embodied in hardware, software, firmware, and/or a combination thereof.

Thus, particular embodiments of the subject matter have been described. While this specification contains many specific implementation details, these should not be construed as limitations on the scope of any inventions or of what may be claimed, but rather as description of features specific to particular embodiments of particular inventions. Other embodiments are within the scope of the following claims. Certain features that are described herein in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Any operational step shown in broken lines in one or more flow diagrams illustrated herein are optional for purposes of the depicted embodiment.

In some cases, the actions recited in the claims may be performed in a different order and still achieve desirable results. In addition, the processes depicted in the accompanying figures do not necessarily require the particular order shown, or sequential order, to achieve desirable results unless described otherwise. In certain implementations, multitasking and parallel processing may be advantageous.

Accordingly, non-transitory computer-readable storage media may be configured to store firmware, one or more application programs, and/or other software, which include instructions and/or other computer-readable program code portions that may be executed to control processors of the components of server apparatus 2100 and/or client apparatus 2200 to implement various operations, including the examples shown herein. As such, a series of computer-readable program code portions may be embodied in one or more computer program products and may be used, with a device, database, and/or other programmable apparatus, to produce the machine-implemented processes discussed herein. It is also noted that all or some of the information discussed herein may be based on data that is received, generated and/or maintained by one or more components of the NT integration server 1812 and/or client device 1808. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as systems, methods, apparatuses, computing devices, personal computers, servers, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions embodied in the computer-readable storage medium (e.g., computer software stored on a hardware device). Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein in connection with the components of NT integration server 1812 and client device 1808.

The computing systems described herein may include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with a client device or an admin user interacting with an admin device). Information/data generated at the client device may be received from the client device at the server.

The following exemplary embodiments are provided, the numbering of which is not to be construed as designating levels of importance or relevance.

Example 1. An apparatus for resource provider designation within a website building system, the apparatus comprising at least one processor and at least one non-transitory computer readable storage medium storing instructions that, when executed by the at least one processor, cause the apparatus to retrieve website attributes associated with a first website identifier. In some of these examples, the apparatus is further caused to retrieve historical transaction data associated with an editing user identifier associated with the first website identifier and/or other website identifiers having website attributes having threshold similarity measures as compared to those of associated with the first website identifier. In some of these examples, the apparatus is further caused to, for a subset of resource provider designations of a plurality of resource provider designations, generate a resource provider designation score based at least in part on applying one or more trained models to the website attributes and the historical transaction data. In some of these examples, the apparatus is further caused to, based at least in part on a determination that a resource provider designation has an acceptable resource provider designation score compared to resource provider designations, cause display of an resource provider designation recommendation interface via an interface of a client computing entity associated with the first website identifier.

Example 2. An apparatus according to Example 1, wherein the website attributes comprise one or more of a website context, product names offered by a website associated with the first website identifier, service names offered by the website, production descriptions offered by the website, service descriptions offered by the website, or visual data associated with products or services offered by the website.

Example 3. An apparatus according to any of the foregoing examples, wherein the historical transaction data comprises data associated with successful historical network transactions and unsuccessful historical network transaction.

Example 4. An apparatus according to any of the foregoing examples, wherein a resource provider designation score represents a programmatically generated likelihood that one or more network transaction endpoints will complete one or more future network transactions associated with the resource provider designation for the first website identifier.

Example 5. An apparatus according to any of the foregoing examples, wherein a resource provider designation represents a categorical classification associated with one or more products or services offered by a resource provider via one or more websites or webpages of a website.

Example 6. An apparatus according to any of the foregoing examples, wherein the resource provider designation is used in conjunction with one or more future network transactions.

Example 7. An apparatus according to any of the foregoing examples, wherein an acceptable resource provider designation score is associated with at least a threshold high enough likelihood that one or more network transaction endpoints will complete one or more of the future network transactions associated with the resource provider designation.

Example 8. An apparatus according to any of the foregoing examples, wherein the at least one non-transitory computer readable storage medium stores instructions that, when executed by the at least one processor, further cause the apparatus to retrieve the website attributes by extracting textual and visual elements associated with the first website identifier, and transforming the extracted textual and visual elements into a website attribute vector.

Example 9. An apparatus according to any of the foregoing examples, wherein transforming the extracted textual and visual elements into the website attribute vector comprises one or more of natural language processing, or computer vision processing.

Example 10. An apparatus according to any of the foregoing examples, wherein the at least one non-transitory computer readable storage medium stores instructions that, when executed by the at least one processor, further cause the apparatus to select the subset of resource provider designations of the plurality of resource provider designations based at least in part on eliminating less relevant resource provider designations.

Example 11. An apparatus according to any of the foregoing examples, wherein generating the resource provider designation score is further based at least on probabilistic predictions assigned to each resource provider designation score in accordance with a product or service offered by the website, and then aggregating the probabilistic predictions.

Example 12. A non-transitory computer readable storage medium for resource provider designation within a website building system, the non-transitory computer readable storage medium storing instructions that, when executed by at least one processor, cause an apparatus to retrieve website attributes associated with a first website identifier. In some of these examples, the apparatus is further caused to retrieve historical transaction data associated with an editing user identifier associated with the first website identifier and/or other website identifiers having threshold similarity measures as compared website attributes to those of associated with the first website identifier. In some of these examples, the apparatus is further caused to, for a subset of resource provider designations of a plurality of resource provider designations, generate a resource provider designation score based at least in part on applying one or more trained models to the website attributes and the historical transaction data. In some of these examples, the apparatus is further caused to, based at least in part on a determination that a resource provider designation has an acceptable resource provider designation score compared to resource provider designations, cause display of an resource provider designation recommendation interface via an interface of a client computing entity associated with the first website identifier.

Example 13. A non-transitory computer readable storage medium according to Example 12, wherein the website attributes comprise one or more of a website context, product names offered by a website associated with the first website identifier, service names offered by the website, production descriptions offered by the website, service descriptions offered by the website, or visual data associated with products or services offered by the website.

Example 14. A non-transitory computer readable storage medium according to any of the foregoing examples, wherein the historical transaction data comprises data associated with successful historical network transactions and unsuccessful historical network transaction.

Example 15. A non-transitory computer readable storage medium according to any of the foregoing examples, wherein a resource provider designation score represents a programmatically generated likelihood that one or more network transaction endpoints will complete one or more future network transactions associated with the resource provider designation for the first website identifier.

Example 16. A non-transitory computer readable storage medium according to any of the foregoing examples, wherein a resource provider designation represents a categorical classification associated with one or more products or services offered by a resource provider via one or more websites or webpages of a website.

Example 17. A non-transitory computer readable storage medium according to any of the foregoing examples, wherein the resource provider designation is used in conjunction with one or more future network transactions.

Example 18. A non-transitory computer readable storage medium according to any of the foregoing examples, wherein an acceptable resource provider designation score is associated with at least a threshold high enough likelihood that one or more network transaction endpoints will complete one or more of the future network transactions associated with the resource provider designation.

Example 19. A non-transitory computer readable storage medium according to any of the foregoing examples, wherein the apparatus is further caused to retrieve the website attributes by extracting textual and visual elements associated with the first website identifier, and transforming the extracted textual and visual elements into a website attribute vector.

Example 20. A non-transitory computer readable storage medium according to any of the foregoing examples, wherein transforming the extracted textual and visual elements into the website attribute vector comprises one or more of natural language processing, or computer vision processing.

Example 21. A non-transitory computer readable storage medium according to any of the foregoing examples, the apparatus is further caused to select the subset of resource provider designations of the plurality of resource provider designations based at least in part on eliminating less relevant resource provider designations.

Example 22. A non-transitory computer readable storage medium according to any of the foregoing examples, wherein generating the resource provider designation score is further based at least on probabilistic predictions assigned to each resource provider designation score in accordance with a product or service offered by the website, and then aggregating the probabilistic predictions.

Example 23. A computer implemented method for resource provider designation within a website building system, the method comprising retrieving website attributes associated with a first website identifier. In some of these examples, the method further comprises retrieving historical transaction data associated with an editing user identifier associated with the first website identifier and/or other website identifiers having threshold similarity measures as compared website attributes to those of associated with the first website identifier. In some of these examples, the method further comprises, for a subset of resource provider designations of a plurality of resource provider designations, generating a resource provider designation score based at least in part on applying one or more trained models to the website attributes and the historical transaction data. In some of these examples, the method further comprises, based at least in part on a determination that a resource provider designation has an acceptable resource provider designation score compared to resource provider designations, causing display of an resource provider designation recommendation interface via an interface of a client computing entity associated with the first website identifier.

Example 24. A method according to Example 23, wherein the website attributes comprise one or more of a website context, product names offered by a website associated with the first website identifier, service names offered by the website, production descriptions offered by the website, service descriptions offered by the website, or visual data associated with products or services offered by the website.

Example 25. A method according to any of the foregoing examples, wherein the historical transaction data comprises data associated with successful historical network transactions and unsuccessful historical network transaction.

Example 26. A method according to any of the foregoing examples, wherein a resource provider designation score represents a programmatically generated likelihood that one or more network transaction endpoints will complete one or more future network transactions associated with the resource provider designation for the first website identifier.

Example 27. A method according to any of the foregoing examples, wherein a resource provider designation represents a categorical classification associated with one or more products or services offered by a resource provider via one or more websites or webpages of a website.

Example 28. A method according to any of the foregoing examples, wherein the resource provider designation is used in conjunction with one or more future network transactions.

Example 29. A method according to any of the foregoing examples, wherein an acceptable resource provider designation score is associated with at least a threshold high enough likelihood that one or more network transaction endpoints will complete one or more of the future network transactions associated with the resource provider designation.

Example 30. A method according to any of the foregoing examples, further comprising retrieving the website attributes by extracting textual and visual elements associated with the first website identifier, and transforming the extracted textual and visual elements into a website attribute vector.

Example 31. A method according to any of the foregoing examples, wherein transforming the extracted textual and visual elements into the website attribute vector comprises one or more of natural language processing, or computer vision processing.

Example 32. A method according to any of the foregoing examples, further comprising selecting the subset of resource provider designations of the plurality of resource provider designations based at least in part on eliminating less relevant resource provider designations.

Example 33. A method according to any of the foregoing examples, wherein generating the resource provider designation score is further based at least on probabilistic predictions assigned to each resource provider designation score in accordance with a product or service offered by the website, and then aggregating the probabilistic predictions.

Example 34. An apparatus for network transaction intermediary selection within a website building system, the apparatus comprising at least one processor and at least one non-transitory computer readable storage medium storing instructions that, when executed by the at least one processor, cause the apparatus to retrieve a first website identifier. In some of these examples, the apparatus is further caused to retrieve one or more website clusters, wherein each website of the one or more website clusters is associated with one or more website attributes, and a website cluster of the one or more website clusters is generated based at least in part on similarity measures associated with their respective website attributes. In some of these examples, the apparatus is further caused to determine that the first website identifier is associated with a first website cluster of the one or more website clusters. In some of these examples, the apparatus is further caused to, for a subset of network transaction intermediaries of a plurality of network transaction intermediaries, generate a network transaction intermediary score based at least in part on applying one or more trained models to first attributes and historical network transaction intermediary data associated with the first website cluster. In some of these examples, the apparatus is further caused to, based at least in part on a determination that a network transaction intermediary having an acceptable network transaction intermediary score is not associated with the first website identifier, cause display of a network transaction intermediary recommendation interface via an interface of a client computing entity associated with the first website identifier.

Example 35. An apparatus according to example 34, wherein the at least one non-transitory computer readable storage medium stores instructions that, when executed by the at least one processor, further cause the apparatus to generate the one or more website clusters by dividing a plurality of website identifiers into one or more groupings based at least in part on the similarity measures associated with the one or more website attributes, wherein the one or more website attributes comprise one or more of website properties, historical transaction data, editing user properties associated with an editing user identifier associated with a website identifier, historical editing interactions associated with the website identifier, or attributes associated with the website identifier. In some of these examples, the apparatus is further caused to generate the one or more website clusters by segmenting the one or more groupings using one or more trained clustering models into the one or more website clusters.

Example 36. An apparatus according to any of the foregoing examples, wherein the website properties comprise one or more of content, products sold, and services sold, traffic information, purchaser behavior.

Example 37. An apparatus according to any of the foregoing examples, wherein the historical transaction data comprises one or more of historical network transaction data associated with a website identifier and/or one or more end-user identifiers.

Example 38. An apparatus according to any of the foregoing examples, wherein the network transaction intermediary score represents a programmatically generated likelihood that integration of the network transaction intermediary for supporting network transactions associated with the website identifier will result in one or more of an increase in conversion rate for the website identifier, an increase in network transaction approvals for the website identifier, an increase in satisfaction rate associated with the website identifier, or an increase in a selected metric associated with the website identifier.

Example 39. An apparatus according to any of the foregoing examples, wherein the one or more website attributes further comprise one or more of compliances, supported network transaction intermediaries, product similarities, transaction pattern similarities, end-user identifier device data, end-user location data, end-user registration duration, end-user status data, end-user profile attributes, end-user email address domain, end-user identifier device parameters, end-user identifier device third party application parameters, or end-user identifier support history and analysis.

Example 40. An apparatus according to any of the foregoing examples, wherein network transactions are initiated in association with an end-user identifier via the website building system.

Example 41. An apparatus according to any of the foregoing examples, wherein the website building system communicates regarding the network transactions with a network transaction facilitator.

Example 42. An apparatus according to any of the foregoing examples, wherein the network transaction facilitator communicates with the network transaction intermediary regarding the network transactions.

Example 43. An apparatus according to any of the foregoing examples, wherein the network transaction intermediary communicates with the network transaction endpoint regarding the network transactions.

Example 44. An apparatus according to any of the foregoing examples, wherein the historical editing interactions comprise electronic interactions associated with a plurality of editing user identifiers assembling websites based at least in part on one or more website building repositories.

Example 45. An apparatus according to any of the foregoing examples, wherein the one or more website building repositories store one or more website building tools comprising one or more of pages, sub-pages, containers, components, atomic components, content elements, layout elements, templates, or layout rules.

Example 46. A non-transitory computer readable storage medium for network transaction intermediary selection within a website building system, the non-transitory computer readable storage medium storing instructions that, when executed by at least one processor, cause an apparatus to retrieve a first website identifier. In some of these examples the apparatus is further caused to retrieve one or more website clusters, wherein each website of the one or more website clusters is associated with one or more website attributes, and a website cluster of the one or more website clusters is generated based at least in part on similarity measures associated with their respective website attributes. In some of these examples, the apparatus is further caused to determine that the first website identifier is associated with a first website cluster of the one or more website clusters. In some of these examples, the apparatus is further caused to, for a subset of network transaction intermediaries of a plurality of network transaction intermediaries, generate a network transaction intermediary score based at least in part on applying one or more trained models to first attributes and historical network transaction intermediary data associated with the first website cluster. In some of these examples, the apparatus is further caused to, based at least in part on a determination that a network transaction intermediary having an acceptable network transaction intermediary score is not associated with the first website identifier, cause display of a network transaction intermediary recommendation interface via an interface of a client computing entity associated with the first website identifier.

Example 47. A non-transitory computer readable storage medium according to example 46, wherein the apparatus is further caused to generate the one or more website clusters by dividing a plurality of website identifiers into one or more groupings based at least in part on the similarity measures associated with the one or more website attributes, wherein the one or more website attributes comprise one or more of website properties, historical transaction data, editing user properties associated with an editing user identifier associated with a website identifier, historical editing interactions associated with the website identifier, or attributes associated with the website identifier. In some of these examples, the apparatus is further caused to generate the one or more website clusters by segmenting the one or more groupings using one or more trained clustering models into the one or more website clusters.

Example 48. A non-transitory computer readable storage medium according to any of the foregoing examples, wherein the website properties comprise one or more of content, products sold, and services sold, traffic information, purchaser behavior.

Example 49. A non-transitory computer readable storage medium according to any of the foregoing examples, wherein the historical transaction data comprises one or more of historical network transaction data associated with a website identifier and/or one or more end-user identifiers.

Example 50. A non-transitory computer readable storage medium according to any of the foregoing examples, wherein the network transaction intermediary score represents a programmatically generated likelihood that integration of the network transaction intermediary for supporting network transactions associated with the website identifier will result in one or more of an increase in conversion rate for the website identifier, an increase in network transaction approvals for the website identifier, an increase in satisfaction rate associated with the website identifier, or an increase in a selected metric associated with the website identifier.

Example 51. A non-transitory computer readable storage medium according to any of the foregoing examples, wherein the one or more website attributes further comprise one or more of compliances, supported network transaction intermediaries, product similarities, transaction pattern similarities, end-user identifier device data, end-user location data, end-user registration duration, end-user status data, end-user profile attributes, end-user email address domain, end-user identifier device parameters, end-user identifier device third party application parameters, or end-user identifier support history and analysis.

Example 52. A non-transitory computer readable storage medium according to any of the foregoing examples, wherein network transactions are initiated in association with an end-user identifier via the website building system.

Example 53. A non-transitory computer readable storage medium according to any of the foregoing examples, wherein the website building system communicates regarding the network transactions with a network transaction facilitator.

Example 54. A non-transitory computer readable storage medium according to any of the foregoing examples, wherein the network transaction facilitator communicates with the network transaction intermediary regarding the network transactions.

Example 55. A non-transitory computer readable storage medium according to any of the foregoing examples, wherein the network transaction intermediary communicates with the network transaction endpoint regarding the network transactions.

Example 56. A non-transitory computer readable storage medium according to any of the foregoing examples, wherein the historical editing interactions comprise electronic interactions associated with a plurality of editing user identifiers assembling websites based at least in part on one or more website building repositories.

Example 57. A non-transitory computer readable storage medium according to any of the foregoing examples, wherein the one or more website building repositories store one or more website building tools comprising one or more of pages, sub-pages, containers, components, atomic components, content elements, layout elements, templates, or layout rules.

Example 58. A computer implemented method for network transaction intermediary selection within a website building system, the method comprising retrieving a first website identifier. In some of these examples, the method further comprises retrieving one or more website clusters, wherein each website of the one or more website clusters is associated with one or more website attributes, and a website cluster of the one or more website clusters is generated based at least in part on similarity measures associated with their respective website attributes. In some of these examples, the method comprises determining that the first website identifier is associated with a first website cluster of the one or more website clusters. In some of these examples, the method further comprises, for a subset of network transaction intermediaries of a plurality of network transaction intermediaries, generating a network transaction intermediary score based at least in part on applying one or more trained models to first attributes and historical network transaction intermediary data associated with the first website cluster. In some of these examples, the method further comprises, based at least in part on a determination that a network transaction intermediary having an acceptable network transaction intermediary score is not associated with the first website identifier, causing display of a network transaction intermediary recommendation interface via an interface of a client computing entity associated with the first website identifier.

Example 59. A method according to example 58, further comprising generating the one or more website clusters by dividing a plurality of website identifiers into one or more groupings based at least in part on the similarity measures associated with the one or more website attributes, wherein the one or more website attributes comprise one or more of website properties, historical transaction data, editing user properties associated with an editing user identifier associated with a website identifier, historical editing interactions associated with the website identifier, or attributes associated with the website identifier. In some of these examples, generating the one or more website clusters further comprises segmenting the one or more groupings using one or more trained clustering models into the one or more website clusters.

Example 60. A method according to any of the foregoing examples, wherein the website properties comprise one or more of content, products sold, and services sold, traffic information, purchaser behavior.

Example 61. A method according to any of the foregoing examples, wherein the historical transaction data comprises one or more of historical network transaction data associated with a website identifier and/or one or more end-user identifiers.

Example 62. A method according to any of the foregoing examples, wherein the network transaction intermediary score represents a programmatically generated likelihood that integration of the network transaction intermediary for supporting network transactions associated with the website identifier will result in one or more of an increase in conversion rate for the website identifier, an increase in network transaction approvals for the website identifier, an increase in satisfaction rate associated with the website identifier, or an increase in a selected metric associated with the website identifier.

Example 63. A method according to any of the foregoing examples, wherein the one or more website attributes further comprise one or more of compliances, supported network transaction intermediaries, product similarities, transaction pattern similarities, end-user identifier device data, end-user location data, end-user registration duration, end-user status data, end-user profile attributes, end-user email address domain, end-user identifier device parameters, end-user identifier device third party application parameters, or end-user identifier support history and analysis.

Example 64. A method according to any of the foregoing examples, wherein network transactions are initiated in association with an end-user identifier via the website building system.

Example 65. A method according to any of the foregoing examples, wherein the website building system communicates regarding the network transactions with a network transaction facilitator.

Example 66. A method according to any of the foregoing examples, wherein the network transaction facilitator communicates with the network transaction intermediary regarding the network transactions.

Example 67. A method according to any of the foregoing examples, wherein the network transaction intermediary communicates with the network transaction endpoint regarding the network transactions.

Example 68. A method according to any of the foregoing examples, wherein the historical editing interactions comprise electronic interactions associated with a plurality of editing user identifiers assembling websites based at least in part on one or more website building repositories.

Example 69. A method according to any of the foregoing examples, wherein the one or more website building repositories store one or more website building tools comprising one or more of pages, sub-pages, containers, components, atomic components, content elements, layout elements, templates, or layout rules.

Example 70. An apparatus for identifying a trigger decision point associated with exposing a website identifier to a network transaction facilitator, the apparatus comprising at least one processor and at least one non-transitory computer readable storage medium storing instructions that, when executed by the at least one processor, cause the apparatus to receive website assembly touch point data associated with a website assembled using the website building system, wherein the website assembly touch point data is associated with electronic assembly interactions performed by a client computing entity associated with an editing user identifier, and wherein the website assembly touch point data comprises a plurality of website assembly touch point data records each associated with a touch point and a timestamp. In some of these examples, the apparatus is further caused to transform the website assembly touch point data into an editing user vector comprising a plurality of features representative of the plurality of website assembly touch point data records. In some of these examples, the apparatus is further caused to retrieve one or more website vectors associated with websites having similar website attributes as those associated with the website. In some of these examples, the apparatus is further caused to, based at least in part on applying one or more models to one or more of the editing user vector and the one or more website vectors, identify a trigger decision point, wherein the trigger decision point represents a decision to expose the website identifier to a given network transaction facilitator. In some of these examples, the apparatus is further caused to cause rendering of a network transaction facilitator exposure interface via an interface of the client computing entity, wherein the network transaction facilitator exposure interface comprises visual representation of the network transaction facilitator.

Example 71. An apparatus according to example 70, wherein the electronic assembly interactions comprise electronic interactions associated with the editing user identifier assembling the website based at least in part on one or more website building repositories.

Example 72. An apparatus according to any of the foregoing examples, wherein the one or more website building repositories store one or more website building tools comprising one or more pages, sub-pages, containers, components, atomic components, content elements, layout elements, templates, or layout rules.

Example 73. An apparatus according to any of the foregoing examples, wherein the at least one non-transitory computer readable storage medium stores instructions that, when executed by the at least one processor, further cause the apparatus to initiate performance of a network transaction facilitator exposure workflow.

Example 74. A non-transitory computer readable storage medium for identifying a trigger decision point associated with exposing a website identifier to a network transaction facilitator, the computer readable storage medium storing instructions that, when executed by at least one processor, cause an apparatus to receive website assembly touch point data associated with a website assembled using the website building system, wherein the website assembly touch point data is associated with electronic assembly interactions performed by a client computing entity associated with an editing user identifier, and wherein the website assembly touch point data comprises a plurality of website assembly touch point data records each associated with a touch point and a timestamp. In some of these examples, the apparatus is further caused to transform the website assembly touch point data into an editing user vector comprising a plurality of features representative of the plurality of website assembly touch point data records. In some of these examples, the apparatus is further caused to retrieve one or more website vectors associated with websites having similar website attributes as those associated with the website. In some of these examples, the apparatus is further caused to, based at least in part on applying one or more models to one or more of the editing user vector and the one or more website vectors, identify a trigger decision point, wherein the trigger decision point represents a decision to expose the website identifier to a given network transaction facilitator. In some of these examples, the apparatus is further caused to cause rendering of a network transaction facilitator exposure interface via an interface of the client computing entity, wherein the network transaction facilitator exposure interface comprises visual representation of the network transaction facilitator.

Example 75. A non-transitory computer readable storage medium according to example 74, wherein the electronic assembly interactions comprise electronic interactions associated with the editing user identifier assembling the website based at least in part on one or more website building repositories.

Example 76. A non-transitory computer readable storage medium according to any of the foregoing examples, wherein the one or more website building repositories store one or more website building tools comprising one or more pages, sub-pages, containers, components, atomic components, content elements, layout elements, templates, or layout rules.

Example 77. A non-transitory computer readable storage medium according to any of the foregoing examples, wherein the at least one non-transitory computer readable storage medium stores instructions that, when executed by the at least one processor, further cause the apparatus to initiate performance of a network transaction facilitator exposure workflow.

Example 78. A computer implemented method for identifying a trigger decision point associated with exposing a website identifier to a network transaction facilitator, the method comprising receiving website assembly touch point data associated with a website assembled using the website building system, wherein the website assembly touch point data is associated with electronic assembly interactions performed by a client computing entity associated with an editing user identifier, and wherein the website assembly touch point data comprises a plurality of website assembly touch point data records each associated with a touch point and a timestamp. In some of these examples, the method further comprises transforming the website assembly touch point data into an editing user vector comprising a plurality of features representative of the plurality of website assembly touch point data records. In some of these examples, the method further comprises retrieving one or more website vectors associated with websites having similar website attributes as those associated with the website. In some of these examples, the method further comprises, based at least in part on applying one or more models to one or more of the editing user vector and the one or more website vectors, identifying a trigger decision point, wherein the trigger decision point represents a decision to expose the website identifier to a given network transaction facilitator. In some of these examples, the method further comprises causing rendering of a network transaction facilitator exposure interface via an interface of the client computing entity, wherein the network transaction facilitator exposure interface comprises visual representation of the network transaction facilitator.

Example 79. A method according to example 78, wherein the electronic assembly interactions comprise electronic interactions associated with the editing user identifier assembling the website based at least in part on one or more website building repositories.

Example 80. A method according to any of the foregoing examples, wherein the one or more website building repositories store one or more website building tools comprising one or more pages, sub-pages, containers, components, atomic components, content elements, layout elements, templates, or layout rules.

Example 81. A method according to any of the foregoing examples, further comprising initiating performance of a network transaction facilitator exposure workflow.

Example 82. An apparatus for predicting resource provider resilience within a website building system, the apparatus comprising at least one processor and at least one non-transitory computer readable storage medium storing instructions that, when executed by the at least one processor, cause the apparatus to retrieve website resilience metadata associated with a website identifier, wherein the website resilience metadata comprises one or more of historical network transaction data associated with the website identifier, editing user attributes associated with an editing user identifier associated with the website identifier, historical editing interactions associated with the editing user identifier, and website attributes associated with the website identifier. In some of these examples, the apparatus is further caused to, based at least in part on applying one or models to the website resilience metadata, generate a resource volume prediction and a disputed network transaction prediction associated with the website identifier. In some of these examples, the apparatus is further caused to, based at least in part on the resource volume prediction and the disputed network transaction prediction, generate a resource provider resilience score associated with the website identifier. In some of these examples, the apparatus is further caused to transmit or cause rendering of the resource provider resilience score via a display of a computing entity.

Example 83. An apparatus according to example 82, wherein the one or more models comprise a first trained model configured to generate the resource volume prediction and a second trained model configured to generate the disputed network transaction prediction.

Example 84. An apparatus according to any of the foregoing examples, wherein a unified model is employed to generate the resource provider resilience score associated with the website identifier.

Example 85. An apparatus according to any of the foregoing examples, wherein the at least one non-transitory computer readable storage medium stores instructions that, when executed by the at least one processor, further cause the apparatus to responsive to determining that the resource provider resilience score is below a resilience threshold, cause performance of one or more resilience mitigating actions.

Example 86. An apparatus according to any of the foregoing examples, wherein the one or more resilience mitigation actions comprise one or more of notification transmissions, service interruptions, service limitations, additional action requirements, layout limitations, enabling or disabling of network transaction methods.

Example 87. An apparatus according to any of the foregoing examples, wherein the one or models are trained using historical website attributes, historical transaction data associated with the website building system, historical resource volume associated with websites assembled using the website building system, historical disputed network transaction data associated with the websites, historical transaction data associated with the websites, and editing user data.

Example 88. An apparatus according to any of the foregoing examples, wherein the one or more models comprise one or more of neural networks, decision trees, or regression models.

Example 89. An apparatus according to any of the foregoing examples, wherein the resource provider resilience score represents a financial health measure associated with a website identifier at a given network time.

Example 90. An apparatus according to any of the foregoing examples, wherein a resource volume prediction represents a programmatically generated expected resource volume associated with a future network time and is based at least in part on one or more of site traffic, user conversion, site promotion, sales campaigns, interest rates, inflation, or seasonality.

Example 91. An apparatus according to any of the foregoing examples, wherein resource volume comprises collections from successful network transactions associated with offerings sold by the website.

Example 92. An apparatus according to any of the foregoing examples, wherein the disputed network transaction prediction represents a programmatically generated number of future disputes likely to be initiated in association with future network transactions initiated by end-users associated with the website identifier.

Example 93. An apparatus according to any of the foregoing examples, wherein the historical editing interactions comprise electronic interactions associated with a plurality of editing user identifiers assembling websites based at least in part on one or more website building repositories.

Example 94. An apparatus according to any of the foregoing examples, wherein the one or more website building repositories store one or more website building tools comprising one or more of pages, sub-pages, containers, components, atomic components, content elements, layout elements, templates, or layout rules.

Example 95. A non-transitory computer readable medium for predicting resource provider resilience within a website building system, non-transitory computer readable storage medium storing instructions that, when executed by at least one processor, cause an apparatus to retrieve website resilience metadata associated with a website identifier, wherein the website resilience metadata comprises one or more of historical network transaction data associated with the website identifier, editing user attributes associated with an editing user identifier associated with the website identifier, historical editing interactions associated with the editing user identifier, and website attributes associated with the website identifier. In some of these examples, the apparatus is further caused to, based at least in part on applying one or models to the website resilience metadata, generate a resource volume prediction and a disputed network transaction prediction associated with the website identifier. In some of these examples, the apparatus is further caused to, based at least in part on the resource volume prediction and the disputed network transaction prediction, generate a resource provider resilience score associated with the website identifier. In some of these examples, the apparatus is further caused to transmit or cause rendering of the resource provider resilience score via a display of a computing entity.

Example 96. A non-transitory computer readable medium according to example 95, wherein the one or more models comprise a first trained model configured to generate the resource volume prediction and a second trained model configured to generate the disputed network transaction prediction.

Example 97. A non-transitory computer readable medium according to any of the foregoing examples, wherein a unified model is employed to generate the resource provider resilience score associated with the website identifier.

Example 98. A non-transitory computer readable medium according to any of the foregoing examples, wherein the apparatus is further caused to responsive to determining that the resource provider resilience score is below a resilience threshold, cause performance of one or more resilience mitigating actions.

Example 99. A non-transitory computer readable medium according to any of the foregoing examples, wherein the one or more resilience mitigation actions comprise one or more of notification transmissions, service interruptions, service limitations, additional action requirements, layout limitations, enabling or disabling of network transaction methods.

Example 100. A non-transitory computer readable medium according to any of the foregoing examples, wherein the one or models are trained using historical website attributes, historical transaction data associated with the website building system, historical resource volume associated with websites assembled using the website building system, historical disputed network transaction data associated with the websites, historical transaction data associated with the websites, and editing user data.

Example 101. A non-transitory computer readable medium according to any of the foregoing examples, wherein the one or more models comprise one or more of neural networks, decision trees, or regression models.

Example 102. A non-transitory computer readable medium according to any of the foregoing examples, wherein the resource provider resilience score represents a financial health measure associated with a website identifier at a given network time.

Example 103. A non-transitory computer readable medium according to any of the foregoing examples, wherein a resource volume prediction represents a programmatically generated expected resource volume associated with a future network time and is based at least in part on one or more of site traffic, user conversion, site promotion, sales campaigns, interest rates, inflation, or seasonality.

Example 104. A non-transitory computer readable medium according to any of the foregoing examples, wherein resource volume comprises collections from successful network transactions associated with offerings sold by the website.

Example 105. A non-transitory computer readable medium according to any of the foregoing examples, wherein the disputed network transaction prediction represents a programmatically generated number of future disputes likely to be initiated in association with future network transactions initiated by end-users associated with the website identifier.

Example 106. A non-transitory computer readable medium according to any of the foregoing examples, wherein the historical editing interactions comprise electronic interactions associated with a plurality of editing user identifiers assembling websites based at least in part on one or more website building repositories.

Example 107. A non-transitory computer readable medium according to any of the foregoing examples, wherein the one or more website building repositories store one or more website building tools comprising one or more of pages, sub-pages, containers, components, atomic components, content elements, layout elements, templates, or layout rules.

Example 108. A computer implemented method for predicting resource provider resilience within a website building system, the method comprising retrieving website resilience metadata associated with a website identifier, wherein the website resilience metadata comprises one or more of historical network transaction data associated with the website identifier, editing user attributes associated with an editing user identifier associated with the website identifier, historical editing interactions associated with the editing user identifier, and website attributes associated with the website identifier. In some of these examples, the method further comprises, based at least in part on applying one or models to the website resilience metadata, generating a resource volume prediction and a disputed network transaction prediction associated with the website identifier. In some of these examples, the method further comprises, based at least in part on the resource volume prediction and the disputed network transaction prediction, generating a resource provider resilience score associated with the website identifier. In some of these examples, the method further comprises transmitting or cause rendering of the resource provider resilience score via a display of a computing entity.

Example 109. A method according to example 108, wherein the one or more models comprise a first trained model configured to generate the resource volume prediction and a second trained model configured to generate the disputed network transaction prediction.

Example 110. A method according to any of the foregoing examples, wherein a unified model is employed to generate the resource provider resilience score associated with the website identifier.

Example 111. A method according to any of the foregoing examples, further comprising, responsive to determining that the resource provider resilience score is below a resilience threshold, causing performance of one or more resilience mitigating actions.

Example 112. A method according to any of the foregoing examples, wherein the one or more resilience mitigation actions comprise one or more of notification transmissions, service interruptions, service limitations, additional action requirements, layout limitations, enabling or disabling of network transaction methods.

Example 113. A method according to any of the foregoing examples, wherein the one or models are trained using historical website attributes, historical transaction data associated with the website building system, historical resource volume associated with websites assembled using the website building system, historical disputed network transaction data associated with the websites, historical transaction data associated with the websites, and editing user data.

Example 114. A method according to any of the foregoing examples, wherein the one or more models comprise one or more of neural networks, decision trees, or regression models.

Example 115. A method according to any of the foregoing examples, wherein the resource provider resilience score represents a financial health measure associated with a website identifier at a given network time.

Example 116. A method according to any of the foregoing examples, wherein a resource volume prediction represents a programmatically generated expected resource volume associated with a future network time and is based at least in part on one or more of site traffic, user conversion, site promotion, sales campaigns, interest rates, inflation, or seasonality.

Example 117. A method according to any of the foregoing examples, wherein resource volume comprises collections from successful network transactions associated with offerings sold by the website.

Example 118. A method according to any of the foregoing examples, wherein the disputed network transaction prediction represents a programmatically generated number of future disputes likely to be initiated in association with future network transactions initiated by end-users associated with the website identifier.

Example 119. A method according to any of the foregoing examples, wherein the historical editing interactions comprise electronic interactions associated with a plurality of editing user identifiers assembling websites based at least in part on one or more website building repositories.

Example 120. A method according to any of the foregoing examples, wherein the one or more website building repositories store one or more website building tools comprising one or more of pages, sub-pages, containers, components, atomic components, content elements, layout elements, templates, or layout rules.

Example 121. An apparatus for contextual compliance enforcement, the apparatus comprising at least one processor and at least one non-transitory computer readable storage medium storing instructions that, when executed by the at least one processor, cause the apparatus to receive, from a requesting entity, a contextual compliance request, the contextual compliance request comprising a website identifier, and one or more contextual records. In some of these examples, the apparatus is further caused to transmit, to one or more interface service entities and based at least in part on the one or more contextual records, a context-specific compliance score request. In some of these examples, the apparatus is further caused to receive, from the one or more interface service entities, one or more context-specific compliance score structures, wherein each context-specific compliance score structure of the one or more context-specific compliance score structures comprises a compliance score for the website identifier in accordance with a respective contextual record. In some of these examples, the apparatus is further caused to generate, based at least in part on applying one or more models to the one or more context-specific compliance score structures, an aggregated compliance score associated with the website identifier. In some of these examples, the apparatus is further caused to generate, based at least in part on the one or more context-specific compliance scores and the aggregated compliance score, a contextual compliance response comprising the aggregated compliance score and one or more context-specific data structures. In some of these examples, the apparatus is further caused to transmit, to the requesting entity, the contextual compliance response.

Example 122. An apparatus according to example 121, wherein the website identifier is associated with a website assembled in accordance with one or more website-building tools stored by one or more website-building repositories.

Example 123. An apparatus according to any of the foregoing examples, wherein the one or more website building tools comprise one or more of pages, sub-pages, containers, components, atomic components, content elements, layout elements, templates, or layout rules.

Example 124. An apparatus according to any of the foregoing examples, wherein a contextual record is associated with a contextual domain representative of content associated with the website identifier, product data or service data provided by a resource provider associated with the website identifier, sanctions data associated with the website identifier, reputation data associated with the website identifier, or money laundering detection associated with the website identifier.

Example 125. An apparatus according to any of the foregoing examples, wherein an interface service entity of the one or more interface service entities is configured to generate context-specific compliance score structures based at least in part on determining a respective compliance score for the website identifier for a contextual domain of one or more contextual domains.

Example 126. An apparatus according to any of the foregoing examples, wherein the one or more interface service entities comprise a third-party product categorization service.

Example 127. An apparatus according to any of the foregoing examples, wherein the third-party product categorization service is configured to receive product categorization streaming data from one or more external scanning services.

Example 128. An apparatus according to any of the foregoing examples, wherein the one or more interface service entities comprise a machine learning service.

Example 129. An apparatus according to any of the foregoing examples, wherein the machine learning service is configured to receive verification streaming data from one or more external scanning services and configured to generate at least a money laundering detection score.

Example 130. An apparatus according to any of the foregoing examples, wherein the one or more interface service entities comprise a website categorization service.

Example 131. An apparatus according to any of the foregoing examples, wherein the website categorization service is configured to receive website categorization streaming data from one or more website scanning services.

Example 132. An apparatus according to any of the foregoing examples, wherein the one or more interface service entities comprise a sanctions service.

Example 133. An apparatus according to any of the foregoing examples, wherein the sanctions service is configured to receive sanctions streaming data from one or more external sanctions-related data services.

Example 134. An apparatus according to any of the foregoing examples, wherein the one or more interface service entities comprise a reputation service.

Example 135. An apparatus according to any of the foregoing examples, wherein the reputation service is configured to receive reputational streaming data from one or more external reputational data services.

Example 136. An apparatus according to any of the foregoing examples, wherein the one or more interface service entities is associated with one or more of contextual domain specific rules, a contextual domain specific factor table, and one or more context-specific trained machine learning models.

Example 137. An apparatus according to any of the foregoing examples, wherein the contextual domain specific factor table comprises a configurable factor list.

Example 138. An apparatus according to any of the foregoing examples, wherein the configurable factor list comprises one or more factors, wherein each factor comprises a factor key and a factor value and is an element received from a data source.

Example 139. An apparatus according to any of the foregoing examples, wherein the one or more context-specific trained machine learning models are configured to generate one or more context-specific compliance scores based at least in part on the one or more factors.

Example 140. An apparatus according to any of the foregoing examples, wherein the one or more models are configured to apply one or more weights to the one or more context-specific compliance score structures to generate the aggregated compliance score.

Example 141. An apparatus according to any of the foregoing examples, wherein the one or more context-specific data structures comprise one or more score justifications grouped according to their respective impact on the aggregated compliance score.

Example 142. An apparatus according to any of the foregoing examples, wherein an aggregated compliance level represents a translation of the aggregated compliance score according to one or more contextual domains associated with the contextual compliance request.

Example 143. An apparatus according to any of the foregoing examples, wherein the at least one non-transitory computer readable storage medium stores instructions that, when executed by the at least one processor, further cause the apparatus to cause performance of one or more compliance enforcement actions based at least in part on one or more of the aggregated compliance score, one or more context-specific compliance scores, or a compliance score pattern associated with the website identifier.

Example 144. An apparatus according to any of the foregoing examples, wherein the one or more compliance enforcement actions comprise one or more of notification transmissions, service interruptions, service limitations, additional action requirements, layout limitations, enabling or disabling of network transaction methods.

Example 145. An apparatus according to any of the foregoing examples, wherein the requesting entity is associated with a website building service associated with the website identifier.

Example 146. An apparatus according to any of the foregoing examples, wherein the requesting entity is external to a website building service associated with the website identifier.

Example 147. A non-transitory computer readable storage medium for contextual compliance enforcement, the non-transitory computer readable storage medium storing instructions that, when executed by the at least one processor, cause the apparatus to receive, from a requesting entity, a contextual compliance request, the contextual compliance request comprising a website identifier, and one or more contextual records. In some of these examples, the apparatus is further caused to transmit, to one or more interface service entities and based at least in part on the one or more contextual records, a context-specific compliance score request. In some of these examples, the apparatus is further caused to receive, from the one or more interface service entities, one or more context-specific compliance score structures, wherein each context-specific compliance score structure of the one or more context-specific compliance score structures comprises a compliance score for the website identifier in accordance with a respective contextual record. In some of these examples, the apparatus is further caused to generate, based at least in part on applying one or more models to the one or more context-specific compliance score structures, an aggregated compliance score associated with the website identifier. In some of these examples, the apparatus is further caused to generate, based at least in part on the one or more context-specific compliance scores and the aggregated compliance score, a contextual compliance response comprising the aggregated compliance score and one or more context-specific data structures. In some of these examples, the apparatus is further caused to transmit, to the requesting entity, the contextual compliance response.

Example 148. A non-transitory computer readable storage medium according to example 147, wherein the website identifier is associated with a website assembled in accordance with one or more website-building tools stored by one or more website-building repositories.

Example 149. A non-transitory computer readable storage medium according to any of the foregoing examples, wherein the one or more website building tools comprise one or more of pages, sub-pages, containers, components, atomic components, content elements, layout elements, templates, or layout rules.

Example 150. A non-transitory computer readable storage medium according to any of the foregoing examples, wherein a contextual record is associated with a contextual domain representative of content associated with the website identifier, product data or service data provided by a resource provider associated with the website identifier, sanctions data associated with the website identifier, reputation data associated with the website identifier, or money laundering detection associated with the website identifier.

Example 151. A non-transitory computer readable storage medium according to any of the foregoing examples, wherein an interface service entity of the one or more interface service entities is configured to generate context-specific compliance score structures based at least in part on determining a respective compliance score for the website identifier for a contextual domain of one or more contextual domains.

Example 152. A non-transitory computer readable storage medium according to any of the foregoing examples, wherein the one or more interface service entities comprise a third-party product categorization service.

Example 153. A non-transitory computer readable storage medium according to any of the foregoing examples, wherein the third-party product categorization service is configured to receive product categorization streaming data from one or more external scanning services.

Example 154. A non-transitory computer readable storage medium according to any of the foregoing examples, wherein the one or more interface service entities comprise a machine learning service.

Example 155. A non-transitory computer readable storage medium according to any of the foregoing examples, wherein the machine learning service is configured to receive verification streaming data from one or more external scanning services and configured to generate at least a money laundering detection score.

Example 156. A non-transitory computer readable storage medium according to any of the foregoing examples, wherein the one or more interface service entities comprise a website categorization service.

Example 157. A non-transitory computer readable storage medium according to any of the foregoing examples, wherein the website categorization service is configured to receive website categorization streaming data from one or more website scanning services.

Example 158. A non-transitory computer readable storage medium according to any of the foregoing examples, wherein the one or more interface service entities comprise a sanctions service.

Example 159. A non-transitory computer readable storage medium according to any of the foregoing examples, wherein the sanctions service is configured to receive sanctions streaming data from one or more external sanctions-related data services.

Example 160. A non-transitory computer readable storage medium according to any of the foregoing examples, wherein the one or more interface service entities comprise a reputation service.

Example 161. A non-transitory computer readable storage medium according to any of the foregoing examples, wherein the reputation service is configured to receive reputational streaming data from one or more external reputational data services.

Example 162. A non-transitory computer readable storage medium according to any of the foregoing examples, wherein the one or more interface service entities is associated with one or more of contextual domain specific rules, a contextual domain specific factor table, and one or more context-specific trained machine learning models.

Example 163. A non-transitory computer readable storage medium according to any of the foregoing examples, wherein the contextual domain specific factor table comprises a configurable factor list.

Example 164. A non-transitory computer readable storage medium according to any of the foregoing examples, wherein the configurable factor list comprises one or more factors, wherein each factor comprises a factor key and a factor value and is an element received from a data source.

Example 165. A non-transitory computer readable storage medium according to any of the foregoing examples, wherein the one or more context-specific trained machine learning models are configured to generate one or more context-specific compliance scores based at least in part on the one or more factors.

Example 166. A non-transitory computer readable storage medium according to any of the foregoing examples, wherein the one or more models are configured to apply one or more weights to the one or more context-specific compliance score structures to generate the aggregated compliance score.

Example 167. A non-transitory computer readable storage medium according to any of the foregoing examples, wherein the one or more context-specific data structures comprise one or more score justifications grouped according to their respective impact on the aggregated compliance score.

Example 168. A non-transitory computer readable storage medium according to any of the foregoing examples, wherein an aggregated compliance level represents a translation of the aggregated compliance score according to one or more contextual domains associated with the contextual compliance request.

Example 169. A non-transitory computer readable storage medium according to any of the foregoing examples, wherein the apparatus is further caused to cause performance of one or more compliance enforcement actions based at least in part on one or more of the aggregated compliance score, one or more context-specific compliance scores, or a compliance score pattern associated with the website identifier.

Example 170. A non-transitory computer readable storage medium according to any of the foregoing examples, wherein the one or more compliance enforcement actions comprise one or more of notification transmissions, service interruptions, service limitations, additional action requirements, layout limitations, enabling or disabling of network transaction methods.

Example 171. A non-transitory computer readable storage medium according to any of the foregoing examples, wherein the requesting entity is associated with a website building service associated with the website identifier.

Example 172. A non-transitory computer readable storage medium according to any of the foregoing examples, wherein the requesting entity is external to a website building service associated with the website identifier.

Example 173. A computer implemented method for contextual compliance enforcement, the method comprising receiving, from a requesting entity, a contextual compliance request, the contextual compliance request comprising a website identifier, and one or more contextual records. In some of these examples, the method further comprises transmitting, to one or more interface service entities and based at least in part on the one or more contextual records, a context-specific compliance score request. In some of these examples, the method further comprises receiving, from the one or more interface service entities, one or more context-specific compliance score structures, wherein each context-specific compliance score structure of the one or more context-specific compliance score structures comprises a compliance score for the website identifier in accordance with a respective contextual record. In some of these examples, the method further comprises generating, based at least in part on applying one or more models to the one or more context-specific compliance score structures, an aggregated compliance score associated with the website identifier. In some of these examples, the method further comprises generating, based at least in part on the one or more context-specific compliance scores and the aggregated compliance score, a contextual compliance response comprising the aggregated compliance score and one or more context-specific data structures. In some of these examples, the method further comprises transmitting, to the requesting entity, the contextual compliance response.

Example 174. A method according to example 173, wherein the website identifier is associated with a website assembled in accordance with one or more website-building tools stored by one or more website-building repositories.

Example 175. A method according to any of the foregoing examples, wherein the one or more website building tools comprise one or more of pages, sub-pages, containers, components, atomic components, content elements, layout elements, templates, or layout rules.

Example 176. A method according to any of the foregoing examples, wherein a contextual record is associated with a contextual domain representative of content associated with the website identifier, product data or service data provided by a resource provider associated with the website identifier, sanctions data associated with the website identifier, reputation data associated with the website identifier, or money laundering detection associated with the website identifier.

Example 177. A method according to any of the foregoing examples, wherein an interface service entity of the one or more interface service entities is configured to generate context-specific compliance score structures based at least in part on determining a respective compliance score for the website identifier for a contextual domain of one or more contextual domains.

Example 178. A method according to any of the foregoing examples, wherein the one or more interface service entities comprise a third-party product categorization service.

Example 179. A method according to any of the foregoing examples, wherein the third-party product categorization service is configured to receive product categorization streaming data from one or more external scanning services.

Example 180. A method according to any of the foregoing examples, wherein the one or more interface service entities comprise a machine learning service.

Example 181. A method according to any of the foregoing examples, wherein the machine learning service is configured to receive verification streaming data from one or more external scanning services and configured to generate at least a money laundering detection score.

Example 182. A method according to any of the foregoing examples, wherein the one or more interface service entities comprise a website categorization service.

Example 183. A method according to any of the foregoing examples, wherein the website categorization service is configured to receive website categorization streaming data from one or more website scanning services.

Example 184. A method according to any of the foregoing examples, wherein the one or more interface service entities comprise a sanctions service.

Example 185. A method according to any of the foregoing examples, wherein the sanctions service is configured to receive sanctions streaming data from one or more external sanctions-related data services.

Example 186. A method according to any of the foregoing examples, wherein the one or more interface service entities comprise a reputation service.

Example 187. A method according to any of the foregoing examples, wherein the reputation service is configured to receive reputational streaming data from one or more external reputational data services.

Example 188. A method according to any of the foregoing examples, wherein the one or more interface service entities is associated with one or more of contextual domain specific rules, a contextual domain specific factor table, and one or more context-specific trained machine learning models.

Example 189. A method according to any of the foregoing examples, wherein the contextual domain specific factor table comprises a configurable factor list.

Example 190. A method according to any of the foregoing examples, wherein the configurable factor list comprises one or more factors, wherein each factor comprises a factor key and a factor value and is an element received from a data source.

Example 191. A method according to any of the foregoing examples, wherein the one or more context-specific trained machine learning models are configured to generate one or more context-specific compliance scores based at least in part on the one or more factors.

Example 192. A method according to any of the foregoing examples, wherein the one or more models are configured to apply one or more weights to the one or more context-specific compliance score structures to generate the aggregated compliance score.

Example 193. A method according to any of the foregoing examples, wherein the one or more context-specific data structures comprise one or more score justifications grouped according to their respective impact on the aggregated compliance score.

Example 194. A method according to any of the foregoing examples, wherein an aggregated compliance level represents a translation of the aggregated compliance score according to one or more contextual domains associated with the contextual compliance request.

Example 195. A method according to any of the foregoing examples, further comprising causing performance of one or more compliance enforcement actions based at least in part on one or more of the aggregated compliance score, one or more context-specific compliance scores, or a compliance score pattern associated with the website identifier.

Example 196. A method according to any of the foregoing examples, wherein the one or more compliance enforcement actions comprise one or more of notification transmissions, service interruptions, service limitations, additional action requirements, layout limitations, enabling or disabling of network transaction methods.

Example 197. A method according to any of the foregoing examples, wherein the requesting entity is associated with a website building service associated with the website identifier.

Example 198. A method according to any of the foregoing examples, wherein the requesting entity is external to a website building service associated with the website identifier.

Example 199. An apparatus for disputed transaction data structure generation, wherein the disputed transaction data structure is associated with a network transaction, the apparatus comprising at least one processor and at least one non-transitory computer readable storage medium storing instructions that, when executed by the at least one processor, cause the apparatus to receive a disputed network transaction notification, the disputed network transaction notification comprising a network transaction identifier, a website identifier, a dispute type identifier, a dispute status, and an end-user identifier. In some of these examples, the apparatus is further caused to, based at least in part on the dispute status, retrieve one or more network transaction records associated with the network transaction identifier. In some of these examples, the apparatus is further caused to generate the disputed transaction data structure based at least in part on one or more of the one or more network transaction records, wherein the one or more network transaction records are arranged within the disputed transaction data structure based at least in part on one or more of the dispute type identifier, a network transaction facilitator associated with the network transaction identifier, a network transaction intermediary associated with the network transaction identifier, or a network transaction endpoint associated with the network transaction identifier. In some of these examples, the apparatus is further caused to generate, using one or more models and based at least in part on one or more of the end-user identifier, the website identifier, the dispute type identifier, a network transaction facilitator identifier associated with the network transaction identifier, a network transaction intermediary associated with the network transaction identifier, a network transaction endpoint associated with the network transaction identifier, or one or more network transaction records, a network transaction dispute reversal score representing a programmatically generated likelihood that a network transaction endpoint associated with the network transaction endpoint identifier will change the dispute status associated with the network transaction identifier. In some of these examples, the apparatus is further caused to cause rendering of visual representation of the disputed transaction data structure, the network transaction dispute reversal score, and one or more network transaction attributes associated with the network transaction identifier, via a display interface of a client computing entity associated with the website identifier.

Example 200. An apparatus according to example 199, wherein the at least one non-transitory computer readable storage medium stores instructions that, when executed by the at least one processor, further cause the apparatus to, responsive to receiving an approval interaction from the client computing entity associated with the website identifier, cause transmission of the disputed transaction data structure to a computing entity associated with the network transaction endpoint.

Example 201. An apparatus according to any of the foregoing examples, wherein the network transaction endpoint is a first network transaction endpoint.

Example 202. An apparatus according to any of the foregoing examples, wherein changing the dispute status by the first network transaction endpoint in accordance with a second network transaction endpoint results in a transfer to an account associated with the second network transaction endpoint.

Example 203. An apparatus according to any of the foregoing examples, wherein the network transaction was initiated in association with an end-user identifier via the website building system.

Example 204. An apparatus according to any of the foregoing examples, wherein the website building system communicates regarding the network transaction with the network transaction facilitator.

Example 205. An apparatus according to any of the foregoing examples, wherein the network transaction facilitator communicates with the network transaction intermediary regarding the network transaction.

Example 206. An apparatus according to any of the foregoing examples, wherein the network transaction intermediary communicates with the network transaction endpoint regarding the network transaction.

Example 207. An apparatus according to any of the foregoing examples, wherein the disputed transaction data structure comprises one or more evidence records associated with a transaction type identifier associated with the network transaction.

Example 208. An apparatus according to any of the foregoing examples, wherein the transaction type identifier represents physical goods and the one or more evidence records comprise one or more of a receipt object, visual rendering of product description, return policy data, tracking information, delivery confirmation information, signature evidence, audio or video evidence demonstrating possession, or electronic communication evidencing possession.

Example 209. An apparatus according to any of the foregoing examples, wherein the transaction type identifier represents services and the one or more evidence records comprise one or more of a service description object, electronic evidence documenting physical presence and/or related transactions, signature evidence, review submission, or electronic communication evidencing possession.

Example 210. An apparatus according to any of the foregoing examples, wherein the transaction type identifier represents digital goods and the one or more evidence records comprise one or more of a digital goods description object, usage activity or logs, IP address, geographic location associated with transaction, requests or provision of login credentials, or electronic communication evidencing possession.

Example 211. An apparatus according to any of the foregoing examples, wherein the disputed network transaction notification represents a dispute initiated with respect to a network transaction by the end-user identifier associated with the network transaction and via the network transaction endpoint associated with the network transaction.

Example 212. An apparatus according to any of the foregoing examples, wherein the dispute status is one of open, closed, under review, refunded, affirmed, or reversed.

Example 213. An apparatus according to any of the foregoing examples, wherein the at least one non-transitory computer readable storage medium stores instructions that, when executed by the at least one processor, further cause the apparatus to, using the one or more models, generate a first network transaction dispute reversal score representing a first programmatically generated likelihood that the network transaction endpoint associated with the network transaction endpoint identifier will change the dispute status associated with the network transaction identifier in an instance where the disputed transaction data structure remains unchanged. In some of these examples, the apparatus is further caused to, using the one or more models, generate a second network transaction dispute reversal score representing a second programmatically generated likelihood that the network transaction endpoint associated with the network transaction endpoint identifier will change the dispute status associated with the network transaction identifier in an instance where the disputed transaction data structure is supplemented. In some of these examples, the apparatus is further caused to cause rendering of visual representation of the first network transaction dispute reversal score and the second network transaction dispute reversal score.

Example 214. An apparatus according to any of the foregoing examples, wherein the at least one non-transitory computer readable storage medium stores instructions that, when executed by the at least one processor, further cause the apparatus to receive, client computing entity associated with the website identifier, one or more additional data records for supplementing the disputed transaction data structure. In some of these examples, the apparatus is further caused to generate a supplemented disputed transaction data structure. In some of these examples, the apparatus is further caused to, using the one or more models and based at least in part on the supplemented disputed transaction data structure, generate a third network transaction dispute reversal score representing a third programmatically generated likelihood that the network transaction endpoint associated with the network transaction endpoint identifier will change the dispute status associated with the network transaction identifier. In some of these examples, the apparatus is further caused to cause rendering of visual representation of the third network transaction dispute reversal score.

Example 215. An apparatus according to any of the foregoing examples, wherein the one or more models are trained using historical transaction data comprising network transaction data associated with one or more of a plurality of end-user identifiers, a plurality of website identifiers, a plurality of dispute type identifiers, a plurality of network transaction facilitator identifiers, a plurality of network transaction intermediary identifiers, a plurality of network transaction endpoint identifiers, a plurality of dispute status change outcomes, a plurality of network transaction records, or historical website editing interactions associated with assembling websites associated with the plurality of website identifiers.

Example 216. An apparatus according to any of the foregoing examples, wherein the network transaction dispute reversal score is generated further based at least in part on one or more of transaction history associated with the end-user identifier and the website identifier, a product or service type associated with the network transaction, a currency value associated with the network transaction, billing or shipping data associated with the end-user identifier, an IP address associated with the end-user identifier, or transaction history associated with the end-user identifier.

Example 217. An apparatus according to any of the foregoing examples, wherein the at least one non-transitory computer readable storage medium stores instructions that, when executed by the at least one processor, further cause the apparatus to, prior to submitting the network transaction for servicing to a network transaction facilitator, generate, using one or more improper dispute prediction models and based at least in part on the one or more network transaction attributes associated with the network transaction identifier, an improper dispute prediction representing a programmatically generated likelihood that a dispute will be improperly or fraudulently initiated following completion of the network transaction.

Example 218. An apparatus according to any of the foregoing examples, wherein the at least one non-transitory computer readable storage medium stores instructions that, when executed by the at least one processor, further cause the apparatus to, in an instance when the improper dispute prediction exceeds a threshold, cause performance of one or more improper dispute mitigating actions.

Example 219. An apparatus according to any of the foregoing examples, wherein the one or more improper dispute mitigating actions comprise one or more of canceling a potentially fraudulent order, issuing a refund, stopping or revoking a shipment, blocking communication with an end-user associated with the end-user identifier, requesting additional documentation or communication from the end-user, storing additional documentation associated with the network transaction.

Example 220. An apparatus according to any of the foregoing examples, wherein the at least one non-transitory computer readable storage medium stores instructions that, when executed by the at least one processor, further cause the apparatus to, in an instance when the network transaction dispute reversal score exceeds a threshold, cause automatic transmission of the disputed transaction data structure to a computing entity associated with the network transaction endpoint.

Example 221. An apparatus according to any of the foregoing examples, wherein the at least one non-transitory computer readable storage medium stores instructions that, when executed by the at least one processor, further cause the apparatus to, responsive to expiration of a defined duration since presentation of the network transaction dispute reversal score, cause automatic transmission of the disputed transaction data structure to a computing entity associated with the network transaction endpoint.

Example 222. A non-transitory computer readable storage medium for disputed transaction data structure generation, wherein the disputed transaction data structure is associated with a network transaction, the non-transitory computer readable storage medium storing instructions that, when executed by at least one processor, cause an apparatus to receive a disputed network transaction notification, the disputed network transaction notification comprising a network transaction identifier, a website identifier, a dispute type identifier, a dispute status, and an end-user identifier. In some of these examples, the apparatus is further caused to, based at least in part on the dispute status, retrieve one or more network transaction records associated with the network transaction identifier. In some of these examples, the apparatus is further caused to generate the disputed transaction data structure based at least in part on one or more of the one or more network transaction records, wherein the one or more network transaction records are arranged within the disputed transaction data structure based at least in part on one or more of the dispute type identifier, a network transaction facilitator associated with the network transaction identifier, a network transaction intermediary associated with the network transaction identifier, or a network transaction endpoint associated with the network transaction identifier. In some of these examples, the apparatus is further caused to generate, using one or more models and based at least in part on one or more of the end-user identifier, the website identifier, the dispute type identifier, a network transaction facilitator identifier associated with the network transaction identifier, a network transaction intermediary associated with the network transaction identifier, a network transaction endpoint associated with the network transaction identifier, or one or more network transaction records, a network transaction dispute reversal score representing a programmatically generated likelihood that a network transaction endpoint associated with the network transaction endpoint identifier will change the dispute status associated with the network transaction identifier. In some of these examples, the apparatus is further caused to cause rendering of visual representation of the disputed transaction data structure, the network transaction dispute reversal score, and one or more network transaction attributes associated with the network transaction identifier, via a display interface of a client computing entity associated with the website identifier.

Example 223. A non-transitory computer readable storage medium according to example 222, wherein the apparatus is further caused to, responsive to receiving an approval interaction from the client computing entity associated with the website identifier, cause transmission of the disputed transaction data structure to a computing entity associated with the network transaction endpoint.

Example 224. A non-transitory computer readable storage medium according to any of the foregoing examples, wherein the network transaction endpoint is a first network transaction endpoint.

Example 225. A non-transitory computer readable storage medium according to any of the foregoing examples, wherein changing the dispute status by the first network transaction endpoint in accordance with a second network transaction endpoint results in a transfer to an account associated with the second network transaction endpoint.

Example 226. A non-transitory computer readable storage medium according to any of the foregoing examples, wherein the network transaction was initiated in association with an end-user identifier via the website building system.

Example 227. A non-transitory computer readable storage medium according to any of the foregoing examples, wherein the website building system communicates regarding the network transaction with the network transaction facilitator.

Example 228. A non-transitory computer readable storage medium according to any of the foregoing examples, wherein the network transaction facilitator communicates with the network transaction intermediary regarding the network transaction.

Example 229. A non-transitory computer readable storage medium according to any of the foregoing examples, wherein the network transaction intermediary communicates with the network transaction endpoint regarding the network transaction.

Example 230. A non-transitory computer readable storage medium according to any of the foregoing examples, wherein the disputed transaction data structure comprises one or more evidence records associated with a transaction type identifier associated with the network transaction.

Example 231. A non-transitory computer readable storage medium according to any of the foregoing examples, wherein the transaction type identifier represents physical goods and the one or more evidence records comprise one or more of a receipt object, visual rendering of product description, return policy data, tracking information, delivery confirmation information, signature evidence, audio or video evidence demonstrating possession, or electronic communication evidencing possession.

Example 232. A non-transitory computer readable storage medium according to any of the foregoing examples, wherein the transaction type identifier represents services and the one or more evidence records comprise one or more of a service description object, electronic evidence documenting physical presence and/or related transactions, signature evidence, review submission, or electronic communication evidencing possession.

Example 233. A non-transitory computer readable storage medium according to any of the foregoing examples, wherein the transaction type identifier represents digital goods and the one or more evidence records comprise one or more of a digital goods description object, usage activity or logs, IP address, geographic location associated with transaction, requests or provision of login credentials, or electronic communication evidencing possession.

Example 234. A non-transitory computer readable storage medium according to any of the foregoing examples, wherein the disputed network transaction notification represents a dispute initiated with respect to a network transaction by the end-user identifier associated with the network transaction and via the network transaction endpoint associated with the network transaction.

Example 235. A non-transitory computer readable storage medium according to any of the foregoing examples, wherein the dispute status is one of open, closed, under review, refunded, affirmed, or reversed.

Example 236. A non-transitory computer readable storage medium according to any of the foregoing examples, wherein the apparatus is further caused to, using the one or more models, generate a first network transaction dispute reversal score representing a first programmatically generated likelihood that the network transaction endpoint associated with the network transaction endpoint identifier will change the dispute status associated with the network transaction identifier in an instance where the disputed transaction data structure remains unchanged. In some of these examples, the apparatus is further caused to, using the one or more models, generate a second network transaction dispute reversal score representing a second programmatically generated likelihood that the network transaction endpoint associated with the network transaction endpoint identifier will change the dispute status associated with the network transaction identifier in an instance where the disputed transaction data structure is supplemented. In some of these examples, the apparatus is further caused to cause rendering of visual representation of the first network transaction dispute reversal score and the second network transaction dispute reversal score.

Example 237. A non-transitory computer readable storage medium according to any of the foregoing examples, wherein the apparatus is further caused to receive, client computing entity associated with the website identifier, one or more additional data records for supplementing the disputed transaction data structure. In some of these examples, the apparatus is further caused to generate a supplemented disputed transaction data structure. In some of these examples, the apparatus is further caused to, using the one or more models and based at least in part on the supplemented disputed transaction data structure, generate a third network transaction dispute reversal score representing a third programmatically generated likelihood that the network transaction endpoint associated with the network transaction endpoint identifier will change the dispute status associated with the network transaction identifier. In some of these examples, the apparatus is further caused to cause rendering of visual representation of the third network transaction dispute reversal score.

Example 238. A non-transitory computer readable storage medium according to any of the foregoing examples, wherein the one or more models are trained using historical transaction data comprising network transaction data associated with one or more of a plurality of end-user identifiers, a plurality of website identifiers, a plurality of dispute type identifiers, a plurality of network transaction facilitator identifiers, a plurality of network transaction intermediary identifiers, a plurality of network transaction endpoint identifiers, a plurality of dispute status change outcomes, a plurality of network transaction records, or historical website editing interactions associated with assembling websites associated with the plurality of website identifiers.

Example 239. A non-transitory computer readable storage medium according to any of the foregoing examples, wherein the network transaction dispute reversal score is generated further based at least in part on one or more of transaction history associated with the end-user identifier and the website identifier, a product or service type associated with the network transaction, a currency value associated with the network transaction, billing or shipping data associated with the end-user identifier, an IP address associated with the end-user identifier, or transaction history associated with the end-user identifier.

Example 240. A non-transitory computer readable storage medium according to any of the foregoing examples, wherein the apparatus is further caused to, prior to submitting the network transaction for servicing to a network transaction facilitator, generate, using one or more improper dispute prediction models and based at least in part on the one or more network transaction attributes associated with the network transaction identifier, an improper dispute prediction representing a programmatically generated likelihood that a dispute will be improperly or fraudulently initiated following completion of the network transaction.

Example 241. A non-transitory computer readable storage medium according to any of the foregoing examples, wherein the apparatus is further caused to, in an instance when the improper dispute prediction exceeds a threshold, cause performance of one or more improper dispute mitigating actions.

Example 242. A non-transitory computer readable storage medium according to any of the foregoing examples, wherein the one or more improper dispute mitigating actions comprise one or more of canceling a potentially fraudulent order, issuing a refund, stopping or revoking a shipment, blocking communication with an end-user associated with the end-user identifier, requesting additional documentation or communication from the end-user, storing additional documentation associated with the network transaction.

Example 243. A non-transitory computer readable storage medium according to any of the foregoing examples, wherein the apparatus is further caused to, in an instance when the network transaction dispute reversal score exceeds a threshold, cause automatic transmission of the disputed transaction data structure to a computing entity associated with the network transaction endpoint.

Example 244. A non-transitory computer readable storage medium according to any of the foregoing examples, wherein the apparatus is further caused to, responsive to expiration of a defined duration since presentation of the network transaction dispute reversal score, cause automatic transmission of the disputed transaction data structure to a computing entity associated with the network transaction endpoint.

Example 245. A computer implemented method for disputed transaction data structure generation, the method comprising receiving a disputed network transaction notification, the disputed network transaction notification comprising a network transaction identifier, a website identifier, a dispute type identifier, a dispute status, and an end-user identifier. In some of these examples, the method further comprises, based at least in part on the dispute status, retrieving one or more network transaction records associated with the network transaction identifier. In some of these examples, the method further comprises generating the disputed transaction data structure based at least in part on one or more of the one or more network transaction records, wherein the one or more network transaction records are arranged within the disputed transaction data structure based at least in part on one or more of the dispute type identifier, a network transaction facilitator associated with the network transaction identifier, a network transaction intermediary associated with the network transaction identifier, or a network transaction endpoint associated with the network transaction identifier. In some of these examples, the method further comprises generating, using one or more models and based at least in part on one or more of the end-user identifier, the website identifier, the dispute type identifier, a network transaction facilitator identifier associated with the network transaction identifier, a network transaction intermediary associated with the network transaction identifier, a network transaction endpoint associated with the network transaction identifier, or one or more network transaction records, a network transaction dispute reversal score representing a programmatically generated likelihood that a network transaction endpoint associated with the network transaction endpoint identifier will change the dispute status associated with the network transaction identifier. In some of these examples, the method further comprises causing rendering of visual representation of the disputed transaction data structure, the network transaction dispute reversal score, and one or more network transaction attributes associated with the network transaction identifier, via a display interface of a client computing entity associated with the website identifier.

Example 246. A method according to example 245, further comprising, responsive to receiving an approval interaction from the client computing entity associated with the website identifier, causing transmission of the disputed transaction data structure to a computing entity associated with the network transaction endpoint.

Example 247. A method according to any of the foregoing examples, wherein the network transaction endpoint is a first network transaction endpoint.

Example 248. A method according to any of the foregoing examples, wherein changing the dispute status by the first network transaction endpoint in accordance with a second network transaction endpoint results in a transfer to an account associated with the second network transaction endpoint.

Example 249. A method according to any of the foregoing examples, wherein the network transaction was initiated in association with an end-user identifier via the website building system.

Example 250. A method according to any of the foregoing examples, wherein the website building system communicates regarding the network transaction with the network transaction facilitator.

Example 251. A method according to any of the foregoing examples, wherein the network transaction facilitator communicates with the network transaction intermediary regarding the network transaction.

Example 252. A method according to any of the foregoing examples, wherein the network transaction intermediary communicates with the network transaction endpoint regarding the network transaction.

Example 253. A method according to any of the foregoing examples, wherein the disputed transaction data structure comprises one or more evidence records associated with a transaction type identifier associated with the network transaction.

Example 254. A method according to any of the foregoing examples, wherein the transaction type identifier represents physical goods and the one or more evidence records comprise one or more of a receipt object, visual rendering of product description, return policy data, tracking information, delivery confirmation information, signature evidence, audio or video evidence demonstrating possession, or electronic communication evidencing possession.

Example 255. A method according to any of the foregoing examples, wherein the transaction type identifier represents services and the one or more evidence records comprise one or more of a service description object, electronic evidence documenting physical presence and/or related transactions, signature evidence, review submission, or electronic communication evidencing possession.

Example 256. A method according to any of the foregoing examples, wherein the transaction type identifier represents digital goods and the one or more evidence records comprise one or more of a digital goods description object, usage activity or logs, IP address, geographic location associated with transaction, requests or provision of login credentials, or electronic communication evidencing possession.

Example 257. A method according to any of the foregoing examples, wherein the disputed network transaction notification represents a dispute initiated with respect to a network transaction by the end-user identifier associated with the network transaction and via the network transaction endpoint associated with the network transaction.

Example 258. A method according to any of the foregoing examples, wherein the dispute status is one of open, closed, under review, refunded, affirmed, or reversed.

Example 259. A method according to any of the foregoing examples, further comprising, using the one or more models, generating a first network transaction dispute reversal score representing a first programmatically generated likelihood that the network transaction endpoint associated with the network transaction endpoint identifier will change the dispute status associated with the network transaction identifier in an instance where the disputed transaction data structure remains unchanged. In some of these examples, the method further comprises, using the one or more models, generating a second network transaction dispute reversal score representing a second programmatically generated likelihood that the network transaction endpoint associated with the network transaction endpoint identifier will change the dispute status associated with the network transaction identifier in an instance where the disputed transaction data structure is supplemented. In some of these examples, the method further comprises causing rendering of visual representation of the first network transaction dispute reversal score and the second network transaction dispute reversal score.

Example 260. A method according to any of the foregoing examples, wherein the method further comprises receiving, from a client computing entity associated with the website identifier, one or more additional data records for supplementing the disputed transaction data structure. In some of these examples, the method further comprises generating a supplemented disputed transaction data structure. In some of these examples, the method further comprises, using the one or more models and based at least in part on the supplemented disputed transaction data structure, generating a third network transaction dispute reversal score representing a third programmatically generated likelihood that the network transaction endpoint associated with the network transaction endpoint identifier will change the dispute status associated with the network transaction identifier. In some of these examples, the method further comprises causing rendering of visual representation of the third network transaction dispute reversal score.

Example 261. A method according to any of the foregoing examples, wherein the one or more models are trained using historical transaction data comprising network transaction data associated with one or more of a plurality of end-user identifiers, a plurality of website identifiers, a plurality of dispute type identifiers, a plurality of network transaction facilitator identifiers, a plurality of network transaction intermediary identifiers, a plurality of network transaction endpoint identifiers, a plurality of dispute status change outcomes, a plurality of network transaction records, or historical website editing interactions associated with assembling websites associated with the plurality of website identifiers.

Example 262. A method according to any of the foregoing examples, wherein the network transaction dispute reversal score is generated further based at least in part on one or more of transaction history associated with the end-user identifier and the website identifier, a product or service type associated with the network transaction, a currency value associated with the network transaction, billing or shipping data associated with the end-user identifier, an IP address associated with the end-user identifier, or transaction history associated with the end-user identifier.

Example 263. A method according to any of the foregoing examples, wherein the method further comprises, prior to submitting the network transaction for servicing to a network transaction facilitator, generating, using one or more improper dispute prediction models and based at least in part on the one or more network transaction attributes associated with the network transaction identifier, an improper dispute prediction representing a programmatically generated likelihood that a dispute will be improperly or fraudulently initiated following completion of the network transaction.

Example 264. A method according to any of the foregoing examples, wherein the apparatus is further caused to, in an instance when the improper dispute prediction exceeds a threshold, cause performance of one or more improper dispute mitigating actions.

Example 265. A method according to any of the foregoing examples, wherein the one or more improper dispute mitigating actions comprise one or more of canceling a potentially fraudulent order, issuing a refund, stopping or revoking a shipment, blocking communication with an end-user associated with the end-user identifier, requesting additional documentation or communication from the end-user, storing additional documentation associated with the network transaction.

Example 266. A method according to any of the foregoing examples, further comprising, in an instance when the network transaction dispute reversal score exceeds a threshold, causing automatic transmission of the disputed transaction data structure to a computing entity associated with the network transaction endpoint.

Example 267. A method according to any of the foregoing examples, further comprising, responsive to expiration of a defined duration since presentation of the network transaction dispute reversal score, causing automatic transmission of the disputed transaction data structure to a computing entity associated with the network transaction endpoint.

Example 268. An apparatus for automated network transaction facilitator selection, the apparatus comprising at least one processor and at least one non-transitory computer readable storage medium storing instructions that, when executed by the at least one processor, cause the apparatus to receive a network transaction request data structure comprising a website identifier, an end-user identifier, and network transaction request metadata. In some of these examples, the apparatus is further caused to, responsive to determining, based at least in part on the network transaction request metadata, that the network transaction request data structure is associated with an legitimacy score above a legitimacy threshold, for a subset of network transaction facilitator of a plurality of network transaction facilitators, generate, based at least in part on applying one or more models to the network transaction request metadata, a network transaction facilitator approval score, wherein the network transaction facilitator approval score represents a programmatically generated likelihood that the network transaction facilitator will approve completion of a network transaction associated with the network transaction request data structure. In some of these examples, the apparatus is further caused to transmit the network transaction request data structure to a network transaction facilitator of the subset of network transaction facilitators having an accepted network transaction facilitator approval score as compared to the other network transaction facilitators.

Example 269. An apparatus according to example 268, wherein the at least one non-transitory computer readable storage medium stores instructions that, when executed by the at least one processor, further cause the apparatus to generate, using one or more legitimacy prediction models and the network transaction request metadata, the legitimacy score representing a programmatically generated likelihood that one or more attributes associated with the network transaction are legitimate.

Example 270. An apparatus according to any of the foregoing examples, wherein the at least one non-transitory computer readable storage medium stores instructions that, when executed by the at least one processor, further cause the apparatus to, in an instance when the legitimacy score is below the threshold, cause performance of one or more fraud mitigating actions.

Example 271. An apparatus according to any of the foregoing examples, wherein the one or more fraud mitigating actions comprise one or more of requesting proof of control of an email address, phone number, social media account, or cryptocurrency address known to be associated with a known non-fraudulent end-user identifier, or requesting proof of physical possession of a payment mechanism associated with the network transaction.

Example 272. An apparatus according to any of the foregoing examples, wherein the at least one non-transitory computer readable storage medium stores instructions that, when executed by the at least one processor, further cause the apparatus to generate, using one or more improper dispute prediction models and the network transaction request metadata, an improper dispute prediction representing a programmatically generated likelihood that a dispute will be improperly or fraudulently initiated following completion of the network transaction.

Example 273. An apparatus according to any of the foregoing examples, wherein the at least one non-transitory computer readable storage medium stores instructions that, when executed by the at least one processor, further cause the apparatus to, in an instance when the improper dispute prediction exceeds the threshold, cause performance of one or more improper dispute mitigating actions.

Example 274. An apparatus according to any of the foregoing examples, wherein the one or more improper dispute mitigating actions comprise one or more of canceling a potentially fraudulent order, issuing a refund, stopping or revoking a shipment, blocking communication with an end-user associated with the end-user identifier, requesting additional documentation or communication from the end-user, storing additional documentation associated with the network transaction.

Example 275. An apparatus according to any of the foregoing examples, wherein the network transaction request metadata comprises one or more of a transaction type, a transaction amount, a service type, a goods type, a payment mechanism type, historical transaction data associated with the end-user identifier, historical transaction data associated with the website identifier, or website data associated with the website identifier.

Example 276. An apparatus according to any of the foregoing examples, wherein the one or more models are trained using historical transaction data comprising network transaction data associated with one or more of a plurality of end-user identifiers, a plurality of website identifiers, a plurality of dispute type identifiers, a plurality of network transaction facilitator identifiers, a plurality of network transaction intermediary identifiers, a plurality of network transaction endpoint identifiers, a plurality of dispute status change outcomes, a plurality of network transaction records, or historical website editing interactions associated with assembling websites associated with the plurality of website identifiers.

Example 277. An apparatus according to any of the foregoing examples, wherein the one or more legitimacy prediction models are trained using historical transaction data comprising network transaction data associated with one or more of a plurality of end-user identifiers, a plurality of website identifiers, a plurality of dispute type identifiers, a plurality of network transaction facilitator identifiers, a plurality of network transaction intermediary identifiers, a plurality of network transaction endpoint identifiers, a plurality of dispute status change outcomes, a plurality of network transaction records, or historical website editing interactions associated with assembling websites associated with the plurality of website identifiers.

Example 278. An apparatus according to any of the foregoing examples, wherein the one or more improper dispute prediction models are trained using historical transaction data comprising network transaction data associated with one or more of a plurality of end-user identifiers, a plurality of website identifiers, a plurality of dispute type identifiers, a plurality of network transaction facilitator identifiers, a plurality of network transaction intermediary identifiers, a plurality of network transaction endpoint identifiers, a plurality of dispute status change outcomes, a plurality of network transaction records, or historical website editing interactions associated with assembling websites associated with the plurality of website identifiers.

Example 279. A non-transitory computer readable storage medium for automated network transaction facilitator selection, the non-transitory computer readable storage medium storing instructions that, when executed by at least one processor, cause an apparatus to receive a network transaction request data structure comprising a website identifier, an end-user identifier, and network transaction request metadata. In some of these examples, the apparatus is further caused to, responsive to determining, based at least in part on the network transaction request metadata, that the network transaction request data structure is associated with an legitimacy score above a legitimacy threshold, for a subset of network transaction facilitator of a plurality of network transaction facilitators, generate, based at least in part on applying one or more models to the network transaction request metadata, a network transaction facilitator approval score, wherein the network transaction facilitator approval score represents a programmatically generated likelihood that the network transaction facilitator will approve completion of a network transaction associated with the network transaction request data structure. In some of these examples, the apparatus is further caused to transmit the network transaction request data structure to a network transaction facilitator of the subset of network transaction facilitators having an accepted network transaction facilitator approval score as compared to the other network transaction facilitators.

Example 280. A non-transitory computer readable storage medium according to example 279, wherein the apparatus is further caused to generate, using one or more legitimacy prediction models and the network transaction request metadata, the legitimacy score representing a programmatically generated likelihood that one or more attributes associated with the network transaction are legitimate.

Example 281. A non-transitory computer readable storage medium according to any of the foregoing examples, wherein the apparatus is further caused to, in an instance when the legitimacy score is below the threshold, cause performance of one or more fraud mitigating actions.

Example 282. A non-transitory computer readable storage medium according to any of the foregoing examples, wherein the one or more fraud mitigating actions comprise one or more of requesting proof of control of an email address, phone number, social media account, or cryptocurrency address known to be associated with a known non-fraudulent end-user identifier, or requesting proof of physical possession of a payment mechanism associated with the network transaction.

Example 283. A non-transitory computer readable storage medium according to any of the foregoing examples, wherein the apparatus is further caused to generate, using one or more improper dispute prediction models and the network transaction request metadata, an improper dispute prediction representing a programmatically generated likelihood that a dispute will be improperly or fraudulently initiated following completion of the network transaction.

Example 284. A non-transitory computer readable storage medium according to any of the foregoing examples, wherein the apparatus is further caused to, in an instance when the improper dispute prediction exceeds the threshold, cause performance of one or more improper dispute mitigating actions.

Example 285. A non-transitory computer readable storage medium according to any of the foregoing examples, wherein the one or more improper dispute mitigating actions comprise one or more of canceling a potentially fraudulent order, issuing a refund, stopping or revoking a shipment, blocking communication with an end-user associated with the end-user identifier, requesting additional documentation or communication from the end-user, storing additional documentation associated with the network transaction.

Example 286. A non-transitory computer readable storage medium according to any of the foregoing examples, wherein the network transaction request metadata comprises one or more of a transaction type, a transaction amount, a service type, a goods type, a payment mechanism type, historical transaction data associated with the end-user identifier, historical transaction data associated with the website identifier, or website data associated with the website identifier.

Example 287. A non-transitory computer readable storage medium according to any of the foregoing examples, wherein the one or more models are trained using historical transaction data comprising network transaction data associated with one or more of a plurality of end-user identifiers, a plurality of website identifiers, a plurality of dispute type identifiers, a plurality of network transaction facilitator identifiers, a plurality of network transaction intermediary identifiers, a plurality of network transaction endpoint identifiers, a plurality of dispute status change outcomes, a plurality of network transaction records, or historical website editing interactions associated with assembling websites associated with the plurality of website identifiers.

Example 288. A non-transitory computer readable storage medium according to any of the foregoing examples, wherein the one or more legitimacy prediction models are trained using historical transaction data comprising network transaction data associated with one or more of a plurality of end-user identifiers, a plurality of website identifiers, a plurality of dispute type identifiers, a plurality of network transaction facilitator identifiers, a plurality of network transaction intermediary identifiers, a plurality of network transaction endpoint identifiers, a plurality of dispute status change outcomes, a plurality of network transaction records, or historical website editing interactions associated with assembling websites associated with the plurality of website identifiers.

Example 289. A non-transitory computer readable storage medium according to any of the foregoing examples, wherein the one or more improper dispute prediction models are trained using historical transaction data comprising network transaction data associated with one or more of a plurality of end-user identifiers, a plurality of website identifiers, a plurality of dispute type identifiers, a plurality of network transaction facilitator identifiers, a plurality of network transaction intermediary identifiers, a plurality of network transaction endpoint identifiers, a plurality of dispute status change outcomes, a plurality of network transaction records, or historical website editing interactions associated with assembling websites associated with the plurality of website identifiers.

Example 290. A computer implemented method for automated network transaction facilitator selection, the method comprising receiving a network transaction request data structure comprising a website identifier, an end-user identifier, and network transaction request metadata. In some of these examples, the method further comprises, responsive to determining, based at least in part on the network transaction request metadata, that the network transaction request data structure is associated with an legitimacy score above a legitimacy threshold, for a subset of network transaction facilitator of a plurality of network transaction facilitators, generating, based at least in part on applying one or more models to the network transaction request metadata, a network transaction facilitator approval score, wherein the network transaction facilitator approval score represents a programmatically generated likelihood that the network transaction facilitator will approve completion of a network transaction associated with the network transaction request data structure. In some of these examples, the method further comprises transmitting the network transaction request data structure to a network transaction facilitator of the subset of network transaction facilitators having an accepted network transaction facilitator approval score as compared to the other network transaction facilitators.

Example 291. A method according to example 290, further comprising generating, using one or more legitimacy prediction models and the network transaction request metadata, the legitimacy score representing a programmatically generated likelihood that one or more attributes associated with the network transaction are legitimate.

Example 292. A method according to any of the foregoing examples, further comprising, in an instance when the legitimacy score is below the threshold, causing performance of one or more fraud mitigating actions.

Example 293. A method according to any of the foregoing examples, wherein the one or more fraud mitigating actions comprise one or more of requesting proof of control of an email address, phone number, social media account, or cryptocurrency address known to be associated with a known non-fraudulent end-user identifier, or requesting proof of physical possession of a payment mechanism associated with the network transaction.

Example 294. A method according to any of the foregoing examples, further comprising generating, using one or more improper dispute prediction models and the network transaction request metadata, an improper dispute prediction representing a programmatically generated likelihood that a dispute will be improperly or fraudulently initiated following completion of the network transaction.

Example 295. A method according to any of the foregoing examples, further comprising, in an instance when the improper dispute prediction exceeds the threshold, causing performance of one or more improper dispute mitigating actions.

Example 296. A method according to any of the foregoing examples, wherein the one or more improper dispute mitigating actions comprise one or more of canceling a potentially fraudulent order, issuing a refund, stopping or revoking a shipment, blocking communication with an end-user associated with the end-user identifier, requesting additional documentation or communication from the end-user, storing additional documentation associated with the network transaction.

Example 297. A method according to any of the foregoing examples, wherein the network transaction request metadata comprises one or more of a transaction type, a transaction amount, a service type, a goods type, a payment mechanism type, historical transaction data associated with the end-user identifier, historical transaction data associated with the website identifier, or website data associated with the website identifier.

Example 298. A method according to any of the foregoing examples, wherein the one or more models are trained using historical transaction data comprising network transaction data associated with one or more of a plurality of end-user identifiers, a plurality of website identifiers, a plurality of dispute type identifiers, a plurality of network transaction facilitator identifiers, a plurality of network transaction intermediary identifiers, a plurality of network transaction endpoint identifiers, a plurality of dispute status change outcomes, a plurality of network transaction records, or historical website editing interactions associated with assembling websites associated with the plurality of website identifiers.

Example 299. A method according to any of the foregoing examples, wherein the one or more legitimacy prediction models are trained using historical transaction data comprising network transaction data associated with one or more of a plurality of end-user identifiers, a plurality of website identifiers, a plurality of dispute type identifiers, a plurality of network transaction facilitator identifiers, a plurality of network transaction intermediary identifiers, a plurality of network transaction endpoint identifiers, a plurality of dispute status change outcomes, a plurality of network transaction records, or historical website editing interactions associated with assembling websites associated with the plurality of website identifiers.

Example 300. A method according to any of the foregoing examples, wherein the one or more improper dispute prediction models are trained using historical transaction data comprising network transaction data associated with one or more of a plurality of end-user identifiers, a plurality of website identifiers, a plurality of dispute type identifiers, a plurality of network transaction facilitator identifiers, a plurality of network transaction intermediary identifiers, a plurality of network transaction endpoint identifiers, a plurality of dispute status change outcomes, a plurality of network transaction records, or historical website editing interactions associated with assembling websites associated with the plurality of website identifiers.

Example 301. An apparatus for supporting multiple network transaction facilitators (NTFs) within a website building system, the apparatus comprising at least one processor and at least one non-transitory computer readable storage medium storing instructions that, when executed by the at least one processor, cause the apparatus to: receive, from a computing device associated with an editing user identifier associated with a website identifier of a plurality of website identifiers, a first NTF connection request, wherein the website identifier is associated with a website assembled using one or more website building repositories of the website building system; enable, based at least in part on the first NTF connection request, editing of a network transaction interface of the website to include support for transactions associated with a first NTF of a plurality of NTFs; and responsive to receiving a network transaction request via the network transaction interface, route the network transaction request to the first NTF or a different NTF of the plurality of NTFs based at least in part on a network transaction profile associated with the website identifier.

Example 302. An apparatus according to Example 301, wherein the one or more website building repositories store one or more website building components and one or more website editing historical interactions associated with a plurality of editing user identifiers.

Example 303. An apparatus according to any of the foregoing Examples, wherein the at least one non-transitory computer readable storage medium stores instructions that, when executed by the at least one processor, further cause the apparatus to: transmit, to the first NTF associated with the first NTF connection request, a first verification request; and responsive to receiving, from the first NTF, a first verification confirmation, enable editing of the network transaction interface of the website to support transactions associated with the first NTF.

Example 304. An apparatus according to any of the foregoing examples, wherein the at least one non-transitory computer readable storage medium stores instructions that, when executed by the at least one processor, further cause the apparatus to: receive, from the computing device associated with the first editing user identifier, a second NTF connection request; transmit, to a second NTF associated with the second NTF request, a second verification request; and responsive to receiving, from the second NTF, a second verification confirmation, enable editing of the network transaction interface of the website to support transactions associated with the second NTF.

Example 305. An apparatus according to any of the foregoing examples, wherein the at least one non-transitory computer readable storage medium stores instructions that, when executed by the at least one processor, further cause the apparatus to: based at least in part on the network transaction profile associated with the website identifier and one or more trained machine learning models, generate a NTF recommendation interface for rendering via a client computing device associated with the editing user identifier.

Example 306. An apparatus according to any of the foregoing examples, wherein the at least one non-transitory computer readable storage medium stores instructions that, when executed by the at least one processor, further cause the apparatus to: responsive to receiving an NTF verification request from the first NTF, transmit verification data to the first NTF.

Example 307. An apparatus according to any of the foregoing examples, wherein the first NTF is selected for the editing user identifier based at least in part on attributes associated with the editing user identifier and the website.

Example 308. An apparatus according to any of the foregoing examples, wherein the network transaction request is received via a network transaction application programming interface (API) associated with the network transaction interface.

Example 309. An apparatus according to any of the foregoing examples, wherein the network transaction request is routed to the first NTF via an NTF application programming interface (API).

Example 310. An apparatus according to any of the foregoing examples, wherein the at least one non-transitory computer readable storage medium stores instructions that, when executed by the at least one processor, further cause the apparatus to: establish an NTF account with the first NTF on behalf of the editing user identifier.

Example 311. An apparatus according to any of the foregoing examples, wherein the at least one non-transitory computer readable storage medium stores instructions that, when executed by the at least one processor, further cause the apparatus to: update the NTF account with the first NTF on behalf of the editing user identifier.

Example 312. A computer-implemented method for supporting multiple network transaction facilitators (NTFs) within a website building system, the computer-implemented method comprising: receiving, using one or more processors and from a computing device associated with an editing user identifier associated with a website identifier of a plurality of website identifiers, a first NTF connection request, wherein the website identifier is associated with a website assembled using one or more website building repositories of the website building system; enabling, using the one or more processors and based at least in part on the first NTF connection request, editing of a network transaction interface of the website to include support for transactions associated with a first NTF of a plurality of NTFs; and responsive to receiving a network transaction request via the network transaction interface, routing, using the one or more processors, the network transaction request to the first NTF or a different NTF of the plurality of NTFs based at least in part on a network transaction profile associated with the website identifier.

Example 313. A computer-implemented method according to Example 312, wherein the one or more website building repositories store one or more website building components and one or more website editing historical interactions associated with a plurality of editing user identifiers.

Example 314. A computer-implemented method according to any of the foregoing Examples, further comprising: transmitting, to the first NTF associated with the first NTF connection request, a first verification request; and responsive to receiving, from the first NTF, a first verification confirmation, enabling editing of the network transaction interface of the website to support transactions associated with the first NTF.

Example 315. A computer-implemented method according to any of the foregoing Examples, further comprising: receiving, from the computing device associated with the first editing user identifier, a second NTF connection request; transmitting, to a second NTF associated with the second NTF request, a second verification request; and responsive to receiving, from the second NTF, a second verification confirmation, enabling editing of the network transaction interface of the website to support transactions associated with the second NTF.

Example 316. A computer-implemented method according to any of the foregoing Examples, further comprising: based at least in part on the network transaction profile associated with the website identifier and one or more trained machine learning models, generating a NTF recommendation interface for rendering via a client computing device associated with the editing user identifier.

Example 317. A computer-implemented method according to any of the foregoing Examples, further comprising: responsive to receiving an NTF verification request from the first NTF, transmitting verification data to the first NTF.

Example 318. A computer-implemented method according to any of the foregoing Examples, wherein the first NTF is selected for the editing user identifier based at least in part on attributes associated with the editing user identifier and the website.

Example 319. A computer-implemented method according to any of the foregoing Examples, wherein the network transaction request is received via a network transaction application programming interface (API) associated with the network transaction interface.

Example 320. A computer-implemented method according to any of the foregoing Examples, wherein the network transaction request is routed to the first NTF via an NTF application programming interface (API).

Example 321. A computer-implemented method according to any of the foregoing Examples, further comprising: establishing an NTF account with the first NTF on behalf of the editing user identifier.

Example 322. A computer-implemented method according to any of the foregoing Examples, further comprising: updating the NTF account with the first NTF on behalf of the editing user identifier.

Example 323. One or more non-transitory computer-readable storage media for supporting multiple network transaction facilitators (NTFs) within a website building system, the one or more non-transitory computer-readable storage media including instructions that, when executed by one or more processors, cause the one or more processors to: receive, from a computing device associated with an editing user identifier associated with a website identifier of a plurality of website identifiers, a first NTF connection request, wherein the website identifier is associated with a website assembled using one or more website building repositories of the website building system; enable, based at least in part on the first NTF connection request, editing of a network transaction interface of the website to include support for transactions associated with a first NTF of a plurality of NTFs; and responsive to receiving a network transaction request via the network transaction interface, route the network transaction request to the first NTF or a different NTF of the plurality of NTFs based at least in part on a network transaction profile associated with the website identifier.

Example 324. One or more non-transitory computer-readable storage media according to Example 323, wherein the one or more website building repositories store one or more website building components and one or more website editing historical interactions associated with a plurality of editing user identifiers.

Example 325. One or more non-transitory computer-readable storage media according to any of the foregoing Examples, wherein the instructions, when executed by the one or more processors, further cause the one or more processors to: transmit, to the first NTF associated with the first NTF connection request, a first verification request; and responsive to receiving, from the first NTF, a first verification confirmation, enable editing of the network transaction interface of the website to support transactions associated with the first NTF.

Example 326. One or more non-transitory computer-readable storage media according to any of the foregoing Examples, wherein the instructions, when executed by the one or more processors, further cause the one or more processors to: receive, from the computing device associated with the first editing user identifier, a second NTF connection request; transmit, to a second NTF associated with the second NTF request, a second verification request; and responsive to receiving, from the second NTF, a second verification confirmation, enable editing of the network transaction interface of the website to support transactions associated with the second NTF.

Example 327. One or more non-transitory computer-readable storage media according to any of the foregoing Examples, wherein the instructions, when executed by the one or more processors, further cause the one or more processors to: based at least in part on the network transaction profile associated with the website identifier and one or more trained machine learning models, generate a NTF recommendation interface for rendering via a client computing device associated with the editing user identifier.

Example 328. One or more non-transitory computer-readable storage media according to any of the foregoing Examples, wherein the instructions, when executed by the one or more processors, further cause the one or more processors to: responsive to receiving an NTF verification request from the first NTF, transmit verification data to the first NTF.

Example 329. One or more non-transitory computer-readable storage media according to any of the foregoing Examples, wherein the first NTF is selected for the editing user identifier based at least in part on attributes associated with the editing user identifier and the website.

Example 330. One or more non-transitory computer-readable storage media according to any of the foregoing Examples, wherein the network transaction request is received via a network transaction application programming interface (API) associated with the network transaction interface.

Example 331. One or more non-transitory computer-readable storage media according to any of the foregoing Examples, wherein the network transaction request is routed to the first NTF via an NTF application programming interface (API).

Example 332. One or more non-transitory computer-readable storage media according to any of the foregoing Examples, wherein the instructions, when executed by the one or more processors, further cause the one or more processors to: establish an NTF account with the first NTF on behalf of the editing user identifier.

Example 333. One or more non-transitory computer-readable storage media according to any of the foregoing Examples, wherein the instructions, when executed by the one or more processors, further cause the one or more processors to: update the NTF account with the first NTF on behalf of the editing user identifier.

CONCLUSION

Many modifications and other embodiments of the present disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims.

The invention claimed is:

1. An apparatus for supporting multiple network transaction facilitators (NTFs) within a website building system, the apparatus comprising at least one processor and at least one non-transitory computer readable storage medium storing instructions that, when executed by the at least one processor, cause the apparatus to:

receive, from a computing device associated with an editing user identifier associated with a website identifier of a plurality of website identifiers, a first NTF connection request, wherein the website identifier is associated with a website assembled using one or more website building repositories of the website building system, and wherein the first NTF connection request is associated with a first NTF of a plurality of NTFs;

transmit, to the first NTF, a first verification request;

responsive to receiving, from the first NTF, a first verification confirmation, enable editing of a network transaction interface of the website to include support for transactions associated with the first NTF; and responsive to receiving a network transaction request via the network transaction interface, route the network transaction request to the first NTF or a different NTF of the plurality of NTFs based at least in part on a network transaction profile associated with the website identifier.

2. The apparatus of claim 1, wherein the one or more website building repositories store one or more website building components and one or more website editing historical interactions associated with a plurality of editing user identifiers.

3. The apparatus of claim 1, wherein the at least one non-transitory computer readable storage medium stores instructions that, when executed by the at least one processor, further cause the apparatus to:

receive, from the computing device associated with the editing user identifier, a second NTF connection request;

transmit, to a second NTF associated with the second NTF connection request, a second verification request; and responsive to receiving, from the second NTF, a second verification confirmation, enable editing of the network transaction interface of the website to support transactions associated with the second NTF.

4. The apparatus of claim 1, wherein the at least one non-transitory computer readable storage medium stores instructions that, when executed by the at least one processor, further cause the apparatus to:

based at least in part on the network transaction profile associated with the website identifier and one or more trained machine learning models, generate a NTF recommendation interface for rendering via a client computing device associated with the editing user identifier.

5. The apparatus of claim 1, wherein the at least one non-transitory computer readable storage medium stores instructions that, when executed by the at least one processor, further cause the apparatus to:

responsive to receiving an NTF verification request from the first NTF, transmit verification data to the first NTF.

6. The apparatus of claim 1, wherein the first NTF is selected for the editing user identifier based at least in part on attributes associated with the editing user identifier and the website.

7. The apparatus of claim 1, wherein the network transaction request is received via a network transaction application programming interface (API) associated with the network transaction interface.

8. The apparatus of claim 1, wherein the network transaction request is routed to the first NTF via an NTF application programming interface (API).

9. The apparatus of claim 1, wherein the at least one non-transitory computer readable storage medium stores instructions that, when executed by the at least one processor, further cause the apparatus to:

establish an NTF account with the first NTF on behalf of the editing user identifier.

10. The apparatus of claim 9, wherein the at least one non-transitory computer readable storage medium stores instructions that, when executed by the at least one processor, further cause the apparatus to:

update the NTF account with the first NTF on behalf of the editing user identifier.

11. A computer-implemented method for supporting multiple network transaction facilitators (NTFs) within a website building system, the computer-implemented method comprising:

receiving, using one or more processors and from a computing device associated with an editing user identifier associated with a website identifier of a plurality of website identifiers, a first NTF connection request, wherein the website identifier is associated with a website assembled using one or more website building repositories of the website building system, and wherein the first NTF connection request is associated with a first NTF of a plurality of NTFs;

transmitting, using the one or more processors and to the first NTF, a first verification request;

responsive to receiving, from the first NTF, a first verification confirmation, enabling, using the one or more processors, editing of a network transaction interface of the website to include support for transactions associated with the first NTF; and responsive to receiving a network transaction request via the network transaction interface, routing, using the one or more processors, the network transaction request to the first NTF or a different NTF of the plurality of NTFs based at least in part on a network transaction profile associated with the website identifier.

12. The computer-implemented method of claim 11, wherein the one or more website building repositories store one or more website building components and one or more website editing historical interactions associated with a plurality of editing user identifiers.

13. The computer-implemented method of claim 11, further comprising:

receiving, from the computing device associated with the editing user identifier, a second NTF connection request;

transmitting, to a second NTF associated with the second NTF connection request, a second verification request; and responsive to receiving, from the second NTF, a second verification confirmation, enabling editing of the network transaction interface of the website to support transactions associated with the second NTF.

14. The computer-implemented method of claim 11, further comprising:

based at least in part on the network transaction profile associated with the website identifier and one or more trained machine learning models, generating a NTF recommendation interface for rendering via a client computing device associated with the editing user identifier.

15. The computer-implemented method of claim 11, further comprising:

responsive to receiving an NTF verification request from the first NTF, transmitting verification data to the first NTF.

16. The computer-implemented method of claim 11, wherein the first NTF is selected for the editing user identifier based at least in part on attributes associated with the editing user identifier and the website.

17. The computer-implemented method of claim 11, wherein the network transaction request is received via a network transaction application programming interface (API) associated with the network transaction interface.

18. One or more non-transitory computer-readable storage media for supporting multiple network transaction facilitators (NTFs) within a website building system, the one or more non-transitory computer-readable storage media including instructions that, when executed by one or more processors, cause the one or more processors to:

receive, from a computing device associated with an editing user identifier associated with a website identifier of a plurality of website identifiers, a first NTF connection request, wherein the website identifier is associated with a website assembled using one or more website building repositories of the website building system, and wherein the first NTF connection request is associated with a first NTF of a plurality of NTFs;

transmit, to the first NTF, a first verification request;

responsive to receiving, from the first NTF, a first verification confirmation, enable editing of a network transaction interface of the website to include support for transactions associated with the first NTF; and responsive to receiving a network transaction request via the network transaction interface, route the network transaction request to the first NTF or a different NTF of the plurality of NTFs based at least in part on a network transaction profile associated with the website identifier.

* * * * *